( 12 ) United States Patent
Meng et al.

(10) Patent No.: US 10,502,556 B2
(45) Date of Patent: Dec. 10, 2019

(54) SYSTEMS AND METHODS FOR 3D SURFACE MEASUREMENTS

(71) Applicant: Mura Inc., San Jose, CA (US)

(72) Inventors: Lingfei Meng, Santa Clara, CA (US); Jun Jiang, Santa Clara, CA (US)

(73) Assignee: Mura Inc., San Jose, CA (US)

( * ) Notice: Subject to any disclaimer, the term of this patent is extended or adjusted under 35 U.S.C. 154(b) by 0 days.

(21) Appl. No.: 15/655,656

(22) Filed: Jul. 20, 2017

(65) Prior Publication Data
US 2018/0023947 A1 Jan. 25, 2018

Related U.S. Application Data

(60) Provisional application No. 62/511,964, filed on May 27, 2017, provisional application No. 62/364,320, filed on Jul. 20, 2016.

(51) Int. Cl.
G01B 11/25 (2006.01)
H04N 13/20 (2018.01)
(Continued)

(52) U.S. Cl.
CPC ............ G01B 11/25 (2013.01); G01B 11/303 (2013.01); H04N 13/271 (2018.05); H04N 13/296 (2018.05)

(58) Field of Classification Search
CPC ....... H01J 2237/2814; H01J 2237/2815; H01J 2237/2816; H01J 2237/2817; H01J 37/28; H01J 2237/2826; H01J 2237/22; H01J 2237/24465; H01J 2237/2448; H01J 2237/2611; H01J 37/24; H01J 37/244; H01J 37/26; H01J 2237/20; H01J 2237/225; H01J 2237/226; H01J 2237/24578; H01J 2237/28; H01J 2237/281; H01J 37/265; G01B 11/25; G01B 11/303; H04N 13/271;
(Continued)

(56) References Cited

U.S. PATENT DOCUMENTS 6,919,962 B2   7/2005  Debevec et al.
9,235,927 B2   1/2016  Mitev et al.
(Continued)

FOREIGN PATENT DOCUMENTS

WO   WO 2010-107434 A1   9/2010
WO   WO 2015-080827 A1   6/2015

OTHER PUBLICATIONS

Basri, D., et al. "Photometric Stereo with General, Unknown Lighting," International Journal of Computer Vision, vol. 72, No. 3, May 2007, pp. 239-257. <doi:10.1007/s11263-006-8815-7>.
(Continued)

*Primary Examiner* — Pankaj Kumar
*Assistant Examiner* — Alazar Tilahun
(74) *Attorney, Agent, or Firm* — Weaver Austin Villeneuve & Sampson LLP; Sheila Martinez-Lemke

(57) ABSTRACT

Certain embodiments are directed to 3D surface measurement systems and methods configured to direct engineered illumination of beams in one or more ray bundles to N illumination directions incident a sample surface. The systems and methods can measure a map of surface normals, a depth map, and a map of surface properties using intensity images captured while the engineered illumination is directed to the sample surface.

26 Claims, 39 Drawing Sheets

(51) Int. Cl.
*G01B 11/30* (2006.01)
*H04N 13/271* (2018.01)
*H04N 13/296* (2018.01)

(58) Field of Classification Search
CPC ............. H04N 13/296; G01N 23/2251; G01N 2223/6116; G01N 23/225
See application file for complete search history.

(56) References Cited

U.S. PATENT DOCUMENTS

| | | | |
|---|---|---|---|
| 9,562,857 | B2 | 2/2017 | Debevec et al. |
| 2008/0232679 | A1* | 9/2008 | Hahn .................. G06K 9/2036 382/154 |
| 2008/0239298 | A1* | 10/2008 | Tobiason ............... G01B 11/26 356/121 |
| 2009/0079987 | A1 | 3/2009 | Ben-Ezra et al. |
| 2011/0144505 | A1* | 6/2011 | Yamamoto ........... A61B 5/0064 600/476 |
| 2012/0019533 | A1 | 1/2012 | Tabellion |
| 2012/0265487 | A1 | 10/2012 | Yanine et al. |
| 2013/0033595 | A1 | 2/2013 | Adelson et al. |
| 2013/0329226 | A1* | 12/2013 | Matsubara ......... G01B 9/02024 356/450 |
| 2014/0226150 | A1* | 8/2014 | Colonna de Lega ........................ G01B 9/02007 356/73 |
| 2014/0268160 | A1 | 9/2014 | Debevec et al. |
| 2015/0356769 | A1 | 12/2015 | Imber et al. |

OTHER PUBLICATIONS

Chen, T., et al. "Mesostructure from specularity," Proc. Computer Vision and Pattern Recognition, IEEE Computer Society Conference on Jun. 17-22, 2006, IEE 2006, vol. 2, pp. 1825-1832. <doi:10.1109/CVPR.2006.182>.

Francken, Y., et al. "High Quality Mesostructure Acquisition Using Specularities," in Computer Vision and Pattern Recognition, 2008 (CVPR 2008), IEEE Conference on Jun. 23-28, 2008, pp. 1-7. <doi:10.1109/CVPR.2008.4587782>.

Goldman, D.B., et al. "Shape and Spatially-Varying BRDFs from Photometric Stereo," IEEE Transactions on Pattern Analysis and Machine Intelligence , vol. 32, No. 6, Jun. 2010, pp. 1060-1071. <doi:10.1109/TPAMI.2009.102>.

Graham, P., et al. "Measurement-Based Synthesis of Facial Microgeometry," Computer Graphics Forum, vol. 32, No. 2, pt. 3., May 6, 2013, pp. 335-344. <doi:10.1111/cgf.12053>.

Groot, P., "Principles of interference microscopy for the measurement of surface topography," Advances in Optics and Photonics, vol. 7, No. 1, Feb. 2, 2015, pp. 1-65. <URL:http://dx.doi.org/10.1364/AOP.7.00001>.

Matilla, A., et al. "Three-dimensional measurements with a novel technique combination of Confocal and Focus Variation with a simultaneous scan," Conference Report, Proc. SPIE 9890, Optical Micro and Nanometrology VI, Apr. 26, 2016, pp. 98900B-11. <doi:10.1117/12.2227054>.

International Search Report and Written Opinion dated Nov. 30, 2017, issued in PCT/US2017/043174.

* cited by examiner

Zenith Angle (degrees)

Azimuth Angle (degrees)

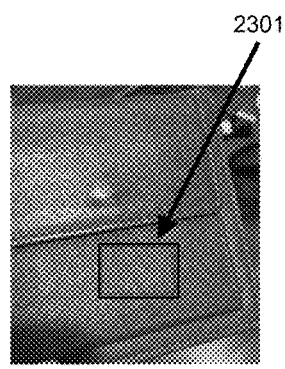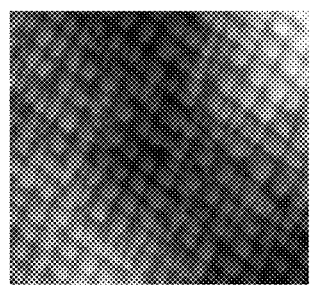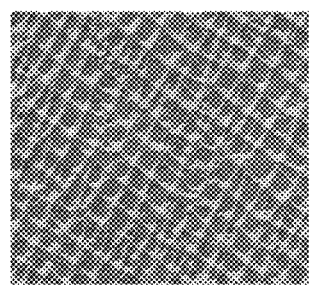
*FIG. 24A*  *FIG. 24B*  *FIG. 24C*
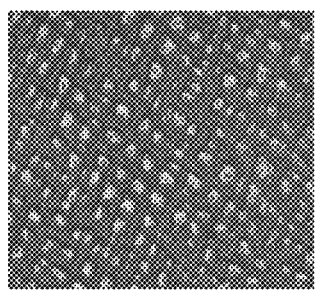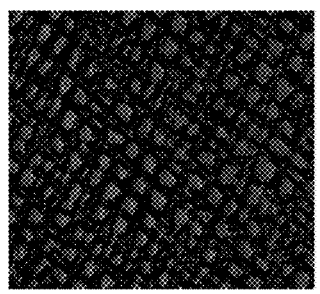
*FIG. 24D*  *FIG. 24E*  *FIG. 24F*

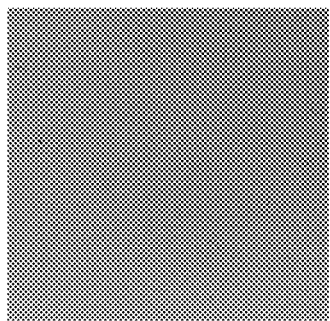  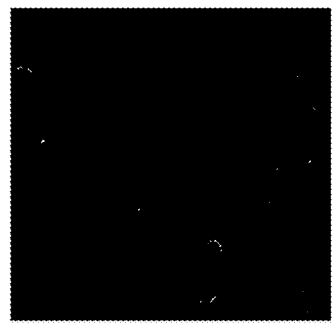
FIG. 49A     FIG. 49B     FIG. 49C
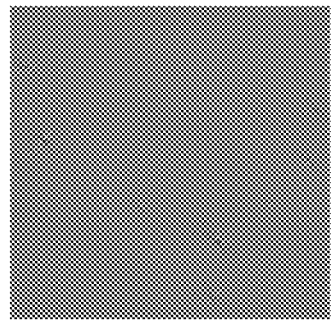 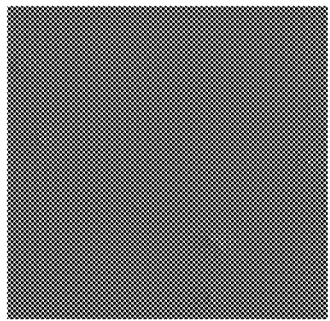
FIG. 49D     FIG. 49E
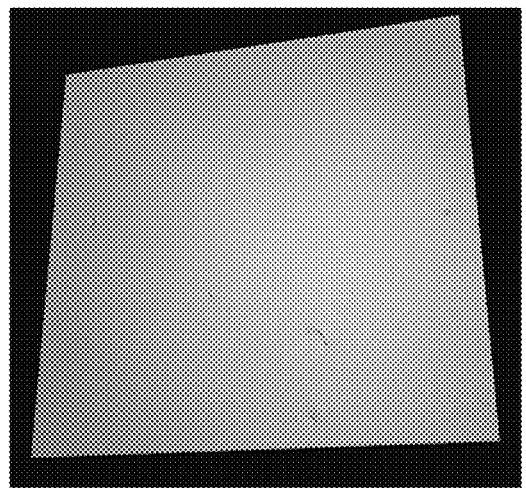
FIG. 49F

SYSTEMS AND METHODS FOR 3D SURFACE MEASUREMENTS

CROSS-REFERENCES TO RELATED APPLICATIONS

This application claims priority to U.S. Provisional Patent Application No. 62/364,320, titled "Systems and Methods for 3D Surface Microgeometry and Reflectance Properties Measurement" and filed on Jul. 20, 2016 and to U.S. Provisional Patent Application No. 62/511,964, titled "Systems and Methods for 3D Surface Microgeometry and Reflectance Properties Measurement" and filed on May 27, 2017, each of which is hereby incorporated by reference in its entirety and for all purposes.

FIELD

Certain embodiments described herein are generally related to measurement systems, and more particularly, to methods and systems for 3D surface measurements (3DSM methods and systems) used to measure surface microgeometry and/or surface properties as may be implemented, for example, in manufacturing for defect detection and quality control, as well as in other applications such as computer graphics.

BACKGROUND

The measurement of the 3D surface microgeometry (also referred to as topography) with high depth resolution has proven to be very difficult and is the focus of active research in the fields of 3D metrology and computer vision. In the field of 3D metrology, a non-contact optical approach is of particular interest driven by customer requirements for greater simplicity and higher speed. Some conventional techniques that can be used to measure surface depth with nanometer to micron-scale depth resolution include white light interferometer, confocal microscope, and focus variation. Conventional instruments that use these techniques generally have, however, a narrow field-of-view, short working distance, and shallow depth-of-field since they use high magnification microscope objectives. These conventional instruments also tend to be very expensive due to their use of sophisticated optical and mechanical components. Moreover, the devices based on interferometry are commonly sensitive to the ambient environment, such as vibration. Also, most of these techniques are designed to take surface topography measurements, and are unable to capture reflectance properties such as diffuse reflection and specular reflection. An example of a white light interferometer can be found in De Groot, P., "Principles of interference microscopy for the measurement of surface topography," Advances in Optics and Photonics, vol. 7, no. 1, pp. 1-65 (2015), which is hereby incorporated by reference for this example. An example of focus variation device can be found in Matilla, A., et al., Three-dimensional measurements with a novel technique combination of confocal and focus variation with a simultaneous scan," Proc. SPIE, pp. 98900B-11, (2016), which is hereby incorporated by reference for this example.

In the field of computer vision, some research has been done on 3D surface measurement with somewhat simpler setups. The photometric stereo technique is a method to reconstruct surface normal and depth by capturing multiple images under different lighting directions, but this method assumes the scene to be Lambertian (diffusive). An example of a method to reconstruct surface normal and depth by capturing multiple images under different lighting directions can be found in Basri, D., et al., "Photometric stereo with general, unknown lighting," International Journal of Computer Vision, vol. 72, no. 3, pp. 239-257 (2007), which is hereby incorporated by reference for this example. In real world most of the objects are not purely diffusive, and can be specular or hybrid. Recently new techniques have been explored to address objects that are not diffusive. Some methods have been proposed to address microgeometry measurement on specular surfaces. Examples of such methods can be found in Chen, T., et al, Mesostructure from specularity," Proc. CVPR, pp. 1825-1832 (2006) and Francken, Y., et al., "High quality mesostructure acquisition using specularities," in Proc. CVPR, p. 1-7 (2007), which are hereby incorporated by reference for these examples. These proposed methods either use hand-moved point light source or structured illumination to reconstruct depth from specularity, but their approaches can only capture images with limited number of lighting directions and therefore may result in insufficient samplings of the reflectance field. In another example, an object is pressed into an elastomer skin to remove the specular reflection of the object, and a photometric stereo technique is used to estimate the surface normal based on reflection from the covered skin. An example can be found in U.S. Patent Publication 20130033595, titled "HIGH-RESOLUTION SURFACE MEASUREMENT SYSTEMS AND METHODS," by Adelson, H., and Johnson, Micah K., which is hereby incorporated by reference for this example. However, when using this approach, the true reflection from the sampled object is blocked by the elastomer skin, and information about the color or other reflectance properties is lost.

In the field of computer graphics, some research has been done on the simultaneous acquisition of surface geometry and reflectance properties for computer graphics rendering. For example, a photometric stereo technique for objects with spatially varying bidirectional reflectance distribution function (BRDF) can be found in Goldman, D. B., et al. "Shape and spatially-varying BRDFs from photometric stereo," IEEE Trans. PAMI, vol. 32, no. 6, pp. 1060-1071 (2010), which is hereby incorporated by reference in its entirety. In this example, multiple images are captured under different lighting directions, and then the shape and reflectance parameters are reconstructed from a BRDF model for rendering. However, this method requires that the camera and illumination be at far distance from the sample in order to fulfill the orthographic assumption, and the method is unable to capture detailed microgeometry of the surface due to limited number of illumination directions. In addition, a reflectometry technique has been proposed for surface normal, height, diffuse and specular reflectance parameters measurement, but this method requires a linear light source be moved across the object surface. An example of such a reflectometry system can be found in U.S. Pat. No. 6,919,962, titled "Reflectometry apparatus and method," which is hereby incorporated by reference for this example. A specular object scanner for measuring reflectance properties of objects has also been proposed, but this scanner requires an arc-shaped light source to be rotated around the object. An example of such a specular object scanner can be found in U.S. patent application Ser. No. 14/212,751 titled "Specular object scanner for measuring reflectance properties of objects," which is hereby incorporated by reference for this example. In addition, a 12-light hemispherical dome for capturing detailed microgeometry of skin texture has been developed, which may improve the realism of facial synthesis. An example of such a system is found in Graham, P., et al., "Measurement-based synthesis of facial microgeometry," in Computer Graphics Forum, vol. 32, no. 2, pt. 3. Wiley Online Library, pp. 335-344 (2013), which is hereby incorporated by reference for this example. However, in this example, the 12-light hemispherical dome has limited angular samplings above the surface, and may not work well for specular objects that are smoother. To acquire much denser samplings, the example discusses using a light stage, but the light stage is large and some of the lights may be occluded by the camera.

In these conventional techniques, the camera and multiple illuminations are placed at a far distance in order to fulfill the orthographic assumptions. Such a setup typically introduces a large form factor, and some of the illuminations may be occluded by the camera. Because the camera is not able to capture images of the surface closely, it is difficult to achieve micron-level depth resolution and accuracy. These conventional techniques use a limited number of extended light sources, and are typically arranged with large angular sampling steps due to the constraints in their physical dimensions. This may result in insufficient samplings of the reflectance field, and bias the surface normal estimation for specular surfaces that are relatively smoother. Moreover, typically some extended illuminations were placed at oblique angles introducing severe shadow effects. Most of these conventional techniques are unable to measure the reflectance properties of the surface.

SUMMARY

Certain embodiments pertain to methods and systems for 3D surface measurements.

Certain embodiments are directed to a 3D surface measurement system comprising an engineered illumination system configured to provide at least one ray bundle to N illumination directions incident a surface of a sample being imaged. Each ray bundle comprises illumination beams of various intensities. The 3D surface measurement system further comprises a camera with an imaging lens and at least one sensor configured to capture intensity images at the N illumination directions based on light received from the illuminated sample. In addition, the 3D surface measurement system comprises a controller configured to execute instructions to determine a sensor response at each sensor pixel from the intensity images at the N illumination directions, match the sensor response at each sensor pixel to one of a plurality of predetermined sensor responses to determine a surface normal at each sensor pixel, and construct a map of surface normals of the surface by combining the determined surface normal of all the sensor pixels of the at least one sensor.

Certain embodiments are directed to a 3D surface measurement method that receives a plurality of intensity images of a sample in a signal from at least one sensor of a camera. The plurality of intensity images have been captured at a plurality of exposure times at each illumination direction of N illumination directions of one or more ray bundles, wherein each ray bundle comprises illumination beams of various intensities. The method also determines a sensor response at each sensor pixel from the intensity images at the N illumination directions. In addition, the method matches a sensor response at each sensor pixel to one of a plurality of predetermined sensor responses to determine a surface normal at each sensor pixel and constructs a map of surface normals by combining the determined surface normal of all the sensor pixels of the at least one sensors.

Certain embodiments are directed to a 3D surface measurement method that engineers at least one ray bundle to N illumination directions incident a surface a sample being imaged, each ray bundle comprising illumination beams of various intensities. The method also captures, using at least one sensor of a camera, wherein the intensity images are captured at a plurality of exposure times at each illumination direction based on light from the illuminated sample. In addition, the method communicates the intensity images to one or more processors. The one or more processors determine a sensor response at each sensor pixel from the intensity images at the N illumination directions, match a sensor response at each sensor pixel to one of a plurality of predetermined sensor responses to determine a surface normal at each sensor pixel, and construct a map of surface normals by combining the determined surface normal of all the sensor pixels of the at least one sensor.

Certain embodiments are directed to a 3D surface measurement method for calibrating a 3D surface measurement system. The method comprises engineering at least one ray bundle to N illumination directions incident a surface of a mirror or a chrome sphere, each ray bundle comprising illumination beams of various intensities. The method further comprises capturing, using at least one sensor of a camera, intensity images at each illumination direction based on light reflected from the mirror or the chrome sphere. The method further comprises determining a calibration offset and the N illumination directions based on the intensity images.

These and other features are described in more detail below with reference to the associated drawings.

BRIEF DESCRIPTION OF THE DRAWINGS

FIG. 24A is a photograph of a leather sample showing an area being analyzed by a 3DSM system, according to an embodiment.

FIG. 24B is an illustration of a measured depth map of the area of the leather surface of FIG. 24A as measured by the 3DSM system.

FIG. 24C is an illustration of a measured surface normal map of the area of the leather surface of FIG. 24A as measured by the 3DSM system.

FIG. 24D is an illustration of a measured diffuse map of the area of the leather surface of FIG. 24A as measured by the 3DSM system.

FIG. 24E is an illustration of a specular map of the area of the leather surface of FIG. 24A as measured the 3DSM system.

FIG. 24F is an illustration of a surface roughness map of the area of the leather surface of FIG. 24A as measured the 3DSM system.

FIG. 49A is an illustration of specular reflection properties of an LCD panel that is contaminated with dirt and fiber measured by a 3DSM system configured for defect detection, according to an embodiment.

FIG. 49B is an illustration of diffuse reflection properties of the LCD panel with dirt and fiber as measured by the 3DSM system of FIG. 49A, according to an embodiment.

FIG. 49C is an illustration of surface roughness properties of the LCD panel with dirt and fiber as measured by the 3DSM system of FIG. 49A, according to an embodiment.

FIG. 49D is an illustration of a measured normal map of the LCD panel with dirt and fiber as measured by the 3DSM system of FIG. 49A, according to an embodiment.

FIG. 49E is an illustration of a measured depth map of the LCD panel with dirt and fiber as measured by the 3DSM system of FIG. 49A, according to an embodiment.

FIG. 49F is an illustration of surface defect visualization operation using the measured parameters illustrated in FIGS. 49A-49E using a 3DSM method including defect detection implemented by the 3DSM system, according to an embodiment.

DETAILED DESCRIPTION

Figure 1A:
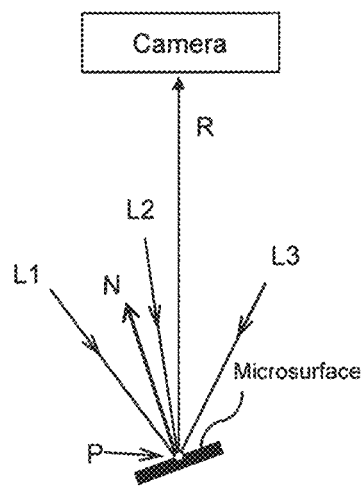
FIG. 1A is a simplified schematic drawing depicting a single microsurface of a sample having a surface normal N, according to one implementation

The following description is directed to certain implementations for the purposes of describing various aspects of this disclosure. However, a person having ordinary skill in the art will readily recognize that the teachings herein can be applied in a multitude of different ways. Thus, the teachings are not intended to be limited to the implementations depicted solely in the Figures, but instead have wide applicability as will be readily apparent to one having ordinary skill in the art.

Embodiments pertain to methods and systems for 3D surface measurements (3DSM methods and systems) including measurements of microgeometry and surface properties such as reflectance properties, emissivity properties, translucency properties, etc. The 3DSM systems implement methods that can be used to simultaneously acquire surface geometry and properties. In various embodiments, a 3DSM system comprises an engineered illumination system that generates and manipulates incident directions of engineered illumination to different points along a surface of a sample to N different illumination directions. The engineered illumination has a known distribution such as a Gaussian distribution, a pattern, etc. During data acquisition, light from the surface is captured by one or more sensors of a digital camera for the N different illumination directions. The 3DSM system captures a measured sensor response for each sensor pixel for the N different illumination directions. The 3DSM system determines a surface normal for each of the sensor pixels, for example, by matching the measured sensor response to the best fitting of a group of pre-determined sensor responses. Each pre-determined sensor response corresponds to a surface normal. The pre-determined sensor responses for different surface normals can be calculated based on the known distribution of the engineered illumination at different illumination directions. During an analysis phase, the 3DSM system determines a surface normal at each point of the surface by matching the measured sensor response to a pre-determined sensor response. The 3DSM system can estimate a depth map from the surface normals at the different points across the surface. The 3DSM system can also use the map of surface normals to determine surface properties such as reflectance properties e.g. diffuse albedo, specular albedo and roughness, estimated, for example, based on a BRDF model.

I. Introduction to 3DSM Systems and Methods

Most real-world surfaces are not flat, and can be approximated as a series of flat microsurfaces facing various directions. Each of these flat microsurfaces has a surface normal vector (also referred to herein as a "surface normal"). A two-dimensional (2D) grid of surface normals at points across a three-dimensional surface corresponds to the contours of the surface. A depth map (topographical) of the surface and various surface properties such as, e.g., reflective properties, can be determined from the 2D grid of surface normals. Examples of techniques that can be used to determine a depth map and surface properties from surface normals can be found in U.S. Patent Publication 20130033595, titled "HIGH-RESOLUTION SURFACE MEASUREMENT SYSTEMS AND METHODS," by Adelson, H., and in Johnson, M. K., et al., "Shape and spatially-varying BRDFs from photometric stereo," IEEE Trans. PAMI, vol. 32, no. 6, pp. 1060-1071 (2010).

In certain implementations, a 3DSM system comprises an engineered illumination system configured to direct a ray bundle having illumination beams of varying intensities to points (also referred to herein as "pixels") along the surface of a sample. The illumination beams of the ray bundle have a known engineered intensity distribution. In many cases, the engineered illumination system includes a motion control device configured to rotate and/or translate one or more system components to cause the rotation of the ray bundle relative to the sample. The ray bundle is rotated in two orthogonal directions to direct the ray bundle to different illumination directions incident the sample while a camera measures the intensity distribution of light propagated from the illuminated sample. The intensity distribution measured during an exposure time is referred to herein as an "intensity image" or simply as an "image." The intensity images can be used to generate the 2D grid of surface normals of the sample.

In one implementation, either the sample is manipulated (rotated/translated) or the engineered illumination and camera are manipulated together to scan the engineered illumination over the sample during data acquisition. The 3DSM system analyzes the captured images to measure maps of surface normals, depths, and surface properties the sample using the images captured. During data acquisition of a large area sample, the engineered illumination is scanned over a region of the large area sample and then scanned over another region, and so on, until the entire sample is scanned. The 3DSM system can stitch together the measured maps of the surface normals, depths, and surface properties for the different regions of a large area sample to generate maps of the entire surface. This approach may have one or more technical advantages. One technical advantage may be the ability to measure over a large area surface. Another technical advantage is that the measured maps of the surface normals, depths, and surface properties for the different regions of a large area sample can be stitched together, which provides for high spatial resolution in the measured maps of the entire surface. Another technical advantage is that the 3DSM system can more precisely control collimated illumination to a smaller region of the sample than would be possible with a large area surface.

FIG. 1A is a simplified schematic drawing of a single microsurface of a sample having a surface normal N, according to an embodiment. In this simplified scenario, a ray bundle of three (3) beams L1, L2, and L3 of different intensities is shown incident a surface point P of the microsurface. As shown, only the L1 beam is reflected (shown as a reflected beam R) back to a camera and a sensor of the camera measures an intensity value of the L1 beam. The L2 and L3 beams are not reflected back to the camera. Since the three (3) beams L1, L2, and L3 are engineered with a particular known intensity distribution for various output angles, the sensor reading corresponds to the known intensity value of the L1 beam. In this way, the 3DSM system can use the sensor reading to identify the L1 beam as reflected from the microsurface. The angle of the illumination beam L1 is also known based on the intensity distribution and the configuration of any optical elements propagating illumination to the surface. The 3DSM system can determine the surface normal of the microsurface based on the known angle of the identified illumination beam L1 and the orientation of the sensor.

In certain scenarios, the engineered illumination comprises a ray bundle of illumination beams where some beams have the same or substantially similar intensities. In addition or alternatively, components of the system may have various transmission properties and sensor may have limited dynamic range. In these cases, a sensor reading of a particular intensity value may not be unique to a single illumination beam and could correspond to multiple beams having similar output power. For example, if beam L1 and beam L3 shown in FIG. 1A had the same power, the sensor reading based on receiving beam L1 would correspond to both of the illumination beams L1 and L3. In order to determine the beam being reflected from the microsurface and estimate the surface normal, certain 3DSM systems described herein take sensor readings at different illumination directions of the ray bundle at each surface point. In some cases, the 3DSM systems include a motion control device that rotates one or more system components to rotate the ray bundle together in two orthogonal directions to direct the ray bundle to a sequence of N illumination directions. For a particular 3DSM system, each surface normal has a unique sensor response for N illumination directions based on rotating the ray bundle in two orthogonal directions. Each measured sensor response is a pattern of intensity values measured at a sensor pixel for the different illumination directions. For example, a sensor response pattern may have four hundred (400) intensity values associated with four hundred (400) illumination directions based on 20 rotational angles along an x-direction and 20 rotational angles along a y-direction orthogonal to the x-direction. In various implementations, the 3DSM system compares the measured sensor response to predetermined sensor responses. The 3DSM system determines a predetermined sensor response that matches most closely to the measured sensor response to estimate the surface normal at each pixel.

Figure 1B:
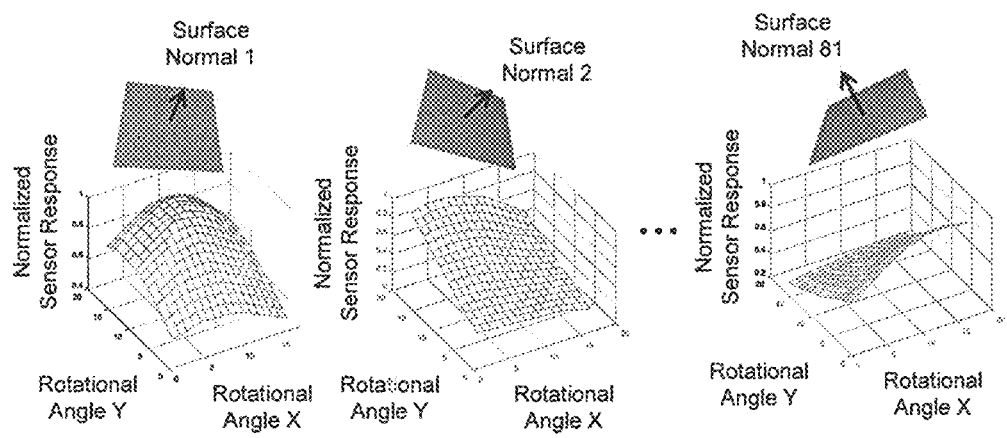
FIG. 1B shows a schematic illustration of a series of eighty-one (81) predetermined sensor responses corresponding to eighty-one (81) surface normal orientations of a 3DSM system, according to an implementation.

FIG. 1B shows a schematic illustration of a series of eighty-one (81) predetermined sensor responses corresponding to eighty-one (81) surface normal orientations of a 3DSM system, according to an implementation. In this example, each surface normal has a unique 20×20 sensor response pattern of normalized intensity for four hundred (400) rotational positions corresponding to twenty (20) rotational angles along a y-axis (rotation angle Y) and twenty (20) rotational angles along an x-axis (rotation angle X) orthogonal to the y-axis.

II. 3DSM Systems

Figure 2:
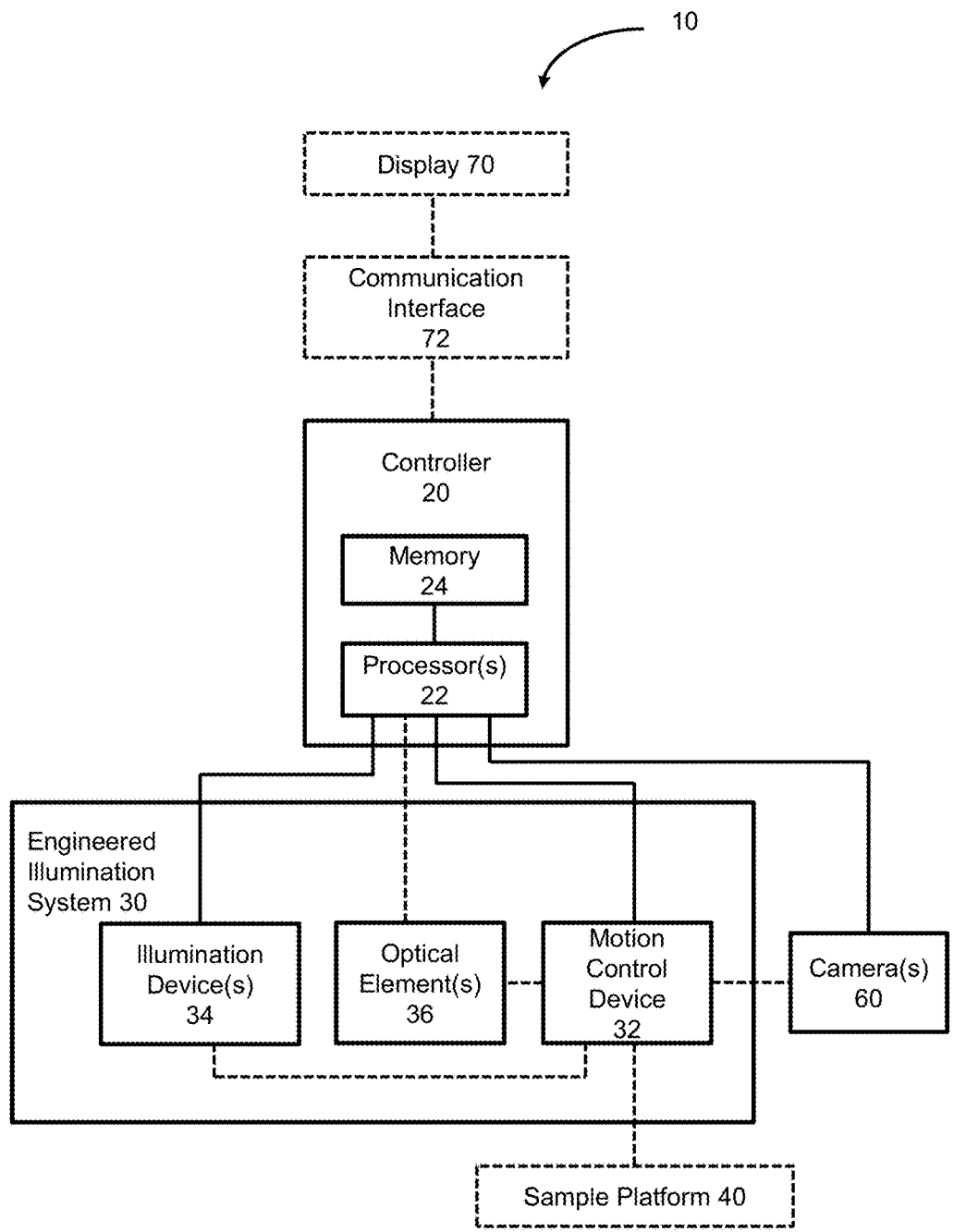
FIG. 2 is a simplified block diagram depicting components of a 3DSM system, according to various implementations.

FIG. 2 is a simplified block diagram of a 3DSM system 10, according to various implementations. The 3DSM system 10 comprises a controller 20 having a processor 22 and a memory 24 in electrical communication with the processor 22. The processor 22 is configured to control functions of the 3DSM system 10 by executing instructions stored in memory 24. The processor 22 may also retrieve data stored in memory 24 and/or store data to memory 24. The 3DSM system 10 further comprises an engineered illumination system 30 having one or more illumination devices 34, one or more optical elements 36, and a motion control device 32. Each illumination device 34 includes one or more light sources. The illumination device(s) 34 and optical element(s) 36 are configured to provide engineered illumination to the sample during operation. The 3DSM system 10 further optionally (denoted by the dashed line) comprises a sample platform 40 for receiving the sample and camera(s) 60 with one or more lenses and sensors configured to receive light from the sample during operation and to capture intensity measurements. The motion control device 32 is in communication optionally (denoted by the dashed line) with one or more of the illumination device(s) 34, the optical element(s) 36, the camera(s) 60, and the sample platform 40 in order to control their movement (e.g., translation/rotation) to rotated the engineered illumination relative to the sample to N rotational positions. For example, the motion control device 32 may include a motor coupled to a system component to rotate and/or translate the component so that the engineered illumination is rotated to different rotational positions over a sequence of sample times. The controller 20 is in electrical communication with the illumination device(s) 34 and the camera(s) 60 to send control signals to control functions of these components and to receive data, such as intensity measurements from the camera(s) 60. For example, the controller 20 may send control signals to the camera(s) 60 and the motion control device 32 to synchronize exposure times of the camera(s) 60 to be at the same time that the motion control device 32 is holding system components in a particular position to provide engineered illumination to a surface at a particular rotational position.

The 3DSM system 10 optionally (denoted by dashed line) further comprises a communication interface 72 and a display 70 in communication with the communication interface 72. The controller 20 is configured or configurable to output raw data, processed data such as surface measurements or renderings, and/or other data over the communication interface 72 for display on the display 70. In another embodiment, the 3DSM system 10 may further comprise one or more additional communication interfaces and/or a computing device in communication with a communication interface. In addition and optionally, the 3DSM system 10 may further comprise an external memory device in communication with a communication interface for storage of data to the external memory device, and/or a communication interface in communication with a user interface for receiving input from an operator of the 3DSM system 10. The described electrical communication between system components may be able to provide power and/or communicate data. The electrical communication between system components of various implementations may be in wired form and/or wireless form.

In various implementations, the 3DSM system includes an engineered illumination system comprising one or more illumination devices, one or more optical elements, and a motion control device. The engineered illumination system is designed to generate and provide for the relative rotation of the engineered illumination in two orthogonal directions with respect to the surface of a sample. Engineered illumination generally refers to one or more ray bundles where each ray bundle is comprised of multiple illumination beams. The illumination beams of each ray bundle are at different angles. The power of the illumination beams at different output angles can be, for example, a linear, a triangular, a curved, or a random distribution. According to one aspect, the power of the illumination beams at different angles is based on a Gaussian distribution or a distribution similar to a Gaussian distribution. In another aspect, the power of the illumination beams at different angles has a linear gradient. In yet another aspect, the power of the illumination beams at different angles is random.

In various implementations, a 3DSM system implements engineered illumination with illumination beams having power for different output angles in the form of a Gaussian or Gaussian-like distribution. In these cases, the engineered illumination system generally comprises optical elements that include a collimator and a diffuser. The collimator is configured to collimate illumination from one or more light sources. The diffuser is configured to receive collimated illumination and generate the one or more ray bundles. Each ray bundle has an infinite number of illumination beams with output power for different output angles in a Gaussian or Gaussian-like distribution. Examples of suitable diffusers are commercially available. For example, a suitable commercial diffuser is the DG20-1500 manufactured by Thorlabs.

Figure 3A:
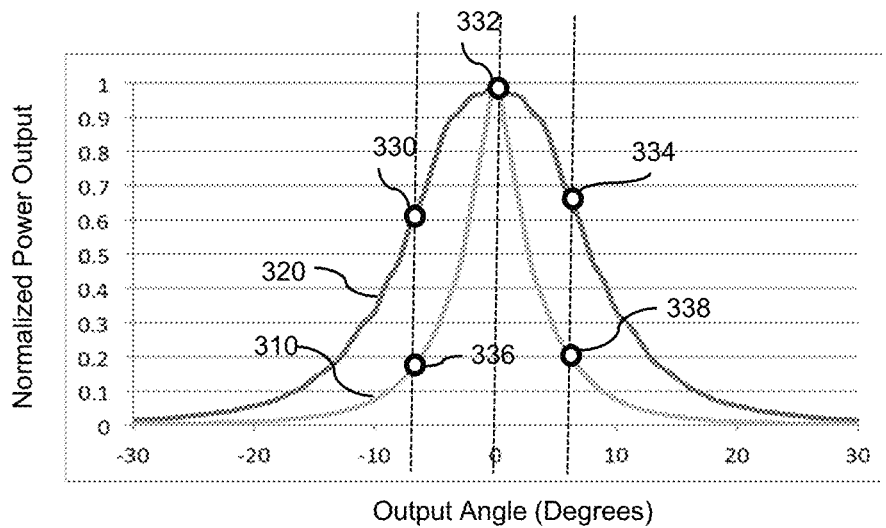
FIG. 3A is a graph with a first transmission profile of a first diffuser and a second transmission profile of a second diffuser, both profiles having distributions that are Gaussian or Gaussian-like, according to embodiments.

FIG. 3A is a graph illustrating a first transmission profile 310 through a first diffuser and a second transmission profile 320 through a second diffuser, according to embodiments. These are examples of typical diffuser transmission profiles. Each of the transmission profiles exhibits has a Gaussian-like distribution of output power of illumination beams for different output angles (i.e. angles from the respective diffusers). The transmission profiles 310, 320 are graphs of the distribution of normalized output power values of the infinite number of illumination beams for different output angles in degrees from the respective diffuser. The transmission profiles 310, 320 are illustrated to point out three beams along each profile at the output angles of −7 degrees, 0 degrees, and 6 degrees. The first transmission profile 310 has a first beam 336 having a normalized power of about 0.17 at −7 degrees, a second beam 332 having a normalized power of about 0.98 at 0 degrees, and a third beam 338 having a normalized power of about 0.20 at 6 degrees. The second transmission profile 320 has a first beam 330 having a normalized power of about 0.6 at −7 degrees, a second beam 332 having a normalized power of about 0.98 at 0 degrees, and a third beam 334 having a normalized power of about 0.67 at 6 degrees. An example of commercially-available diffusers that can provide a non-Gaussian intensity distribution are Engineered Diffusers™ from Thorlabs RPC Photonics.

Figure 3B:
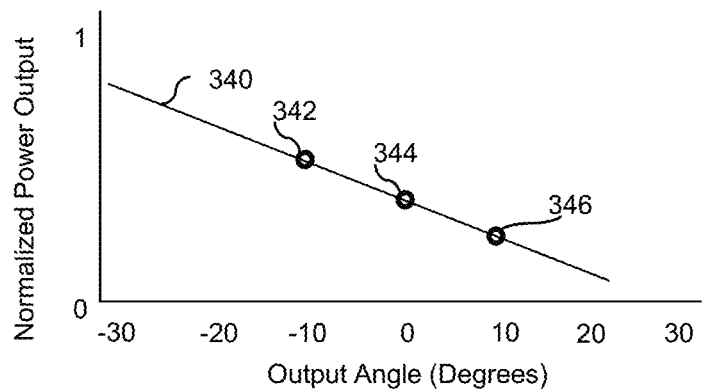
FIG. 3B is a graph with a linear gradient profile, according to an embodiment.

In another aspect of the 3DSM system, the engineered illumination includes one or more ray bundles with each ray bundle having illumination beams with power varying based on output angle according to a linear gradient distribution. FIG. 3B is a graph illustrating a linear gradient profile 340 of the distribution of illumination beams of a ray bundle for different output angles, according to an embodiment. The linear gradient profile 340 includes normalized power of an infinite number of beams at different output angles. The linear gradient profile 340 has a first beam 342 having a normalized power of 0.5 at −10 degrees, a second beam 344 having a normalized power of about 0.3 at 0 degrees, and a third beam 346 having a normalized intensity of about 0.2 at 10 degrees. In this example, the gradient is decreasing linearly as output angle increases. In other cases, the gradient is increasing linearly.

Figure 3C:
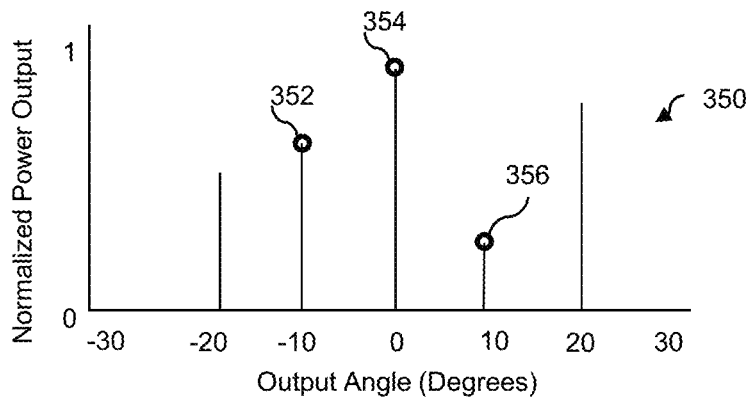
FIG. 3C is a graph of a random distribution profile, according to an embodiment.

In another aspect of the 3DSM system, the engineered illumination includes one or more ray bundles with each ray bundle having illumination beams with power varying based on output angle according to a random distribution. FIG. 3C is a graph illustrating a profile 350 of a random distribution of beams, according to an implementation. The profile 350 includes normalized power of the illumination beams at different output angles. The profile 350 has a first beam 352 having a normalized power of about 0.65 at −10 degrees, a second beam 354 having a normalized power of about 0.95 at 0 degrees, and a third beam 356 having a normalized power of about 0.3 at 10 degrees.

Figure 4:
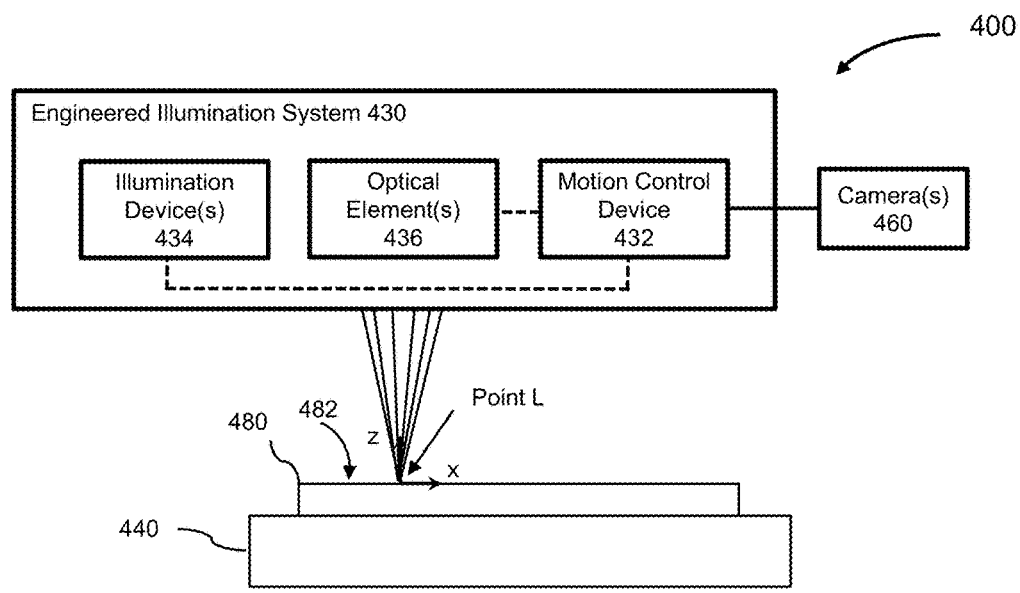
FIG. 4 is a schematic drawing depicting a side view of components of a 3DSM system during a data acquisition phase of a 3DSM method, according to an embodiment.

FIG. 4 is a schematic drawing showing a side view of components of a 3DSM system 400 during a time period of operation at which the camera(s) 460 takes multiple exposures at different settings, according to one embodiment. The 3DSM system 400 comprises an engineered illumination system 430, a sample platform 440, and a camera(s) 460. A sample 480 with a surface 482 is shown disposed on the sample platform 440. The 3DSM system 400 includes an x-axis parallel to the surface 480 at the point L, a z-axis normal to the surface 480 at point L, and a y-axis (not shown) orthogonal to the x-axis and the z-axis. At this instant in time, the engineered illumination system 440 is shown providing a ray bundle of six (6) beams of various intensities at different incidence angles to a surface point L at the surface 482 of the sample 480. The ray bundle is directed along a 0 degree illumination direction normal to the surface 482. The rotational position of the ray bundle is at 0 degrees rotation along the x-axis and 0 degrees rotation along the y-axis. It would be understood that although six (6) beams are illustrated for simplicity, an infinite number of beams are incident surface point L. The engineered illumination system 430 comprises a motion control device 432, optical element(s) 436, and illumination device(s) 434. The motion control device 432 is coupled to the optical element(s) 436 and to the camera(s) 460 to be able to translate and/or rotate one or both of these system components to various positions to rotate the ray bundle of six (6) illumination beams to different rotational positions at different sample times during operation. The motion control device 432 is optionally (denoted by dashed line) be coupled to the illumination device(s) 434 to be able to translate and/or rotate the illumination device(s) 434 during operation. For example, the ray bundle may be rotated incrementally along the x-axis and/or along the z-axis. At each rotational position, the one or more sensor(s) of the camera(s) 460 takes intensity measurements (images) of multiple exposures of light propagated from the illuminated sample 480.

Figure 5:
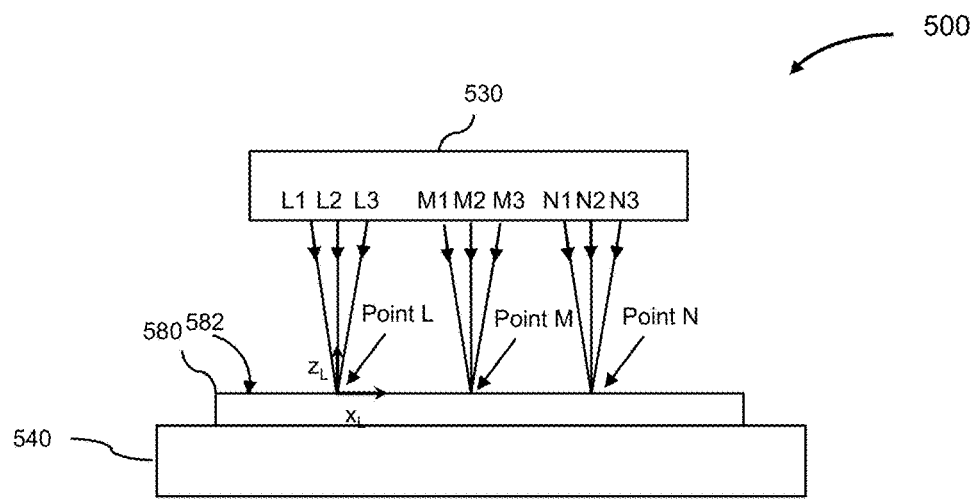
FIG. 5 is a schematic drawing depicting a side view of components of a 3DSM system during a data acquisition phase of a 3DSM method, according to an embodiment.

FIG. 5 is a schematic drawing showing a side view of components of a 3DSM system 500 during a time period of operation at which a camera takes multiple exposures, according to one embodiment. The 3DSM system 500 comprises an engineered illumination system 530 and a sample platform 540. A sample 580 with a surface 582 is shown disposed on the sample platform 540. At this instant in time, the engineered illumination system 530 is shown providing three (3) ray bundles including a first ray bundle of three (3) beams L1, L2, and L3 of various intensities at different incidence angles to a surface point L at the surface 582 of the sample 580, a second ray bundle of three (3) beams M1, M2, and M3 of various intensities at different incidence angles to a surface point M, and a third ray bundle of three (3) beams N1, N2, and N3 of various intensities at different incidence angles to a surface point N. Each of the ray bundles is directed along a 0 degree illumination direction normal to the surface 582. The 3DSM system 500 includes a local x-axis parallel to the surface 582 at each of points L, M, and N, a local z-axis normal to the surface 582 at each of points L, M, and N, and a local y-axis (not shown) orthogonal to each of x-axis and z-axis at each of points L, M, and N. The engineered illumination system 530 is configured to rotate each of the ray bundles to different rotational positions at different sample times during operation.

As mentioned above, the 3DSM system of various implementations includes an engineered illumination system configured to generate engineered illumination and manipulate the engineered illumination. The engineered illumination system includes one or more illumination devices, one or more optical elements, and a motion control device. Each illumination device includes one or more light sources. Various forms of light sources can be used, for example, a light emitting diode (LED), a laser, a tungsten, and/or halogen. In various implementations, each light source is a point light source. In another implementation, an illumination source is in the form of a one-dimensional or two-dimensional array of light sources such as, for example, a two dimensional LED matrix.

According to various implementations, the engineered illumination system comprises one or more optical elements that generate the ray bundle of illumination beams and propagate the illumination beams to the surface of the sample. Some examples of optical elements include a diffuser, a collimator, an optical fiber, optical fiber bundle, a light guide, a mirror, a beam splitter, a filter such as a bandpass colored filter or a polarization filter, and other suitable optics. In certain implementations, the one or more optical elements include at least a diffuser, a beam splitter, and a collimator.

According to various implementations, the engineered illumination system also includes a motion control device that is coupled to one or more components of the 3DSM system. The motion control device is configured to manipulate (rotate and/or translate) these components in order to provide relative rotation of one or more ray bundles with respect to the sample. In addition or alternatively, the motion control device is configured to manipulate these components to provide engineered illumination to different portions of a large area sample.

In embodiments having a motion control device configured to manipulate system components for relative rotation of one or more ray bundles, the motion control device translates and/or rotates these components to different positions so that each ray bundle of multiple illumination beams is rotated to N different rotational positions in two orthogonal directions. At each incident angle, the motion control device holds the position of these system components while a camera takes intensity measurements of light from the illuminated sample. The motion control device includes one or more suitable components for controlling motion such as, for example, actuators, motors, servos, etc. The number of rotations in two orthogonal directions can be of different values. In some aspects, the number of rotations is in the range of 100 to 500 rotations. In one aspect, the number of rotations is greater than 100 rotations. In one aspect, the number of rotations is 400 with 20 rotations along one direction and 20 rotations along a second direction orthogonal to the first direction. In another aspect, the number of rotations is 100 with 10 rotations along one direction and 10 rotations along a second direction orthogonal to the first direction. In another aspect, the number of rotations is 225 with 15 rotations along one direction and 15 rotations along a second direction orthogonal to the first direction.

In certain cases, the motion control device rotates one or more ray bundles by manipulating (translating and/or rotating) one or more optical elements of a 3DSM system. For example, the 3DSM system may have a mirror that is configured to receive illumination beams of the ray bundle. In this case, the mirror can be rotated using the motion control device to change the rotational position of the beams. In addition or alternatively, the motion control device may manipulate the camera to capture reflected light from the sample at different viewing directions. In one aspect, the motion control device may manipulate the beam splitter to rotate the ray bundles. In another aspect, the motion control device may also manipulate the illumination device(s) and optical element(s) together to rotate the ray bundles.

In some embodiments, the motion control device is configured to manipulate one or more system components to acquire intensity images for a portion of a sample (e.g., a large area sample) and then manipulates the one or more system components so that the sensor(s) of the camera can acquire intensity images for a different portion of the sample until intensity images over the entire large area sample are acquired. For example, the motion control device can translate the sample to different locations incrementally. In another example, the motion control device can translate the illumination device(s), optical element(s), and/or the camera relative to the sample. In one implementation, the motion control device includes an x-y stage. For example, the sample platform may be located on the x-y stage.

According to various implementations, a 3DSM system includes one or more cameras. Each camera has at least one imaging lens (e.g., a telecentric lens, a telephoto lens, or any lens with fixed or variable magnification) and one or more sensors configured to take intensity measurements (also referred to herein as "intensity images," as "images," and as "intensity distributions") during a data acquisition phase of a 3DSM method. In one aspect, each sensor is an image sensor. Some examples of suitable sensors are CMOS sensors, a charge-coupled device (CCD), and other similar devices. Some examples of suitable imaging lens are telecentric lens, telephoto lens, lens with fixed or variable magnification, and other similar devices. A commercially-available example of a suitable image sensor is the DCC3260C manufactured by Thorlabs. In one aspect, a 3DSM system includes one camera. In another aspect, the 3DSM system includes multiple cameras that can take images from multiple different views respectively.

According to various implementations, a 3DSM system includes one or more processors (e.g., microprocessors) for executing instructions stored in memory for implementing functions of the 3DSM system including operations of a 3DSM method. For example, the one or more processors may send control signals to the camera to control exposures to acquire intensity images during a data acquisition phase. The one or more processors may also perform operations of the 3DSM method to determine 3D surface microgeometry and reflectance properties of a sample based on the intensity images. In some cases, the instructions are stored to an internal memory device of the controller. The internal memory device can include a non-volatile memory array for storing processor-executable code (also referred to herein as "instructions") that is retrieved by the processor to perform various functions or operations described herein for carrying out various logic or other operations on the intensity measurements. The internal memory device also can store raw and/or processed intensity measurement data. In some implementations, the internal memory device or a separate memory device can additionally or alternatively include a volatile memory array for temporarily storing code to be executed as well as measurements to be processed, stored, or displayed. In some implementations, the controller itself can include volatile and in some instances also non-volatile memory.

According to various implementations, a 3DSM system includes a communication interface in electrical communication with the controller and a display in communication with the communication interface. The controller is configured or configurable to output raw intensity measurements or processed data over the communication interface for display on the display. In addition or alternatively, the controller can be output raw intensity measurements or processed data over a communication interface to an external computing system. Indeed, in some implementations, one or more of the functions of the 3DSM system may be performed by such an external computing system. In some implementations, the controller can be configured to store raw data as well as processed data over a communication interface to an external memory device.

III. Examples of 3DSM Systems and Methods

In various implementations, the 3DSM system performs a 3DSM method generally comprising a data acquisition phase and an analysis phase. Optionally, the 3DSM method also includes one or more of a display phase, a calibration phase, and a phase for calculating pre-determined sensor responses. During the data acquisition phase, one or more ray bundles are rotated to N different illumination directions and at each illumination direction, n intensity images are captured at different exposure settings by the camera. During the analysis phase, the surface normal at each surface pixel is determined. To determine the surface normal, the 3DSM method generates a measured sensor response from the captured intensity images for each surface pixel, matches the measured response to one of a group of pre-determined sensor responses for different surface normals, and constructs a map of the surface normals over the surface of the sample (also referred to herein as the "object"). Optionally, during the analysis phase, the 3DSM method may also determine properties of the surface based on the map of the surface normals. Because the illumination is engineered with a known distribution, a sensor response can be pre-calculated by taking a convolution of the engineered beam distribution function with all the possible surface normal directions at different illumination directions. The surface normal can then be determined based on the best matching between captured sensor response and the pre-determined sensor response. A depth map can then be estimated from the surface normals. Reflectance properties, such as diffuse albedo, specular albedo and roughness can be estimated based on a BRDF model, such as the Ward model, the Cook-Torrance model and the Blinn-Phong Model.

Various configurations of 3DSM systems for implementing 3DSM methods are described in this section. Certain details of the 3DSM methods of various embodiments are described in detail in Section V. Certain illustrations described in this section include some components of 3DSM systems in order to discuss particular operations of 3DSM methods. It would be understood that only some of the components are illustrated in these simplified examples and that the illustrated 3DSM systems include additional system components such as those described with respect to FIG. 2.

Figure 6A:
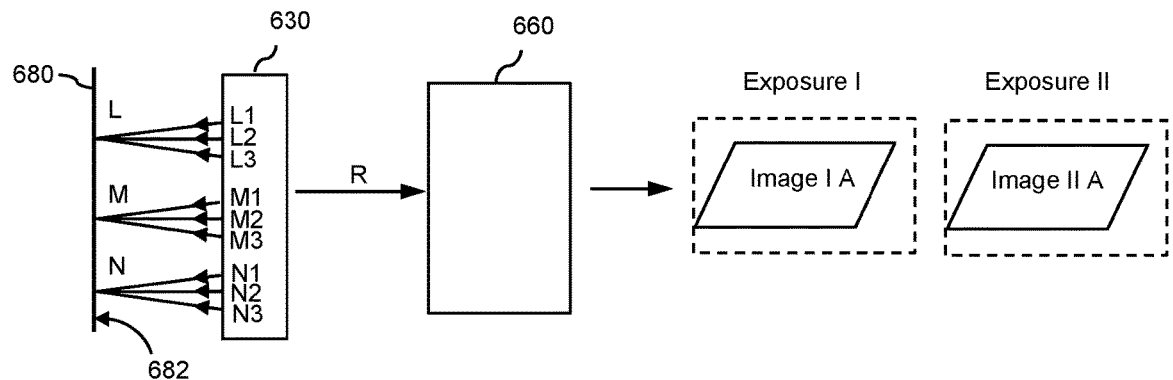
FIGS. 6A-6C are schematic diagrams depicting three operations of a data acquisition phase of a 3DSM method performed by a 3DSM system, according to various embodiments.
Figure 6B:
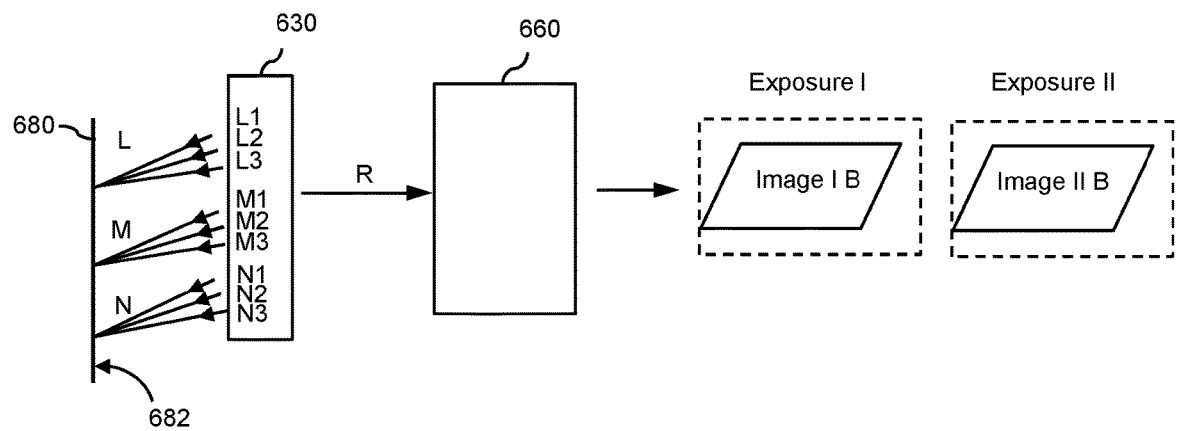
Figure 6C:
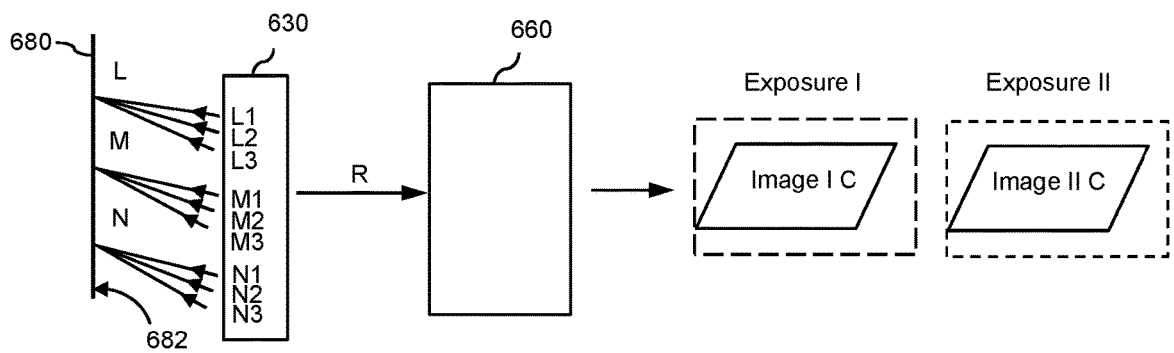
Figure 6D:
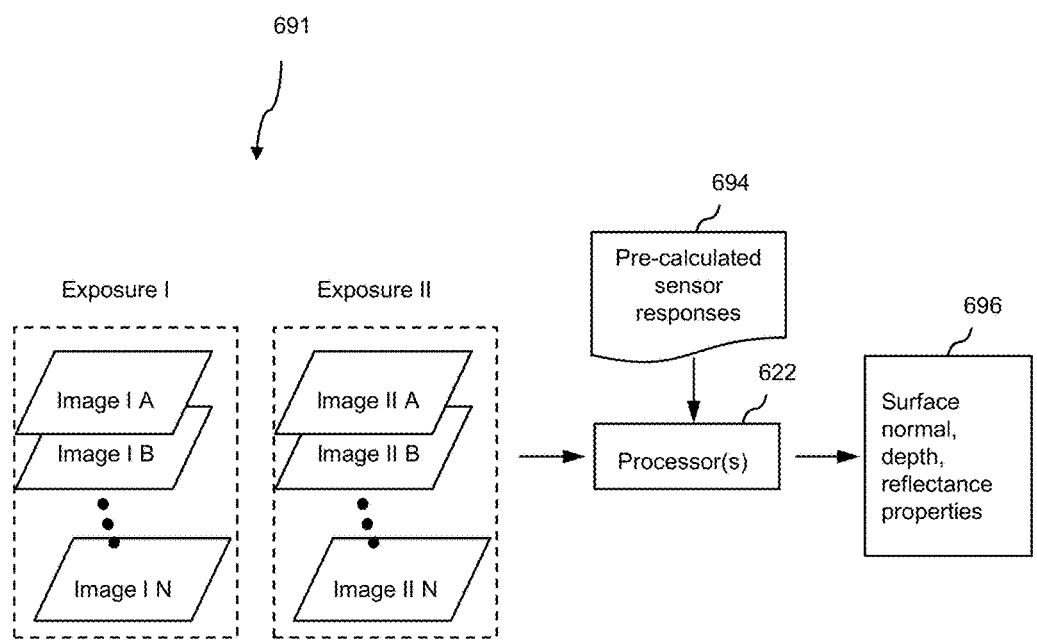
FIG. 6D is a schematic diagram depicting a general approach taken during an analysis phase performed by the 3DSM system of FIGS. 6A-6C, according to various embodiments.

FIGS. 6A-6C are schematic diagrams illustrating three operations of an data acquisition phase performed by a 3DSM system, according to various implementations. FIG. 6D is a schematic diagram of operations in an analysis phase of the 3DSM method performed by the 3DSM system of FIGS. 6A-6C, according to various embodiments. The operations in the illustrated analysis phase use the intensity images captured during the data acquisition phase illustrated in FIGS. 6A-6C to determine surface normals at each point along the surface and determine a depth map and/or reflectance properties based on the surface normals.

In FIGS. 6A-6C, components of the 3DSM system are shown to include an engineered illumination system 630 and a camera 660. The 3DSM system also includes one or more processor(s) 622 shown in FIG. 6D. In the illustrated operations of the data acquisition phase in FIGS. 6A-6C, the engineered illumination system 630 is shown providing the three L, M, and N ray bundles: a first ray bundle is incident on a point L of the surface 682 of an sample 680, a second ray bundle is incident on a point M of the surface 682 of an sample 680, and a third ray bundle is incident on a point N of the surface 682 of an sample 680.

Although three ray bundles are shown in FIGS. 6A-6C and other examples for simplicity, it would be understood that the engineered illumination system can provide engineered illumination with an unlimited number of ray bundles, and that the incident illumination is two-dimensional and can illuminate the entire surface or the entire area of the surface being analyzed. In each ray bundle, there are an infinite number of illumination beams, although three beams are shown for simplicity. Each of the ray bundles is engineered illumination that can have power values that follow certain distributions such as, for example, a Gaussian distribution, a triangular distribution, a linear distribution, a random distribution, etc. During the data acquisition phase performed by the illustrated 3DSM system, the ray bundles are rotated to N different illumination directions.

FIGS. 6A-6C shows the data acquisition operations at three of the N illumination directions. As shown, the ray bundles are rotated to three different illumination directions as shown sequentially in FIGS. 6A-6C. The reflected light R from the sample 680 propagates to the camera 660 and multiple images are captured with different exposure settings. At each illumination direction of the ray bundles shown FIGS. 6A-6C, one or more sensors of the camera are exposed twice, at different exposure settings, to capture two intensity images. In FIG. 6A, the camera 660 uses an Exposure I setting to capture "Image IA" and an Exposure II setting to capture "Image IIA." In FIG. 6B, the camera 660 uses an Exposure I setting to capture "Image IB" and an Exposure II setting to capture "Image IIB." In FIG. 1C, the camera 660 uses an Exposure I setting to capture "Image IC" and an Exposure II setting to capture "Image IIC." In another embodiment, additional images may be captured at each illumination direction. Although the illustrated example shows a particular angular range of illumination directions, the data acquisition phase may include a larger angular sampling to capture a more diverse bidirectional reflectance distribution function (BRDF) in other examples. In one case, for example, an angular sampling of −45 degree to +45 degree with 1 degree step can be used.

In FIG. 6D, the images 691 captured under N different illumination directions and under different exposure (Exposure I and Exposure II) settings are received by one or more processors 622 of the 3DSM system in a signal from the camera 660 (shown in FIGS. 6A-6C). Because the illumination is engineered with a known distribution, a sensor response 694 can be pre-determined by the one or more processors by taking a convolution of the engineered beam distribution function with all the possible surface normal directions at different illumination directions. Generating the pre-determined sensor response can be performed during the analysis phase or during a process before the data acquisition phase, for example, during an optional calibration process. During the analysis phase, the one or more processors determine the surface normal at each surface pixel based on the best matching between the captured sensor response and the pre-determined sensor response. The one or more processors can then estimate a depth map from the surface normals. In addition or alternatively, the one or more processors can determine reflectance properties, such as diffuse albedo, specular albedo and roughness can be estimated based on a BRDF model, such as the Ward model, the Cook-Torrance model and the Blinn-Phong Model.

In various implementations, a 3DSM system captures multiple intensity measurements with different exposure settings at each illumination direction of the ray bundles. For example, one intensity measurement may be taken at an exposure setting of 1 millisecond and a second intensity measurement may be taken at an exposure setting of 100 millisecond. Generally, capturing multiple exposures allows for a high dynamic range image to be captured.

In implementations with a large area sample, during the data acquisition phase the sample is translated to different translational positions and images are captured for a smaller field of view at each translational position. For example, the 3DSM system might include an x-y translation stage used to translate the sample along x and y directions. Once the images are captured at each of the smaller fields of view, the normal map, depth map and reflectance property images determined for each smaller field of view and can be stitched together to achieve a larger field-of-view.

In one implementation, a 3DSM system includes a first polarization filter that is configured so that the engineered illumination passes through the first polarization filter before propagating to the sample. The 3DSM system also includes a second polarization filter that is placed in front of the camera. By changing the polarization stages of the second polarization filter placed in front of the camera, the diffuse and specular albedo images can be captured separately and then fitted into a BRDF model to determine other reflectance properties In various embodiments, the illumination direction of ray bundles is changed rapidly. For example, the illumination direction may be changed at a rate of 100 degree per second. In addition, the sensors may take intensity measurements at a rate of 100 frames per second.

Figure 7:
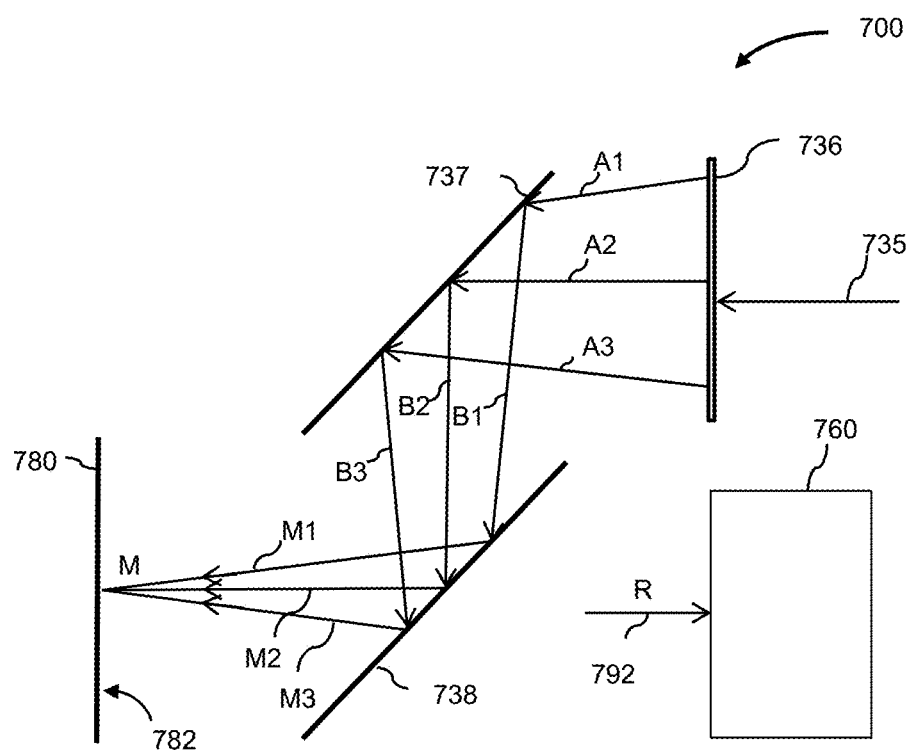
FIG. 7 is a schematic drawing depicting a 3DSM system configured to generate engineered illumination using collimated illumination and a diffuser, according to an embodiment.

FIG. 7 is a schematic drawing of a 3DSM system 700, according to an embodiment. The 3DSM system 700 comprises an engineered illumination system having optical elements of a diffuser 736, a mirror 737, and a beam-splitter 738. The engineered illumination system further comprises collimated illumination 735 from an illumination device (not shown). The 3DSM system 700 further comprises a camera 760. During the illustrated data acquisition phase, the diffuser 736 receives collimated illumination 735 and the collimated illumination is transmitted through the diffuser 736 spreading the illumination based on the diffuser's transmittance which typically follows a distribution such as a Gaussian distribution. For example, the diffuser 736 may have one of the transmission profiles shown in FIG. 3A. In FIG. 7, the diffuser 736 spreads out the collimated illumination into three illumination beams A1, A2, and A3. The illumination beams A1, A2 and A3 are with different intensities after being transmitting through the diffuser 736. The illumination beam A2 has the highest intensity and illumination beams A1 and A3 have lower intensities. The mirror 737 receives the three illumination beams A1, A2, and A3 and reflects these beams. The beam splitter 738 receives the reflected beams B1, B2, and B3 from the mirror 737 and reflects these beams. The reflected beams M1, M2, and M3 are propagated to the point M at the surface 782 of the sample 780. In the illustration, a ray bundle of three illumination beams M1, M2, and M3 is shown for simplicity, it would be understood that the engineered illumination provided to point M has an infinite number of illumination beams. In the illustration, only one ray bundle is shown at surface point M, it would be understood that infinite number of surface points receive infinite number of engineered illumination bundles. The surface 782 reflects an illumination beam and the reflected beam 792 is transmitted through the beam splitter 738 and received at the camera 760. The intensity distribution of the incident beams M1, M2, and M3 is the same of illumination beams A1, A2, and A3. That is, the incident beams M1, M2, and M3 are engineered with a known distribution function which is the same distribution function of the illumination beams A1-A3. Although three beams are shown for simplicity, it would be understood that the same would apply for a larger number of beams.

Figure 8:
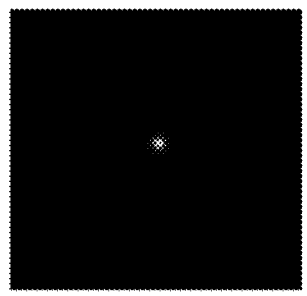
FIG. 8 is a sensor response image captured without engineered illumination.

FIG. 8 is a sensor response captured without engineered illumination. In this example, the intensity image is captured with incident light parallel to a camera's optical axis. The incident beam is not engineered and is only collimated illumination. The sample is a chrome sphere which has mirror-like reflection and surface normal elevation angle changed from 0 to 90 degree.

Figure 9:
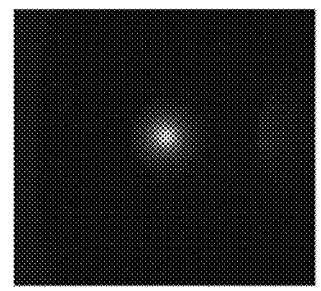
FIG. 9 is a sensor response image captured with engineered illumination provided by the 3DSM system shown in FIG. 7, according to an embodiment.

FIG. 9 is a sensor response determined using the 3DSM system of FIG. 7. In this example, the intensity image is captured with engineered illumination following a Gaussian distribution implemented with the use of a diffuser. By comparing the intensity images of FIG. 8 and FIG. 9, it is shown that under regular collimated illumination as illustrated in FIG. 8, only a few pixels of the camera measure intensity. In this case, the limited number of pixel values would be available to estimate a surface normal. In comparison, under engineered illumination as shown in FIG. 9, the sensor response is much broader, and many more pixel values can be used for surface normal estimation. Technical advantages of certain embodiments using engineering illumination with a known distribution function over using collimated light may include that the spatial range of surface normals to be constructed can be significantly increased and/or each surface normal can be estimated with higher angular resolution.

Figure 10A:
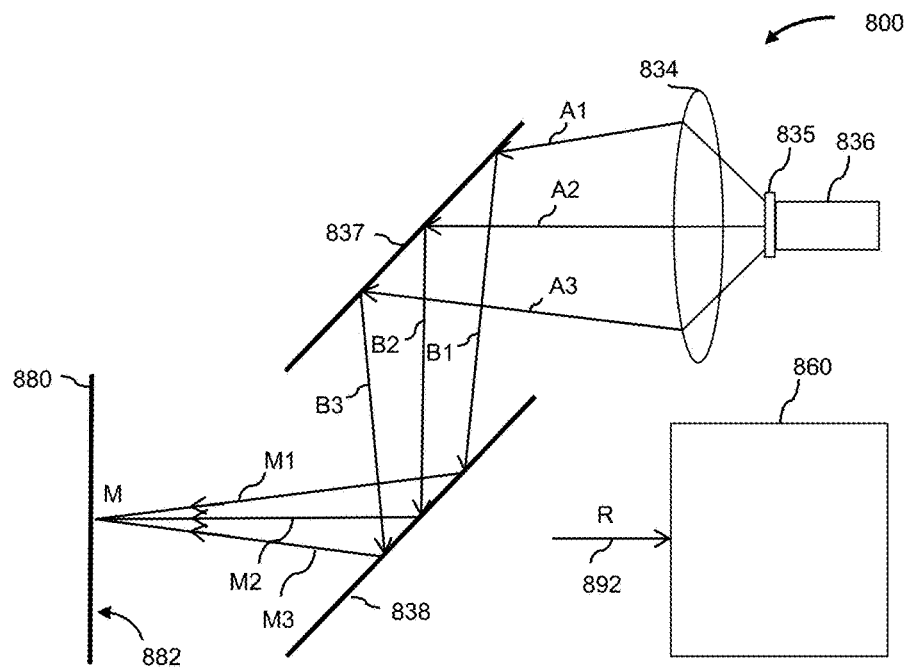
FIG. 10A is a schematic drawing depicting components of a 3DSM system including a combination filter, according to an embodiment.
Figure 10B:
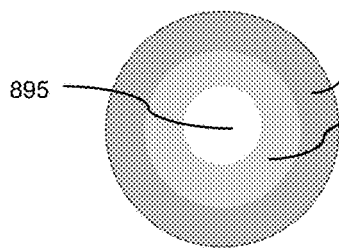
FIG. 10B is an illustration of a transmittance profile of a combination filter, according to an implementation.
Figure 10C:
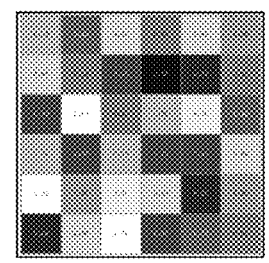
FIG. 10C is an illustration of a transmittance profile of a combination filter, according to an implementation.
Figure 10D:
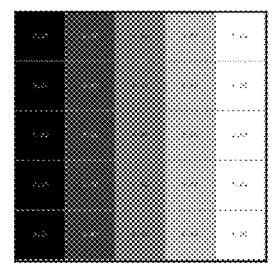
FIG. 10D an illustration of a transmittance profile of a combination filter with a linear gradient, according to an implementation.

FIG. 10A is a schematic drawing of components of a 3DSM system 800, according to an embodiment. The 3DSM system 800 comprises an engineered illumination system having optical elements including a collimator 834, a fiber bundle 836, a combination filter 835, a mirror 837, and a beam-splitter 838. The 3DSM system 800 further comprises a camera 860. FIG. 10B shows an example layout of the combination filter 835 shown in FIG. 10A, according to one implementations. In FIG. 10B, the combination filter 835 is a combination of three neutral density (ND) filters with annulus shape: a first ND filter 895, a second ND filter 896, and a third ND filter 897. Although three ND filters are shown, other implementations may use additional filters. The first ND filter 895 in the middle has the highest transmittance, and transmittance of the second ND filter 896 and the third ND filter 897 is gradually decreased. FIG. 10C is another example layout of the combination filter 835 shown in FIG. 10A, according to an implementation. In this example, the filter has a randomly distributed transmission. FIG. 10D is another example of the combination filter 835 shown in FIG. 10A, according to an implementation. In this example, the filter has a linear gradient distributed transmission.

Returning to FIG. 10A, during the illustrated data acquisition phase, illumination passes through the fiber bundle 836 to the combination filter 835. The illumination passing through the different partitions of the combination filter 835 are engineered into three beams with different intensities from different points on combination filter 835. After passing through the collimator 834, the beams A1, A2, and A3 have different intensities, which is similar to the beams from the diffuser 736 shown in the configuration of FIG. 7. The illumination beam A2 has the highest intensity and illumination beams A1 and A3 have lower intensities. The mirror 837 receives the three illumination beams A1, A2, and A3 and reflects these beams. The beam splitter 838 receives the reflected beams B1, B2, and B3 from the mirror 837 and reflects these beams. The reflected beams M1, M2, and M3 are propagated to the point M at the surface 882 of the sample 880. In the illustration, a ray bundle of three illumination beams M1, M2, and M3 is shown for simplicity, it would be understood that the engineered illumination provided to point M has an infinite number of illumination beams. The surface 882 reflects an illumination beam and the reflected beam 892 is transmitted through the beam splitter 838 and received at the camera 860. The intensity distribution of the incident beams M1, M2, and M3 is the same as the intensity distribution of illumination beams A1, A2, and A3.

Figure 41:
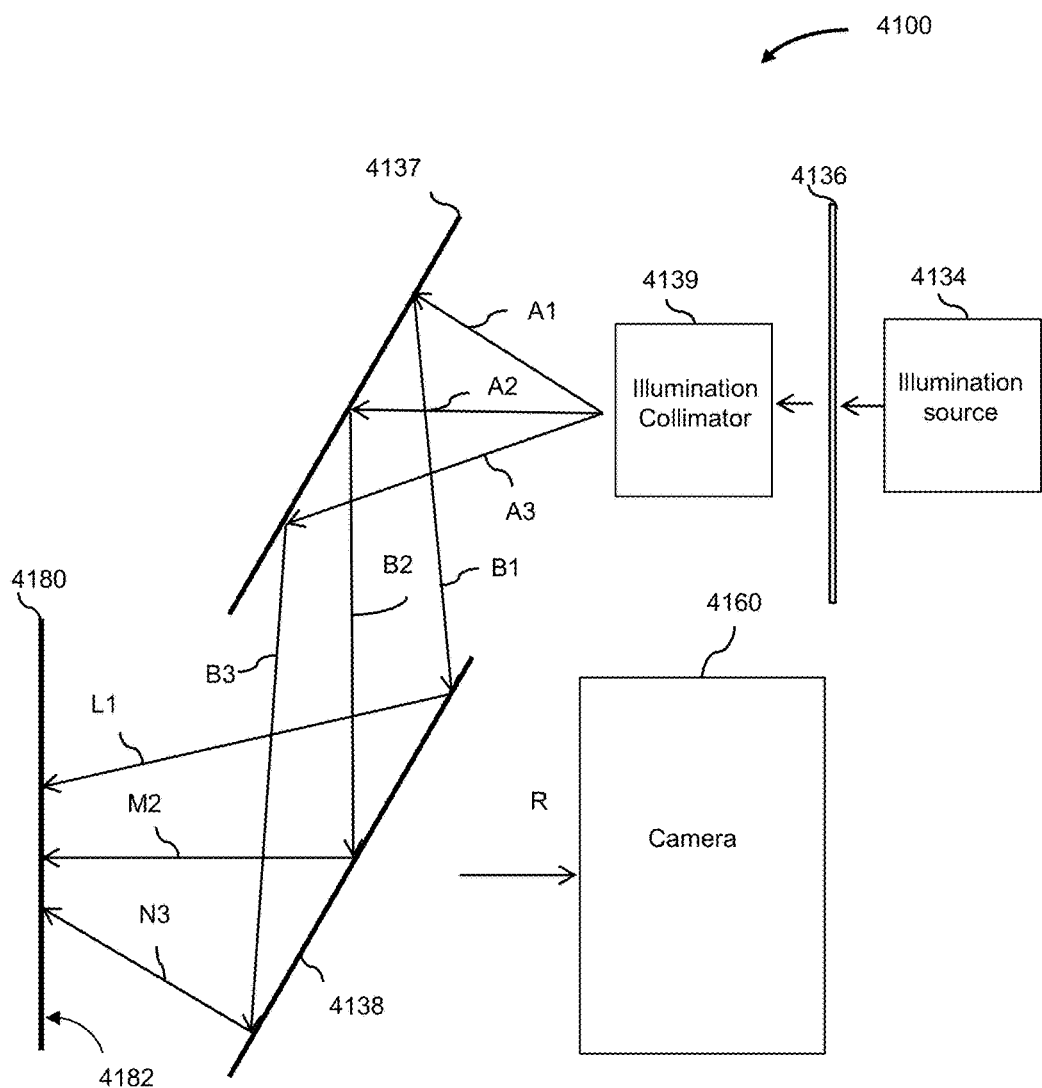
FIG. 41 is a schematic drawing depicting a data acquisition operation of a 3DSM system, according to an embodiment.

FIG. 41 is a schematic drawing depicting a data acquisition operation of a 3DSM system 4100, according to an embodiment. The 3DSM system 4100 comprises an illumination source 4134 and an engineered illumination system having optical elements including a diffuser 4136, an illumination collimator 4139, a mirror 4137, and a beam-splitter 4138. The 3DSM system 4100 further comprises a camera 4160. During the illustrated data acquisition phase, the light from an illumination source 4134 is passed through the diffuser 4136, which is engineered with certain transmission distribution, such as a Gaussian distribution. The light passed through the diffuser 4136 is then collimated by an illumination collimator 4139. The beams A1, A2, and A3 are further reflected by a beam splitter 4138 and are projected onto a surface 4182 of a sample 4180. The incident beams L1, M2, and N3 are also engineered with a known intensity distribution that follows the transmission profile of the diffuser 4136.

A. Manipulation of Illumination Direction

Figure 11A:
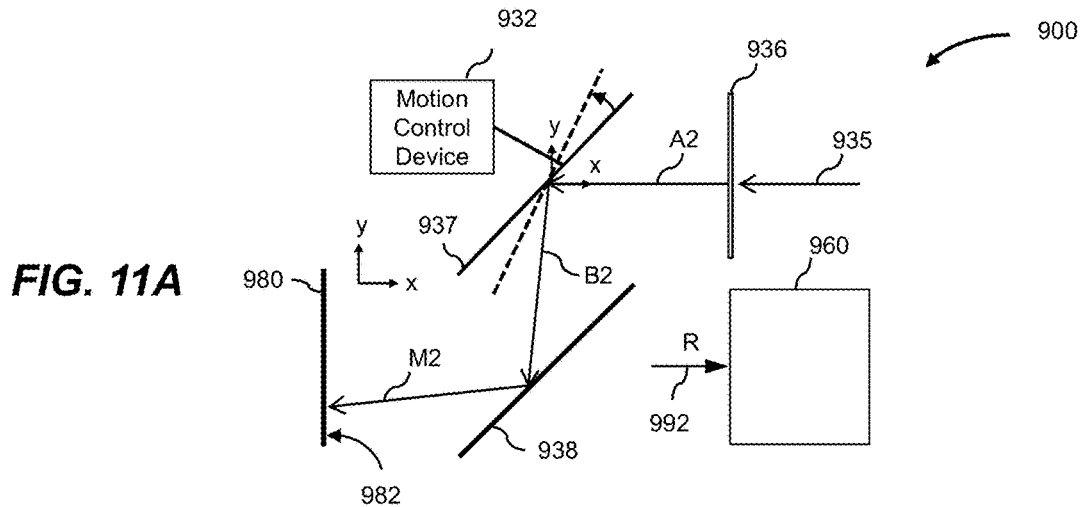
FIGS. 11A-11B are schematic diagrams depicting two operations of a data acquisition phase of a 3DSM method performed by a 3DSM system configured for engineered illumination direction manipulation, according to an embodiment.
Figure 11B:
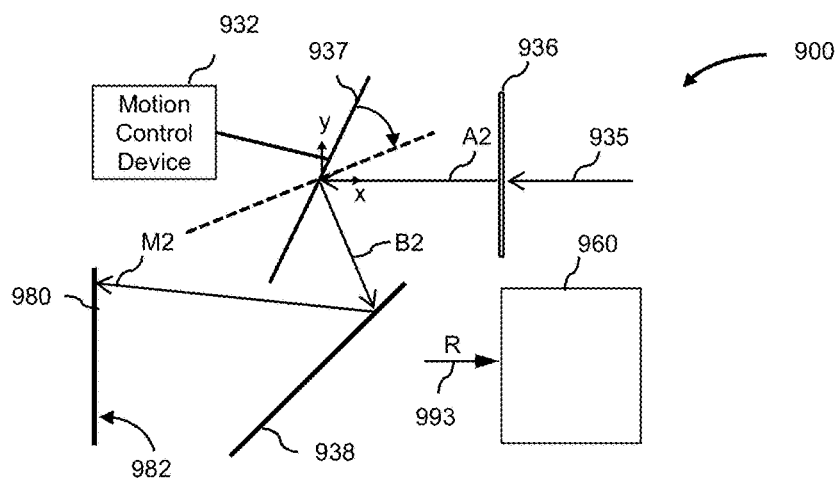
Figure 12:
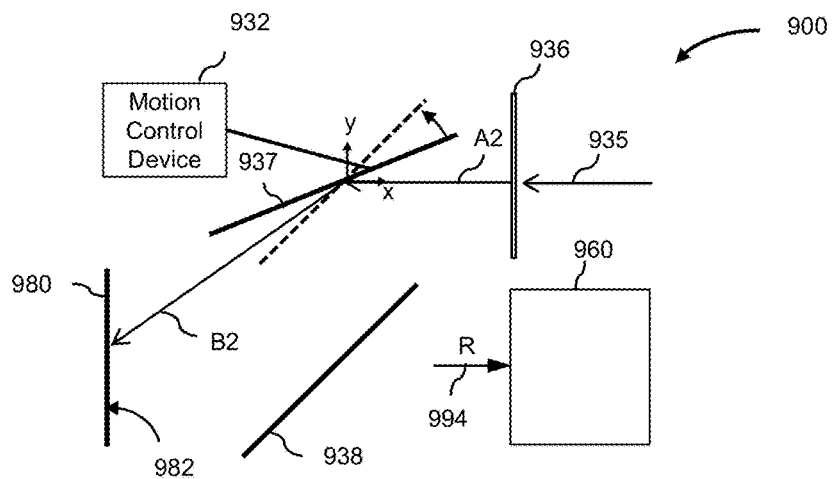
FIG. 12 is a schematic diagram depicting an operation of a data acquisition phase of a 3DSM method performed by a 3DSM system, according to an embodiment.

In certain implementations, a 3DSM system is configured to manipulate the illumination direction of one or more ray bundles. For example, a 3DSM system may include a moving mirror to manipulate the direction of illumination beams reflected from the mirror. FIGS. 11A-11B are schematic diagrams illustrating data acquisition operations performed by a 3DSM system 900 with a rotating (spinning) mirror 937, according to an aspect. FIG. 12 is a schematic diagram illustrating a data acquisition operation performed by the 3DSM system 900 of FIGS. 11A-B. In one case, the diagrams in FIGS. 11A-11B and FIG. 12 illustrate three operations of a data acquisition phase. In another case, the diagrams in FIGS. 11A-11B illustrate two operations of operations of a data acquisition phase and the diagram in FIG. 12 illustrates an operation of another data acquisition phase.

The 3DSM system 900 comprises an engineered illumination system having optical elements including a diffuser 936, a rotating mirror 937, and a beam-splitter 938. The engineered illumination system also includes collimated illumination 935 from an illumination device (not shown). The 3DSM system 900 further comprises a camera 960, for example, of a camera. The 3DSM system 900 also includes an x-axis, a y-axis, and a z-axis (not shown) orthogonal to the x-axis and the y-axis. The 3DSM system 900 also includes a motion control device 932 coupled to the rotating mirror 937. The motion control device 932 is configured to rotate the rotating mirror 937 about the x-axis and the z-axis (two orthogonal rotational directions). The illustrations show the rotating mirror 937 being rotated about the z-axis between a first position (dotted line) and the current second position (solid line).

In FIGS. 11A and 11B, the diffuser 936 receives collimated illumination 935 and the collimated illumination is transmitted through the diffuser 936 spreading the illumination based on the diffuser's transmittance distribution. The mirror 937 receives the illumination beam A2 and reflects it. The beam splitter 938 receives the reflected beam B2 from the mirror 937 and reflects it. The reflected beam M2 is propagated to a point at the surface 982 of the sample 980. A surface 982 of a sample 980 reflects the illumination beam and the reflected beam 992, 993 is transmitted through the beam splitter 938 and the reflected transmitted beam 992, 993 is received at the camera 960.

In FIG. 12, the diffuser 936 receives collimated illumination 935 and the collimated illumination is transmitted through the diffuser 936 spreading the illumination based on the diffuser's transmittance distribution. The rotating mirror 937 receives the illumination beam A2 and reflects it. The surface 982 of the sample 980 reflects the illumination beam B2 and the reflected beam 994 is transmitted through the beam splitter 938 and the reflected transmitted beam 994 is received at the camera 960. The reflected transmitted beam 994 is received at the camera 960. In FIG. 12, when the rotating mirror 937 is oriented with a large oblique angle, the illumination beam B2 is directly reflected from the rotating mirror 937 onto the surface 982 without bouncing from the beam splitter 938. This illustrated configuration allows for a much larger beam incident angle.

In FIGS. 11A-11B, the direction of the incident illumination beam M2 can be changed by rapidly spinning the rotating mirror 937 with the motion control device 932, such as a rotation stage, a gimbal mount or a goniometer. In FIG. 12, the direction of the incident illumination beam B2 can be changed by rapidly spinning the rotating mirror 937 with the motion control device 932. Although a single incident beam is shown in FIGS. 11A-B and FIG. 12, it would be understood that the same system configuration can be used to direct incident beam bundles of illumination beams across the full field-of-view such as shown in FIGS. 6A-6C.

A 3DSM system configured to manipulate the engineered illumination direction of one or more ray bundles with a spinning mirror may provide one or more technical advantages. First, one technical advantage is that a large number of angular samplings of the BRDF can be captured around the predominant surface normal, and very fine sampling step may be achieved by adjusting the mirror spinning angle. Such an approach may allow for unbiased estimation of surface normals for specular surfaces that are relatively smoother. Second, one technical advantage is that this implementations may avoid shadow effects, which are common for photometric stereo techniques. Third, another technical advantage is that by using engineered illumination the range of surface normals that can be estimated is significantly extended. If not using engineered illumination, the range of surface normals to be estimated is solely determined by the scanning range of the incident light. But with engineered illumination the range of surface normals that can be measured is increased, and the enhancement is proportional to the bandwidth of the engineered illumination distribution. Fourth, another technical advantage is that the camera and illumination do not need to be placed at far distance in order to fulfill the orthographic assumptions. Therefore, the whole system can be built in a compact form factor and is able to capture data at a closer distance to achieve better spatial and depth resolution and accuracy.

Figure 13:
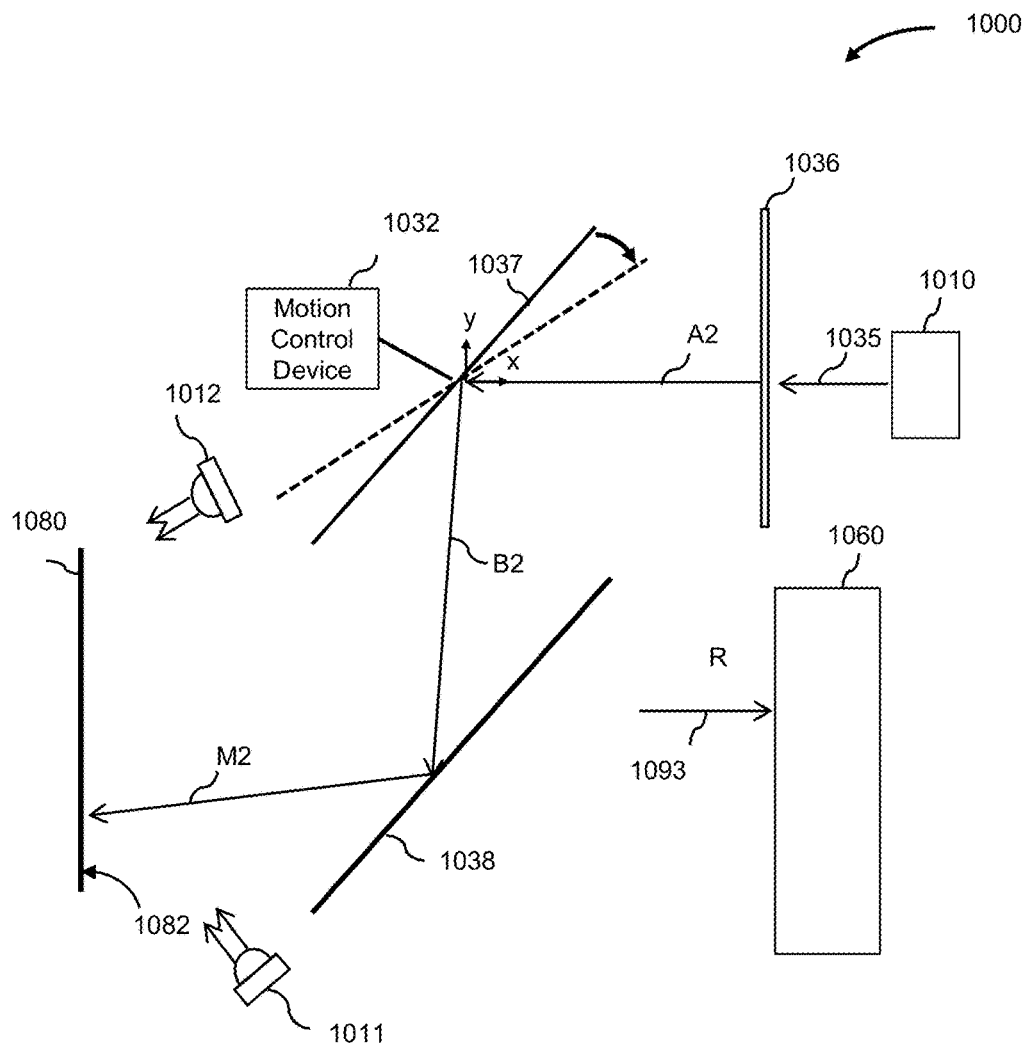
FIG. 13 is a schematic drawing depicting components of a 3DSM system including additional illumination devices, according to an embodiment.

For samples having surfaces with large slopes, additional illumination sources can be included at an oblique angle to improve estimation. FIG. 13 illustrates an example of the placement of additional illumination sources. Although only two illumination sources are shown in the illustrated example, additional sources may be used in other embodiments.

FIG. 13 is a schematic diagram illustrating a 3DSM system 1000 with a rotating (spinning) mirror 1037, according to an aspect. The 3DSM system 1000 comprises an engineered illumination system having optical elements including a diffuser 1036, a rotating mirror 1037, and a beam-splitter 1038. The engineered illumination system also includes three illumination devices: a first illumination device 1010 configured to provide collimated illumination 1035, a second illumination device 1011, and a third light source 1012. The 3DSM system 1000 further comprises a camera 1060. The 3DSM system 1000 also includes an x-axis, a y-axis, and a z-axis (not shown) orthogonal to the x-axis and the y-axis. The 3DSM system 1000 also includes a motion control device 1032 coupled to the rotating mirror 1037. The motion control device 1032 is configured to rotate the rotating mirror 1037 about the x-axis and the z-axis (two orthogonal rotational directions). The illustrations show the rotating mirror 1037 being rotated about the z-axis between a first position (dotted line) and the current second position (solid line). The diffuser 1036 receives collimated illumination 1035 and the collimated illumination is transmitted through the diffuser 1036 spreading the illumination based on the diffuser's transmittance distribution. Although a single illumination beam from the diffuser 1036 is shown for simplicity, it would be understood that multiple beams are passed to the rotating mirror 1037. The rotating mirror 1037 receives the illumination beam A2 and reflects it. The beam splitter 1038 receives the reflected beam B2 from the mirror 1037 and reflects it. The reflected beam M2 is propagated to a point at the surface 1082 of the sample 1080. A surface 1082 of a sample 1080 reflects the incident beam. Illumination reflected from the surface 1082 is transmitted through the beam splitter 1038. The beam 1093 propagated from the beam splitter 1038 is received at the camera 1060.

Figure 14A:
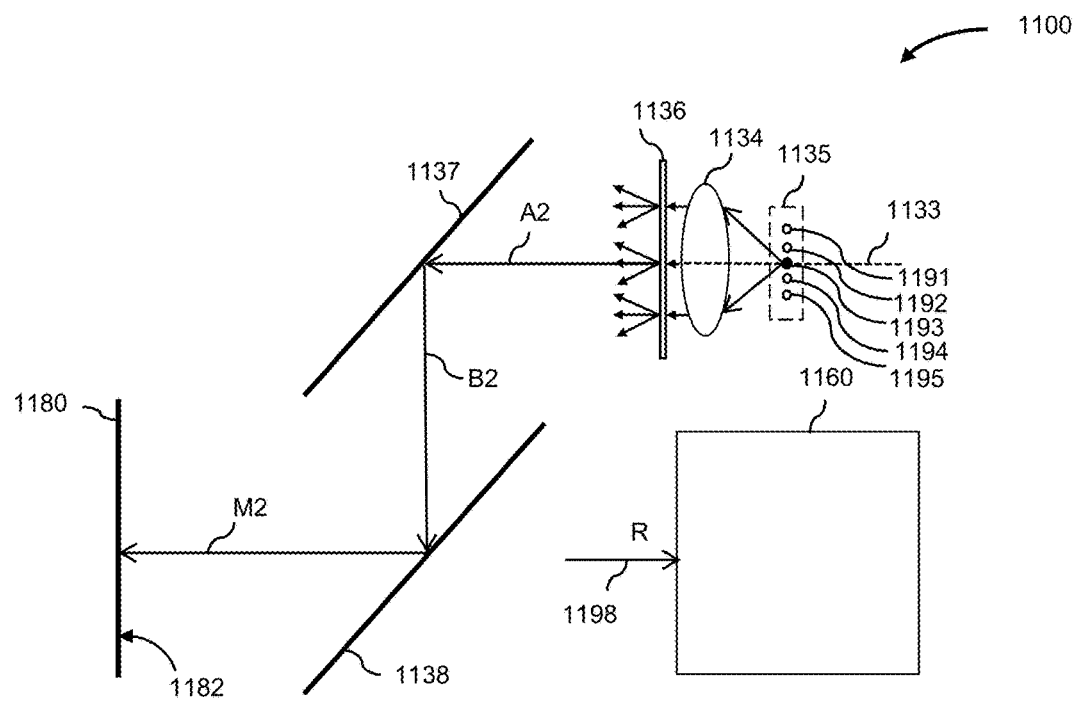
FIGS. 14A-14B are schematic diagrams depicting components of a 3DSM system configured for illumination direction manipulation, according to an embodiment.
Figure 14B:
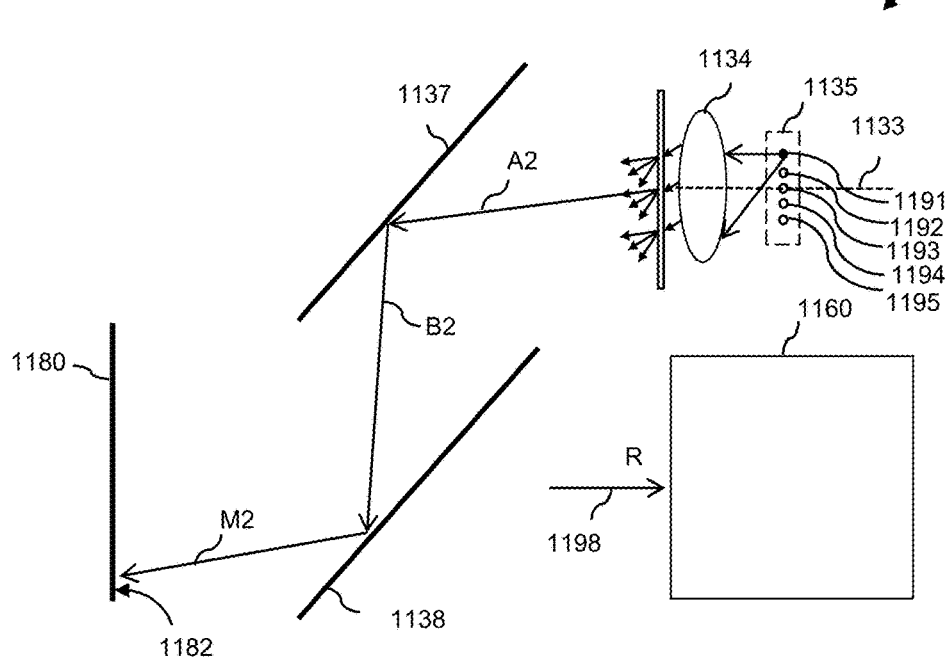

FIGS. 14A-14B are schematic diagrams illustrating data acquisition operations performed by a 3DSM system 1100 configured for illumination direction manipulation, according to an embodiment. The 3DSM system 1100 comprises an engineered illumination system having optical elements including a diffuser 1136, a collimator 1134 with an optical axis 1133, an illumination array 1135, a mirror 1137, and a beam-splitter 1138. The 3DSM system 1100 further comprises a camera 1160. As shown, the illumination array 1135 is placed behind the collimator 1134.

Different types of illumination can be used in the illumination array 1135, such as LEDs and optical fibers. In the illustrated example, the middle illumination element (e.g., LED) is located at the focal point of the collimator 1134. In other examples, other positions may be used. Each circle of the illumination array 1135 represents an individual illumination element. A solid circle denotes an illumination element that is turned on, and empty circle represent an illumination that is turned off. By turning each individual illumination element on and off, the direction of incident beam M2 to the surface 1182 of the sample 1180 can be manipulated. In FIGS. 14A-14B, the illumination array 1135 includes five illumination elements 1191, 1192, 1193, 1194, and 1195. In other example, more or fewer illumination elements can be used. In FIG. 14A, the middle illumination element 1193 of the illumination array 1135 is illuminated. In FIG. 14B, an illumination element 1191 of the illumination array 1135 is illuminated. The collimator 1134 receives the illumination from the activated element.

In the operations illustrated in FIGS. 14A-14B, the diffuser 1136 receives collimated illumination from the collimator 1134. Illumination transmitted through the diffuser 1136 is spread based on the diffuser's transmittance distribution. The mirror 1137 receives the illumination beams and reflects them. For simplicity, a single beam A2 is shown reflected by mirror 1137. The beam splitter 1138 receives the reflected beam B2 from the mirror 1137 and reflects it. The reflected beam M2 is propagated to a point at the surface 1182 of the sample 1180. A surface 1182 of a sample 1180 reflects the illumination beam and the reflected beam 1198 is transmitted through the beam splitter 1138 and the reflected transmitted beam 1198 is received at camera 1160. During operation, the 3DSM system 1100 can manipulate the direction of the incident beam M2 by turning individual illumination elements on and off.

B. Calibration Process

In certain implementations, the 3DSM system generates engineered illumination of ray bundles that are aligned to the same direction. In FIG. 6A-6C, for example, the center illumination beams L2, M2, and N2 of the three ray bundles are parallel to each other. In other implementations, however, the illumination beams may diverge or converge due to imperfect beam collimation. In one implementation, the 3DSM includes a calibration process that can be used to estimate the offset of the incident beams from the ideal condition discussed above.

The directions of incident beams in a 3DSM system (e.g., incident beams L2, M2, and N2 in FIGS. 6A-6C) can be controlled by illumination control (e.g., using the spinning mirror 937 in FIG. 11A) or based on the knowledge of an illumination array (e.g., illumination array 1135 in FIG. 14A). To account for misalignments in a 3DSM system, a calibration process can be used to determine offsets and the offsets can be accounted for in the analysis phase.

Below are examples of calibration processes that use various elements as reference objects. The illustrated examples can be used in any of the system configurations described herein.

1. Mirror

Figure 15A:
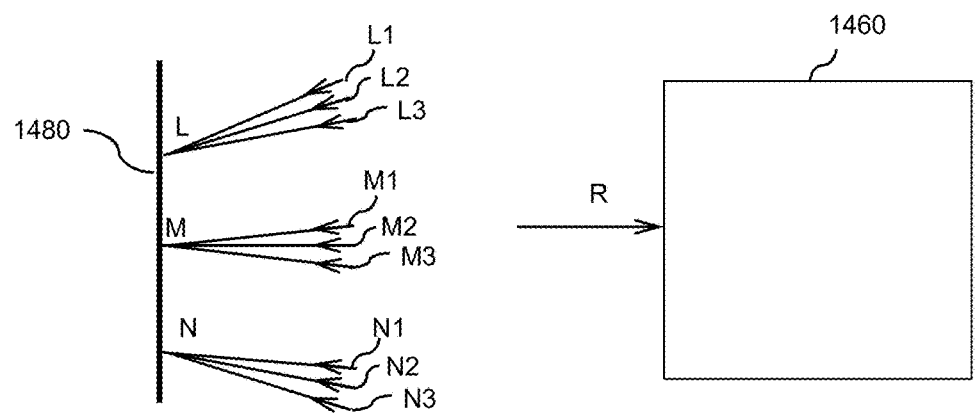
FIGS. 15A-15C are schematic diagrams depicting a calibration process using a mirror as a reference object performed by a 3DSM system, according to an embodiment.
Figure 15B:
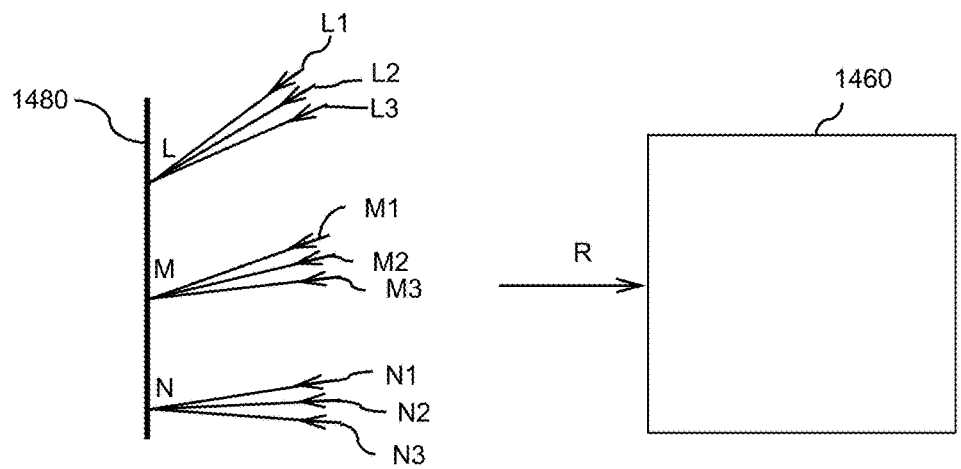
Figure 15C:
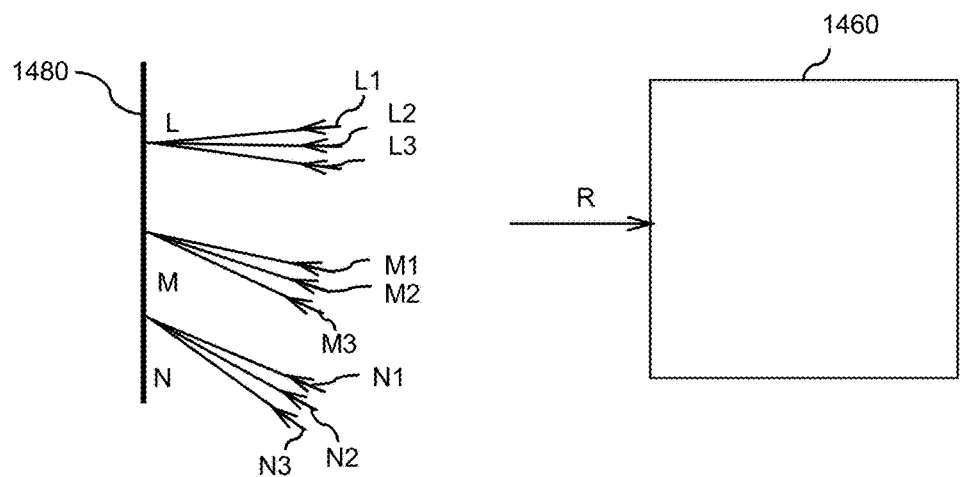

In other implementations, a system calibration process uses a mirror. One example of a system calibration process using a mirror 1480 is shown in FIGS. 15A-15C, in accordance with an embodiment. FIGS. 15A-15C illustrate three data acquisition operations during the calibration process implemented by a 3DSM system, according to an embodiment. During the calibration process, the mirror 1480 is placed as the sample being analyzed by the 3DSM system, and directions of the incident beams are changed. The 3DSM system includes a camera 1460. During the calibration process, the illumination reflected from mirror 1480 is received at the camera 1460 and intensity images are captured at all the different directions. FIGS. 15A-15C illustrate three directions of the incident beams. The 3DSM system has one or more processors (e.g., processor(s) 22 in FIG. 2) that can calibrate the deviation of the incident beams based on the reflection from the mirror 1480.

Figure 16A:
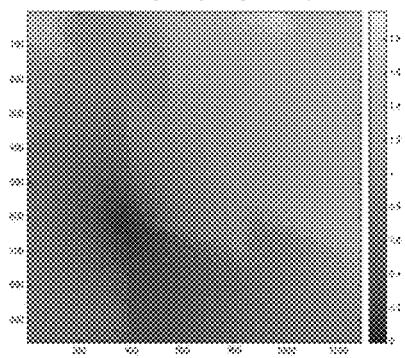
FIGS. 16A-16B are illustrations of an offset of incident beams resulting from the calibration process depicted in FIGS. 15A-15C, according to an implementation.
Figure 16B:
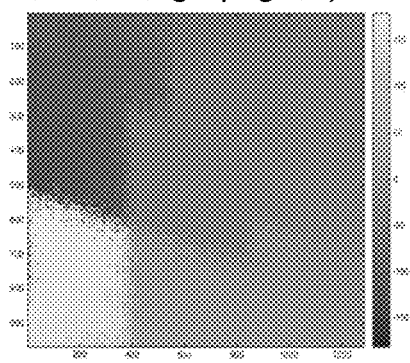

FIGS. 16A-16B are illustrations showing the calibrated offset of incident beams resulting from the calibration process using a mirror, according to an embodiment. FIG. 16A shows an illustration of the calibrated offset of incident beams in terms of the zenith angle at each pixel. FIG. 16B shows an illustration of the calibrated offset of incident beams in terms of the azimuth angle at each pixel. Ideally the values for the zenith angle and azimuth angle should be the same at each pixel if a perfect collimation is achieved. But in practice, the values are different at each pixels as shown in FIGS. 16A and 16B. In one implementation, the 3DSM method uses the results of the calibration process to account for the offset in the analysis phase to compensate for any misalignments.

Figure 17A:
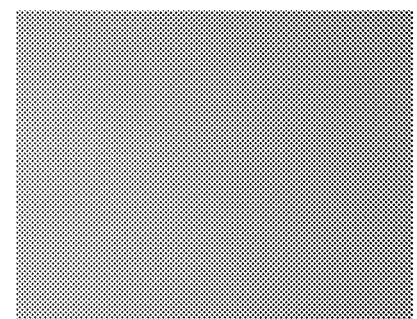
FIGS. 17A and 17B are illustrations depicting a system alignment process using the results of the calibration process depicted in FIGS. 15A-15C, according to an implementation.
Figure 17B:
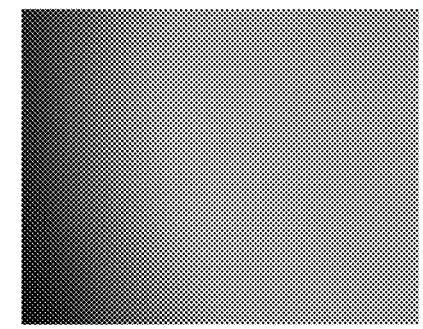

FIGS. 17A and 17B are illustrations showing system alignment using the calibration process using a mirror as a reference object, according to an embodiment. In FIG. 6A, the central beams L2, M2, and N2 in each ray bundle are perpendicular to the object surface and the reflected beam R is parallel to these central beams. In certain implementations, this parallel arrangement is preferred. In order to have this parallel alignment, alignment of different system components in the illumination path and imaging path is required such as can be accomplished using a calibration process described herein. In one implementation, the calibration process uses a mirror in a similar method as shown in FIGS. 15A-15C for active alignment of the optics (also referred to herein as optical elements), the camera, and the object plane, for example, by manipulating a sample platform. FIGS. 17A and 17B are examples of captured images of a reference mirror surface using the 3DSM system with the configuration shown in FIGS. 11A-11B. FIG. 17A is a captured image that is uniform, which indicates alignment of different optical components. FIG. 17B is a captured image that is not uniform, which indicates poor alignment of one or more optical components. The calibration method using a mirror works because the mirror is flat and can only reflect light in one direction, and thus any misalignment can result in partially reflected beams from the mirror.

2. Chrome Sphere(s)

Figure 18A:
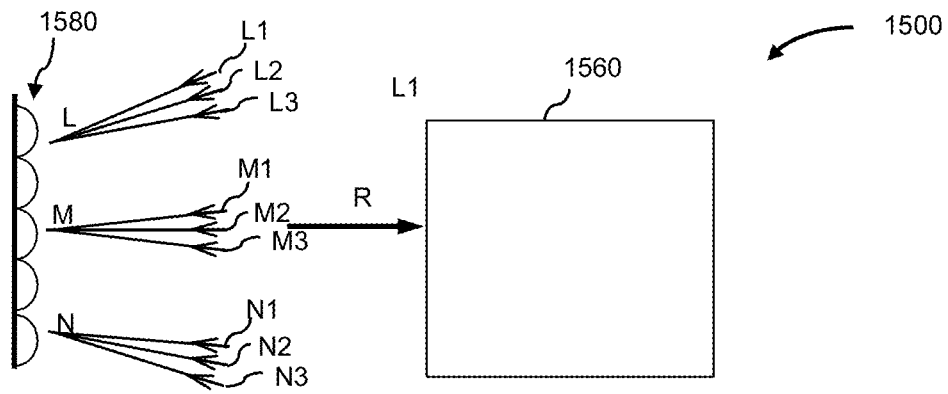
FIGS. 18A-18C are schematic diagrams depicting three operations of a system calibration process performed by a 3DSM system including a chromosphere array, according to an embodiment.
Figure 18B:
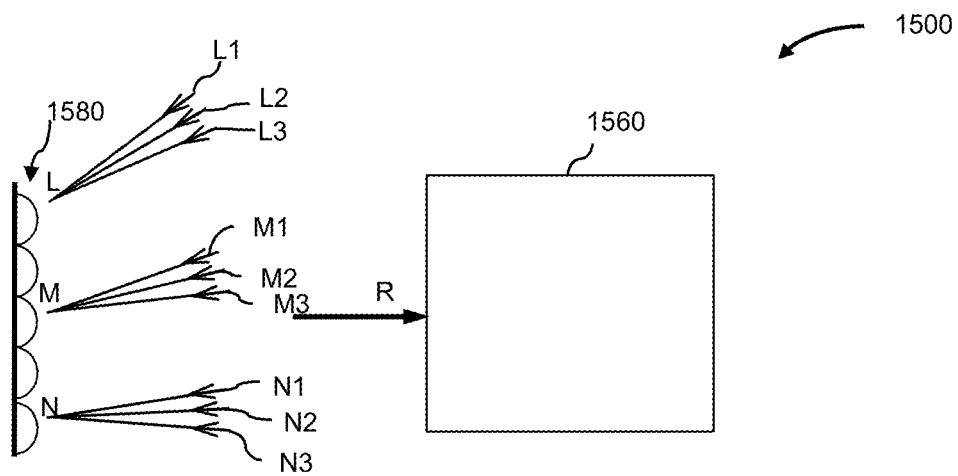
Figure 18C:
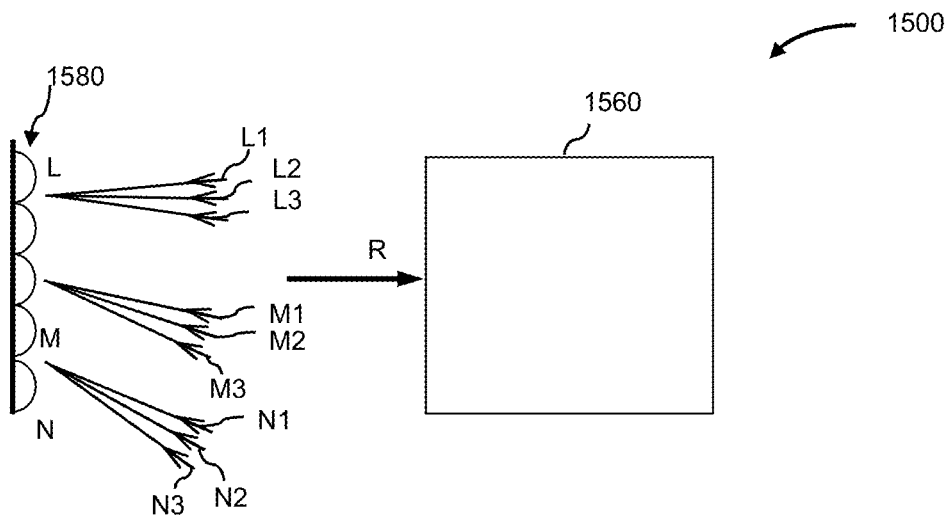

In other implementations, a system calibration process uses one or more chrome spheres. An example of system calibration process using a chrome sphere array 1580 is shown in FIGS. 18A-18C, in accordance with an embodiment. Different number of chrome spheres can be used in the chrome sphere array 1580.

FIGS. 18A-18C illustrate three data acquisition operations during the calibration process implemented by a 3DSM system 1500, according to an embodiment. During the calibration process, the chrome sphere array 1580 is placed as the object, and directions of the incident beams are changed. The 3DSM system 1500 includes a camera 1560. During the calibration process, the illumination reflected from the chrome sphere array 1580 is received at the camera 1560 and intensity images are captured at all the different directions. Because each sphere has known geometry, when the incident beams change direction, different parts of the sphere are highlighted. The 3DSM system has one or more processors (e.g., processor(s) 22 in FIG. 2) that can calibrate the incident beam directions based on the reflection from the chrome sphere array 1580.

Figure 19A:
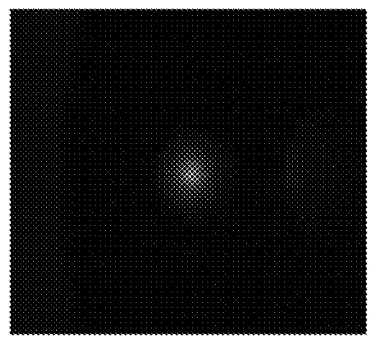
FIGS. 19A-19B are images of a single chromosphere of a chromosphere array illuminated at two different illumination directions during a calibration process, according to an embodiment.
Figure 19B:
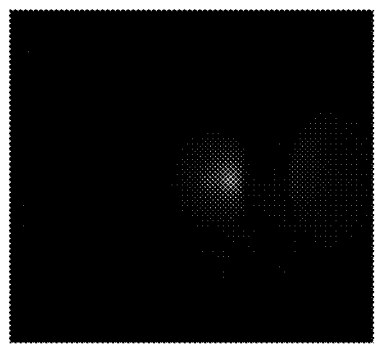

FIGS. 19A and 19B are captured images of a single chrome sphere of a chrome sphere array when the incident beams are changed to two different directions, and different parts of sphere show highlight, according to an implementation. Based on the position of the highlight, the direction of the incident beam can be estimated.

Figure 20A:
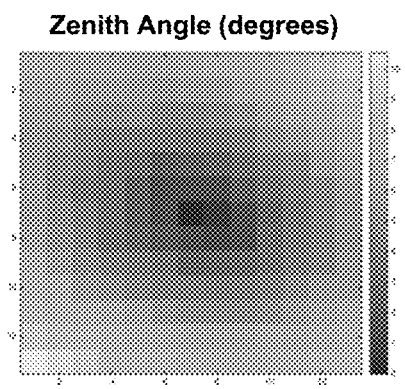
FIGS. 20A and 20B are illustrations of the calibrated zenith angles and azimuth angles for 169 different illumination directions using the calibration process depicted in FIGS. 17A-17C, according to an implementation.
Figure 20B:
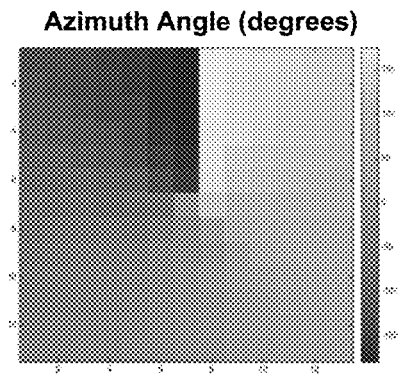

FIGS. 20A and 20B are illustrations of examples of calibrated zenith angle and azimuth angle for 169 different incident beam directions using a calibration process of the 3DSM system 1500 illustrated in FIGS. 17A-17C, according to an implementation.

3. Mirror and Chrome Sphere(s)

Figure 21A:
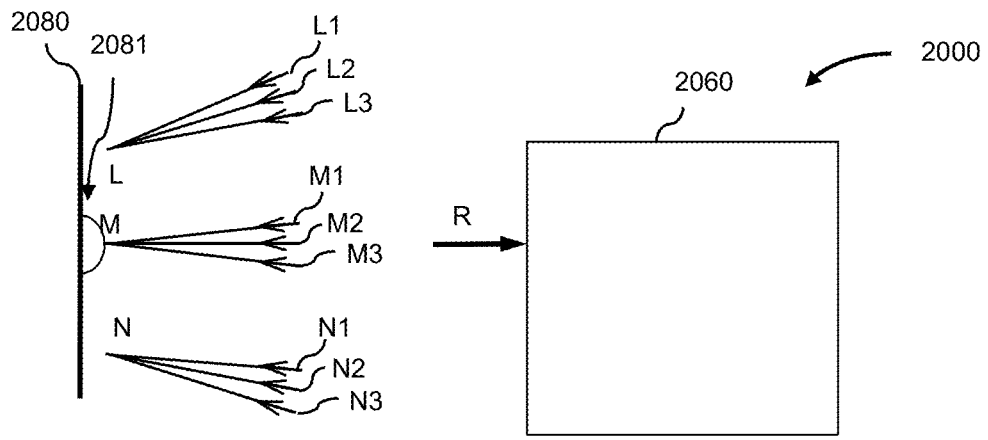
FIGS. 21A-21C is a schematic diagram depicting a 3DSM system implementing a calibration process using a combination of a mirror and a single chromosphere, in accordance with an embodiment.
Figure 21B:
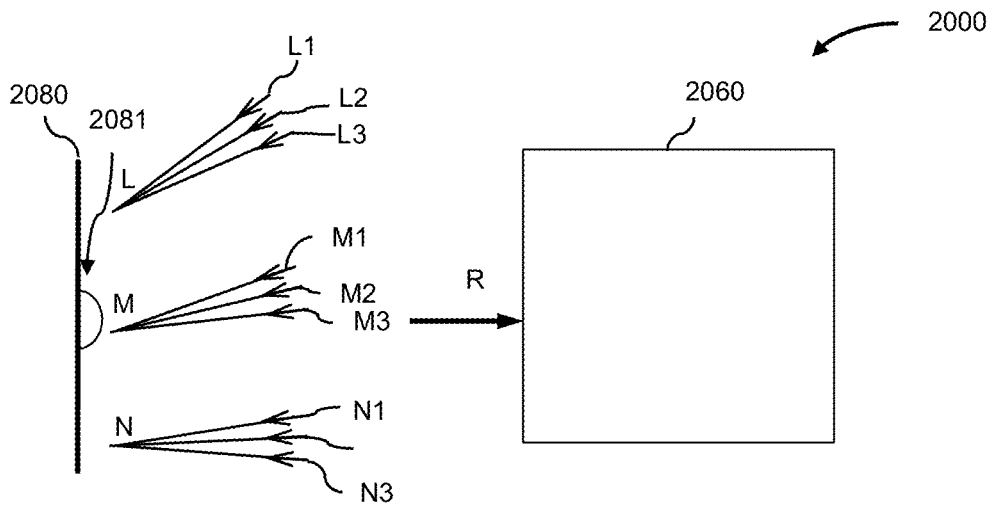
Figure 21C:
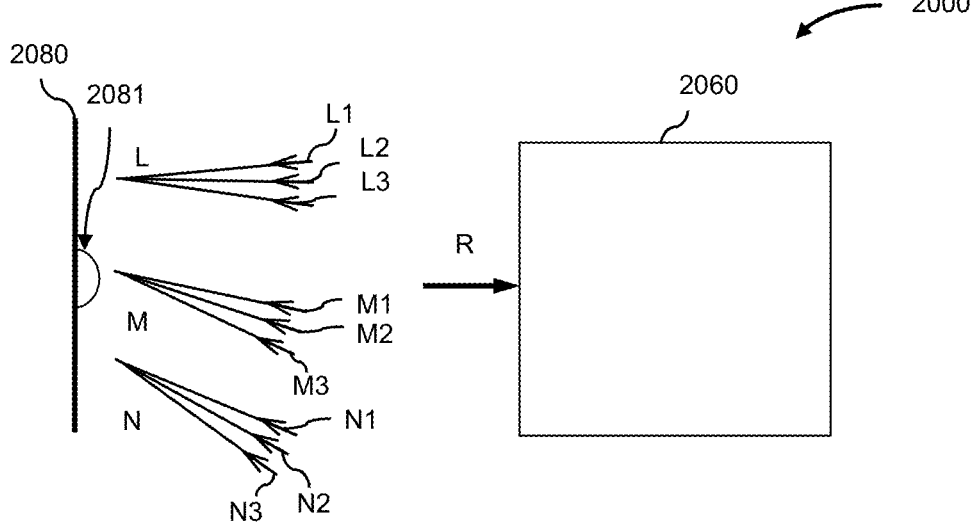

In other implementations, a system calibration process uses a mirror and one or more chrome spheres. FIGS. 21A-21C is a schematic diagram of a 3DSM system 2000 implementing a system calibration process using a combination of a mirror 2080 and a single chrome sphere 2081, in accordance with an embodiment. During the calibration process, the mirror 2080 and the chrome sphere 2081 are placed as the object being imaged, and the directions of the incident beams are changed. The 3DSM system 2000 includes a camera 2060. During the calibration process, the illumination reflected from the chrome sphere 2081 and from the mirror 2080 is received at the camera 2060 and intensity images are captured at all the different directions. The offset of beams from ideal parallel condition is calibrated using the method depicted in FIGS. 15A-15C and FIGS. 16A-16B, and the incident beam directions are calibrated using the method depicted in FIGS. 18A-18C, FIGS. 19A-19B, and FIGS. 20A-20B. By using combined mirror and chrome sphere these two calibration processes can be performed simultaneously.

C. Pre-Determined Sensor Responses (Also Referred to Herein as Pre-Computed Sensor Responses)

Because the engineered illumination has a known intensity distribution, sensor response can be pre-determined by taking the convolution of the engineered beam distribution function with all the possible surface normal directions at different illumination directions. In various implementations, a 3DSM method includes operations during a data acquisition phase that acquire intensity images and operations during an analysis phase that use the intensity images to determine a measured sensor response for each surface point and matches the measured sensor response to a pre-determined sensor response to determine a surface normal at each surface point that corresponds to a pixel of the image data of the surface. A surface point is sometimes referred to herein as a "pixel" or a "surface pixel."

Figure 22:
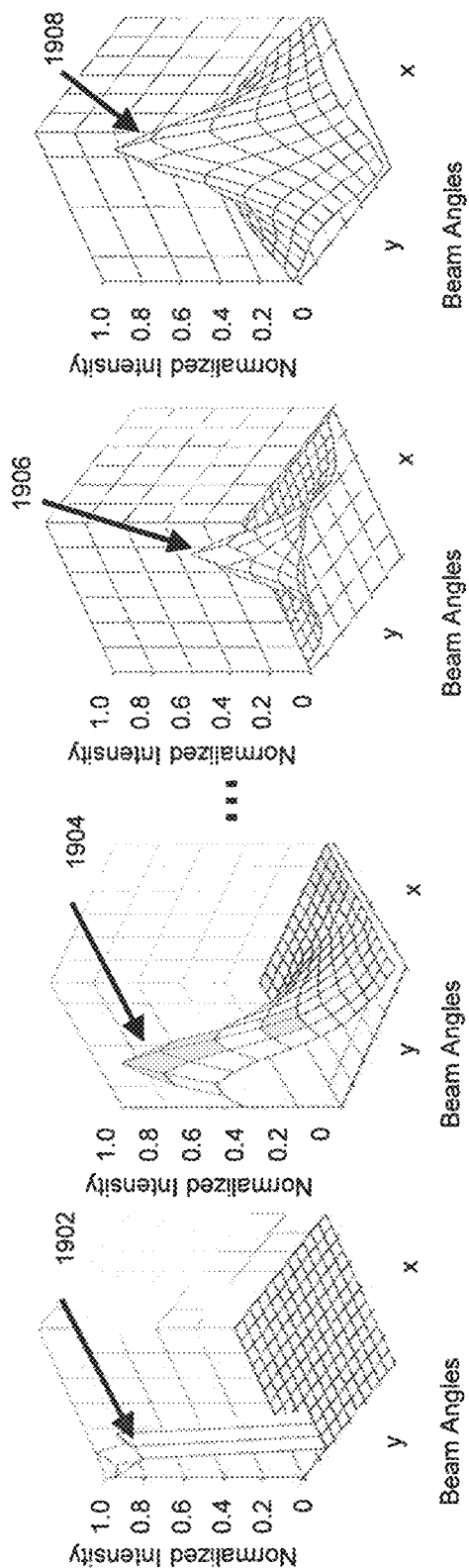
FIG. 22 depicts a series of pre-determined sensor responses of a single sensor pixel, according to an embodiment.

FIG. 22 depicts a series of pre-determined sensor responses of a single sensor pixel, according to an embodiment. Each sensor response is in the form of a three-dimensional plot. In each sensor response plot, the x-axis and y-axis represents the incident beam direction changed in the x and y directions respectively, and the z-axis is normalized intensity of the sensor response. Each plot is the pre-determined sensor response with a different surface normal vector. The illustrated series of p pre-determined sensor responses includes a first sensor response 1902, a second sensor response 1904, . . . , a $(p-1)^{th}$ sensor response 1906, a $p^{th}$ sensor response 1908.

Figure 23:
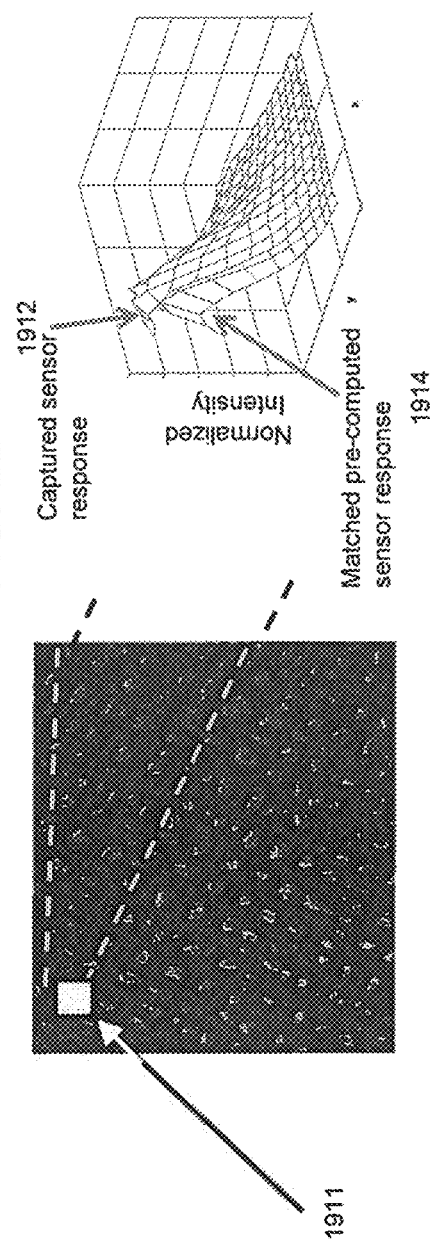
FIG. 23 is a schematic representation depicting the operation of matching a measured sensor response for a single sensor pixel corresponding to a surface pixel to one of a series of pre-determined sensor responses, according to an embodiment.

FIG. 23 is a schematic representation of the operation of matching a measured sensor response for a single sensor pixel corresponding to a surface pixel 1911 to one of a series of pre-determined sensor responses, according to an embodiment. In FIG. 23, the captured response 1912 is calculated for a single pixel 1911 when the illumination changed in both x and y directions, and a best matched pre-determined sensor response 1914 can be found based on different metrics, such as correlation and minimum difference. The surface normal vector of the matched pre-determined sensor response is then assigned to that pixel. The same sensor response matching process is repeated for all the pixels in the captured images.

D. Examples of Microgeometry and Reflectance Properties Measurements, and Related Renderings FIG. 24A is a photograph of a leather sample. The area 2301 of the leather sample (denoted by the rectangle in the photograph) was analyzed by a 3DSM system of an implementation to measure microgeometry in the form of a depth map and reflectance properties. According to one aspect, the area 2301 may be the portion of the sample within the field-of-view of the camera.

FIG. 24B is an illustration of a measured depth map of the area 2301 of the leather sample shown in FIG. 24A as analyzed by the 3DSM system. FIG. 24C is a surface normal map of the portion 2301 of the leather sample as analyzed by the 3DSM system. FIG. 24D is a measured diffuse map of the portion 2301 of the leather sample as analyzed by the 3DSM system. FIG. 24E is a measured specular map of the area 2301 of the leather sample as determined by the 3DSM system. FIG. 24F is a measured surface roughness map of the area 2301 of the leather sample as determined by the 3DSM system.

Figure 25A:
FIG. 25A is a photograph of a coin.
Figure 25B:
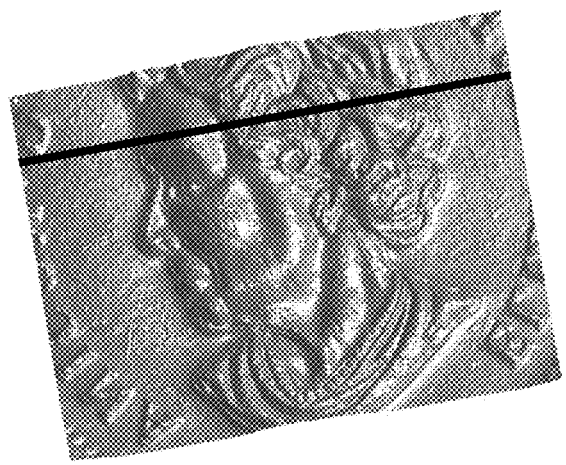
FIG. 25B is a 3D rendering using measured depth map of the coin shown in FIG. 25A, according to an embodiment.
Figure 25C:
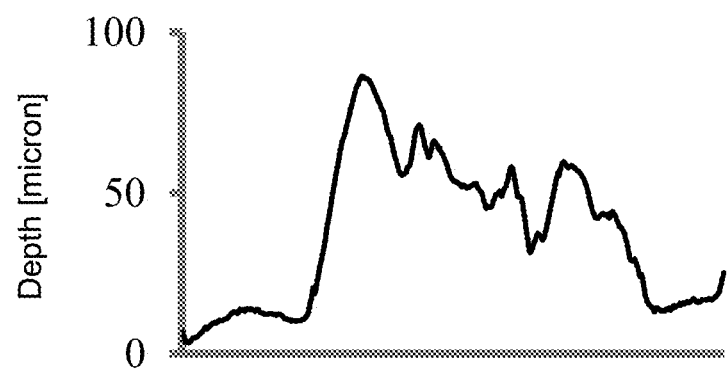
FIG. 25C is graph having a measured depth curve measured along the black line of the coin as shown in FIG. 25A, according to an embodiment.

FIG. 25A is a photograph of a coin. FIG. 25B is a 3D rendering of the coin shown in FIG. 25A that is generated by a 3DSM system using a measured depth map, according to an embodiment. FIG. 25C is graph having a measured depth curve measured along the black line of the coin shown in FIG. 25A as determined by the 3DSM system. The depth is measured in micron.

Figure 26A:
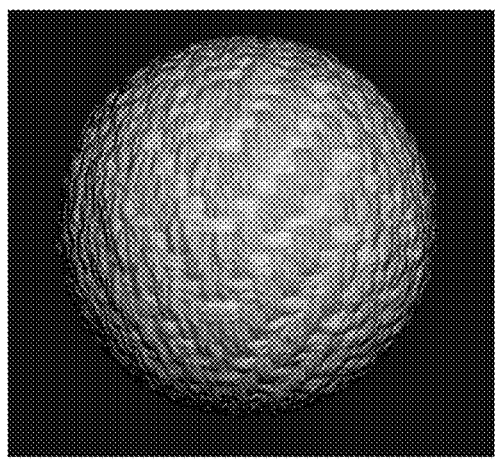
FIGS. 26A-26D are renderings based on microgeometry and reflectance properties measured by an 3DSM system, according to an implementation.
Figure 26B:
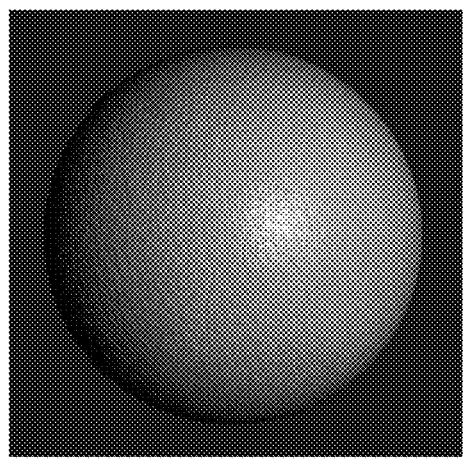
Figure 26C:
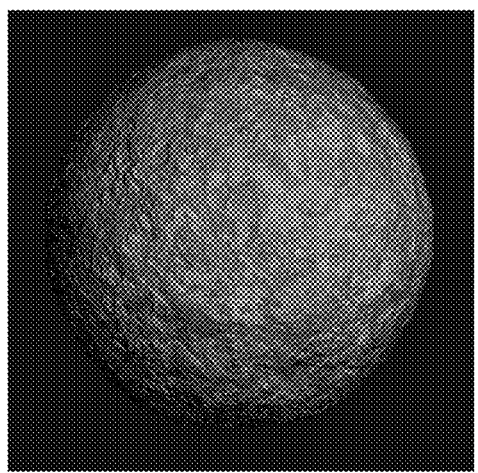
Figure 26D:
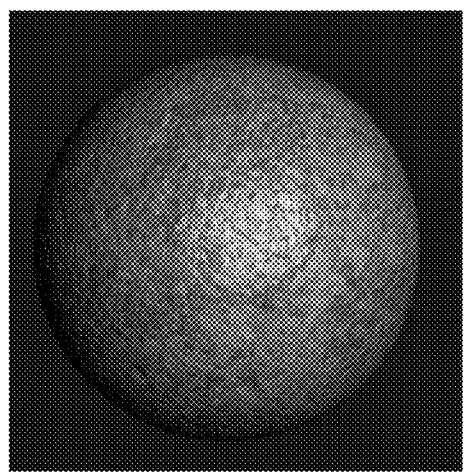

FIGS. 26A-26D are physically-based renderings based on measured microgeometry and reflectance properties of samples measured using an 3DSM system according to an implementation. FIG. 26A is a rendering of a wool sample. FIG. 26B is a rendering of green leather sample. FIG. 26C is a rendering of a rock sample. FIG. 26D is a rendering of a laminated wood sample.

E. Wavelength and Polarization Control

In certain implementations, a 3DSM system controls wavelength and/or polarization of the engineered illumination, the light from the sample surface (in optical path between the camera and the sample), or both the engineered illumination and the light from the sample surface. In these cases, the 3DSM includes one or more wavelength and/or polarization control devices. To control the wavelength of the engineered illumination, the reflected light, or the light at another point in the optical path to the camera, a control device such as filter wheel loaded with different spectral filters or a liquid crystal tunable filter can be used. Alternatively, different light sources with different wavelength can also be used to control the wavelength of the engineered illumination. To control the polarization, a polarizer rotated at different positions or a filter wheel loaded with differ polarizers can be used.

Figure 27A:
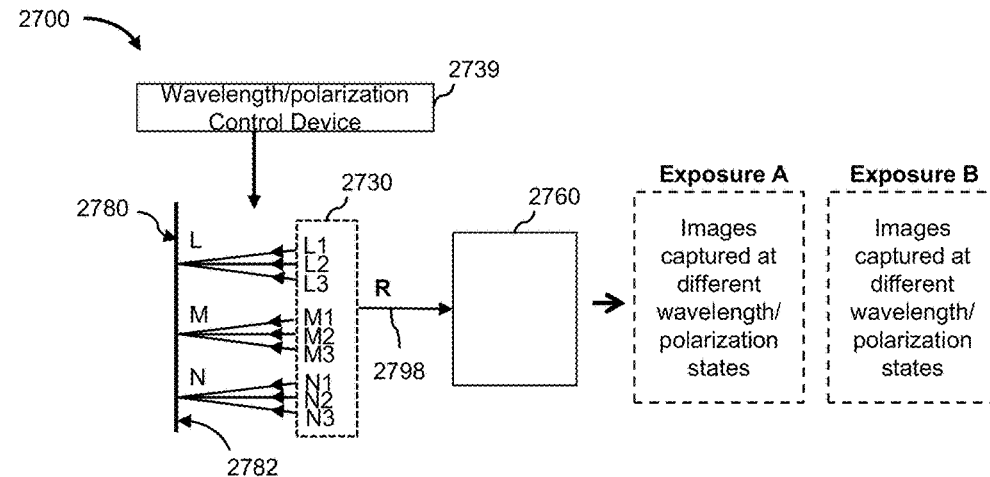
FIGS. 27A-27C are schematic diagrams depicting operations of a data acquisition phase implemented by a 3DSM system configured to control wavelength and polarization of the engineered illumination, according to an embodiment.
Figure 27B:
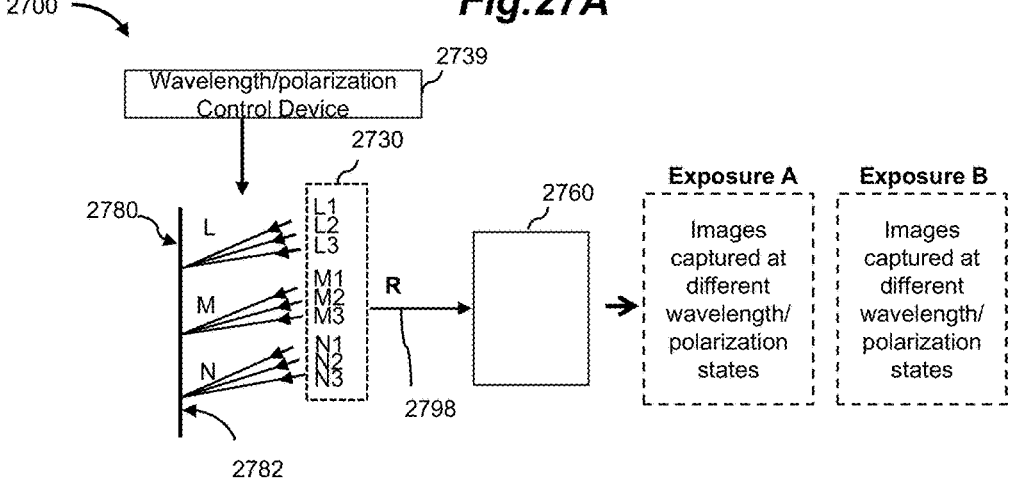
Figure 27C:
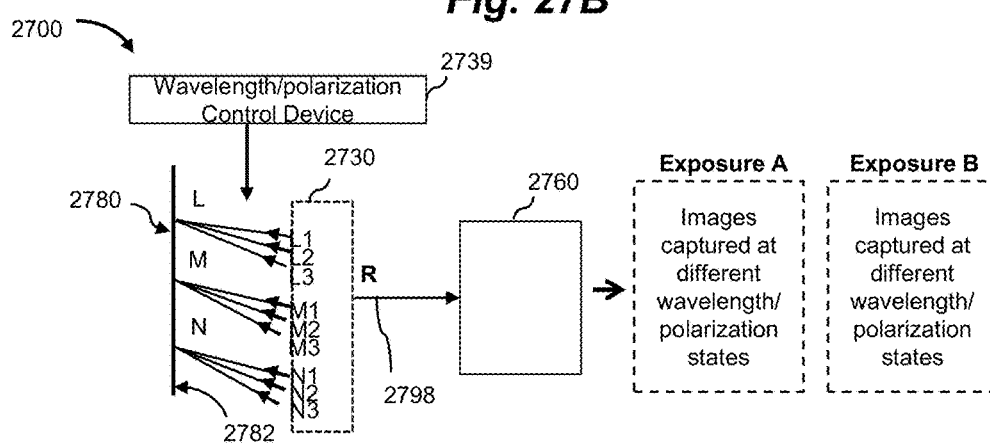

FIGS. 27A-27C are schematic diagrams depicting three operations of a data acquisition phase implemented by a 3DSM system 2700 configured to control wavelength and polarization of the engineered illumination, in accordance with an embodiment. The 3DSM system 2700 comprises an engineered illumination system 2730, a camera 2760, and a wavelength/polarization control device 2739 in communication with the engineered illumination to change the wavelength and/or polarization states of the engineered illumination. In one case, the wavelength/polarization control device 2739 is a component of the engineered illumination system 2730. The engineered illumination's wavelength and polarization can be controlled alone or be controlled together, and images are captured under different illumination directions and under different exposures in a way that is similar to the way shown in FIGS. 6A-6C. In the illustrated operations, the engineered illumination system 2730 is shown providing three ray bundles: a first ray bundle is incident on a point L of the surface 2782 of an sample 2780, a second ray bundle is incident on a point M of the surface 2782 of the sample 2780, and a third ray bundle is incident on a point N of the surface 2782 of the sample 2780.

FIGS. 27A-27C show the data acquisition operations at three of the N illumination directions of the ray bundles. The reflected light R from the sample 2780 propagates to the camera 2760 and multiple images are captured at different wavelength/polarization states at each of the two exposure settings "Exposure A'" and "Exposure B." Although three illumination directions and two exposures at different settings are shown for simplicity, it would be understood that data acquisition can include additional illumination directions and/or additional exposures. The captured images are then communicated in a signal to the one or more processors to analyze the images for different wavelength and polarization states. During an analysis phase, the one or more processors use the captured images to construct a map of surface normals, a depth map and maps of reflectance properties, all measured at different wavelength and/or polarization states.

Figure 28A:
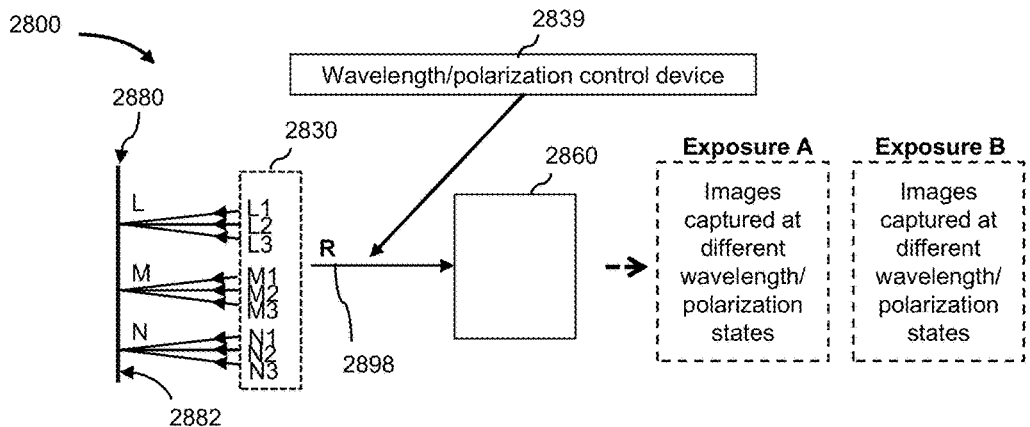
FIGS. 28A-28C are schematic diagrams depicting three operations of a data acquisition phase implemented by a 3DSM system that controls wavelength and polarization of the reflected light from the surface of the sample, in accordance with an embodiment.
Figure 28B:
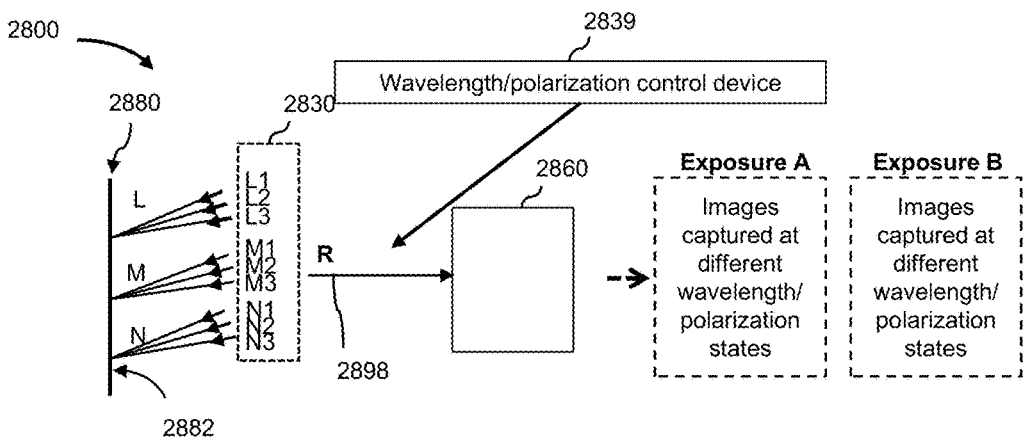
Figure 28C:
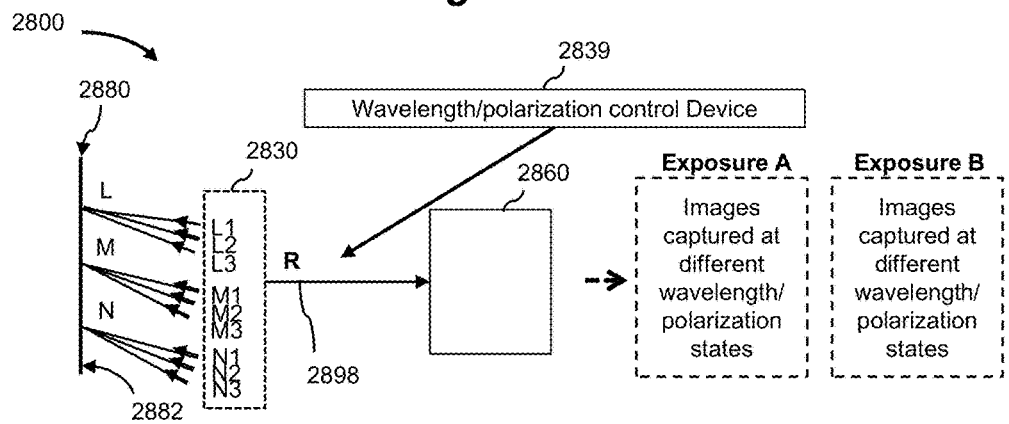

FIGS. 28A-28C are schematic diagrams illustrating three operations of a data acquisition phase that control wavelength and polarization of the reflected light 2898 from the surface 2882 of the sample 2880 using a 3DSM system 2800, in accordance with an embodiment. The 3DSM system 2800 comprises an engineered illumination system 2830, a camera 2860, and a wavelength/polarization control device 2839 in communication with the reflected light 2898 to change the wavelength and/or polarization states. In one case, the wavelength/polarization control device 2839 is a component of the engineered illumination system 2830. The wavelength and polarization of the reflected light 2898 can be controlled alone or be controlled together, and images are captured under different illumination directions and under different exposures in a way that is similar to the way shown in FIGS. 6A-6C. In the illustrated operations, the engineered illumination system 2830 is shown providing three ray bundles: a first ray bundle is incident on a point L of the surface 2882 of a sample 2880, a second ray bundle is incident on a point M of the surface 2882 of the sample 2880, and a third ray bundle is incident on a point N of the surface 2882 of the sample 2880. FIGS. 28A-28C shows the data acquisition operations at three of the N illumination directions of the ray bundles. The reflected light R from the sample 2880 propagates to the camera 2860 and multiple images are captured at different wavelength/polarization states at each of the two exposure settings "Exposure A'" and "Exposure B." Although three illumination directions and two exposures at different settings are shown for simplicity, it would be understood that data acquisition can include additional illumination directions and/or additional exposures. The captured images are then communicated in a signal to the one or more processors to analyze the images for different wavelength and polarization states. During operations of an analysis phase of the 3DSM method, the one or more processors use the captured images to construct a map of surface normal, a depth map and maps of reflectance properties, all measured at different wavelength and/or polarization states.

Figure 29A:
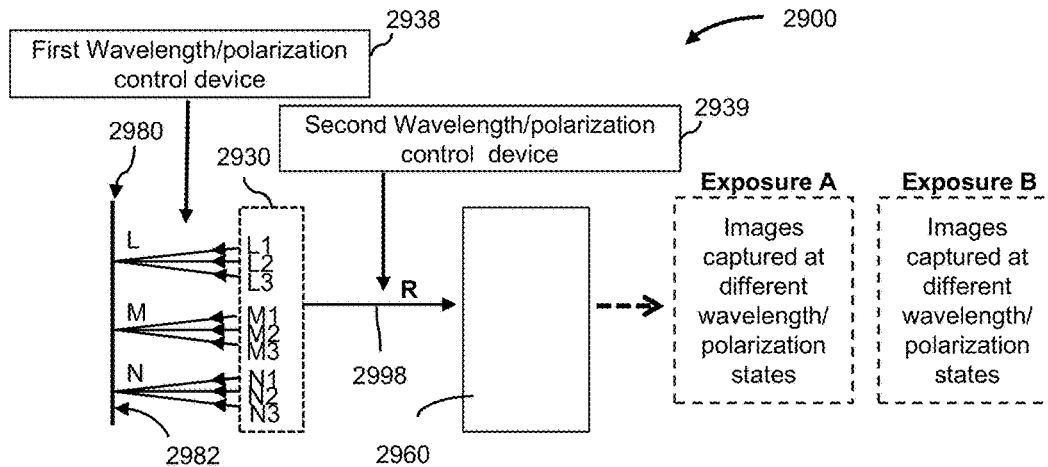
FIGS. 29A-29C are schematic diagrams depicting three operations of a data acquisition phase implemented by a 3DSM system that controls wavelength and polarization of both the engineered illumination and the reflected light from the surface of the sample, in accordance with an embodiment.
Figure 29B:
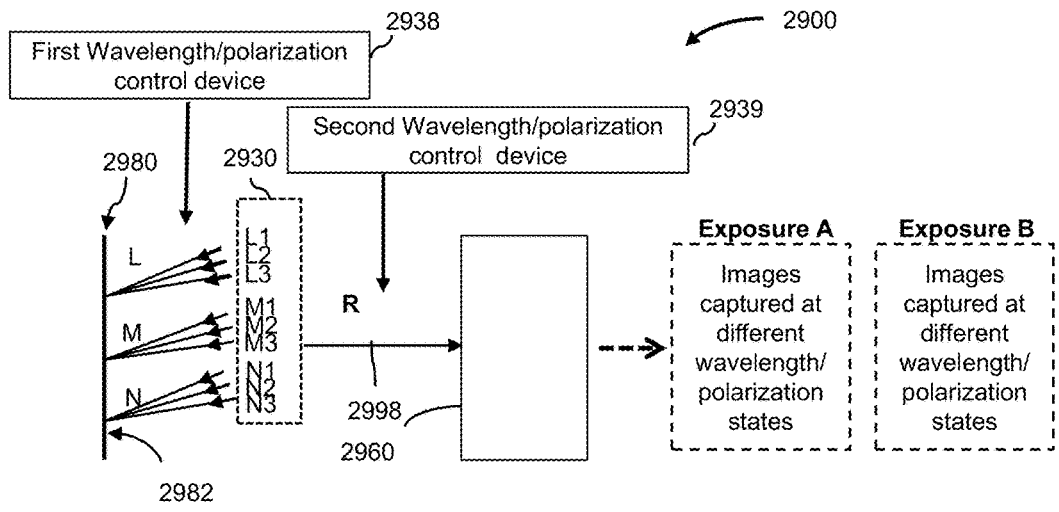
Figure 29C:
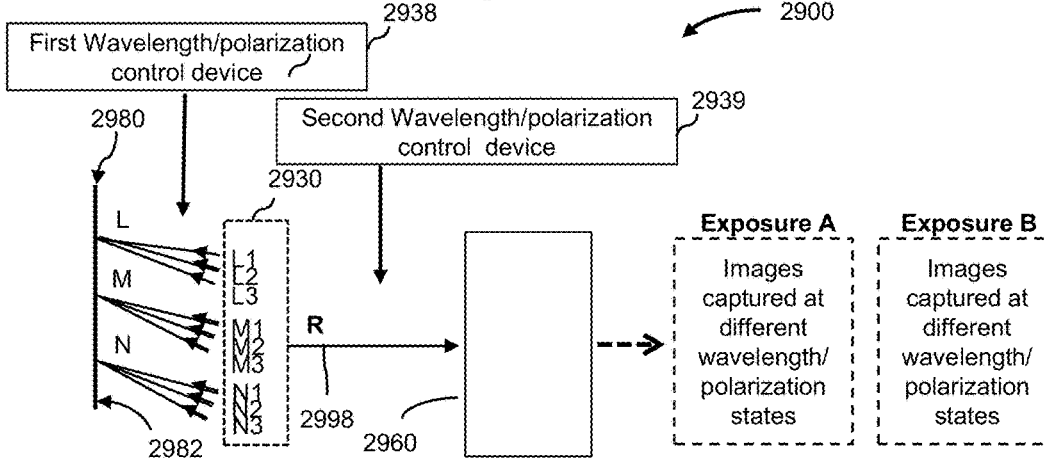

FIGS. 29A-29C are schematic diagrams illustrating three operations of a data acquisition phase that control wavelength and polarization of both the engineered illumination and the reflected light 2998 from the surface 2982 of the sample 2980 using a 3DSM system 2900, in accordance with an embodiment. The 3DSM system 2900 comprises an engineered illumination system 2930, a camera 2960, a first wavelength/polarization control device 2938 in communication with the engineered illumination to change the wavelength and/or polarization states of the engineered illumination, and a second wavelength/polarization control device 2939 in communication with the reflected light 2998 to change the wavelength and/or polarization states of the reflected light 2998. In one case, one or both of the first and second wavelength/polarization control devices 2938, 2939 are components of the engineered illumination system 2930. The engineered illumination's wavelength and polarization can be controlled alone or be controlled together, and the wavelength and polarization of the reflected light 2998 can also be controlled alone or be controlled together.

Images are captured under different illumination directions and under different exposures in a way that is similar to the way shown in FIGS. 6A-6C. In the illustrated operations, the engineered illumination system 2930 is shown providing three ray bundles: a first ray bundle is incident on a point L of the surface 2982 of an sample 2980, a second ray bundle is incident on a point M of the surface 2982 of the sample 2980, and a third ray bundle is incident on a point N of the surface 2982 of the sample 2980. FIGS. 29A-29C show the data acquisition operations at three of the N illumination directions of the ray bundles. The reflected light R from the sample 2980 propagates to the camera 2960 and multiple images are captured at different wavelength/polarization states at each of the two exposure settings "Exposure A'" and "Exposure B." Although three illumination directions and two exposures at different settings are shown for simplicity, it would be understood that data acquisition can include additional illumination directions and/or additional exposures. The captured images are then communicated in a signal to the one or more processors to analyze the images for different wavelength and polarization states. During an analysis phase, the one or more processors use the captured images to construct a map of surface normals, a depth map and maps of reflectance properties, all measured at different wavelength and/or polarization states.

Figure 30:
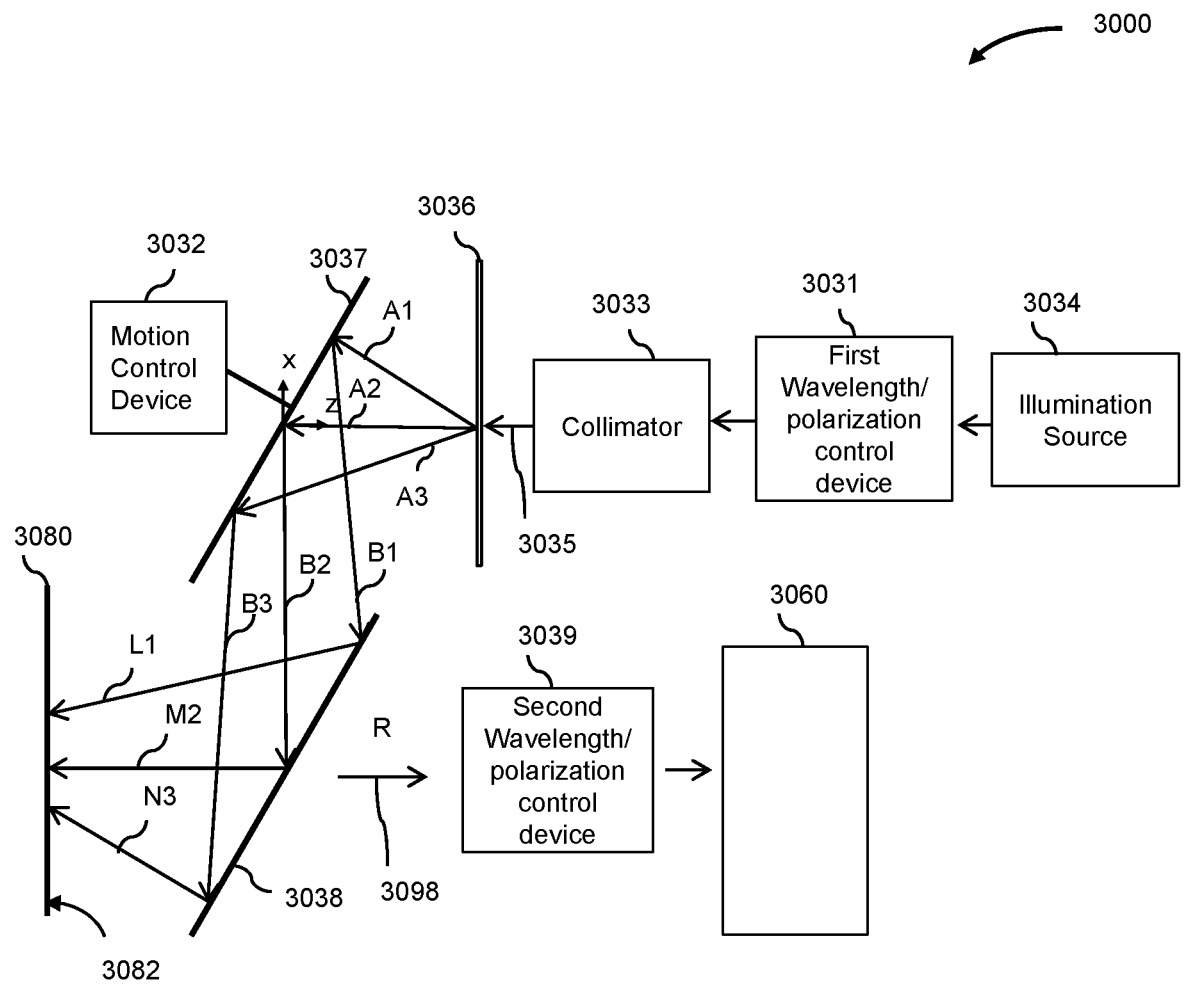
FIG. 30 is a schematic diagram illustrating components of a 3DSM system configured to control wavelength and polarization of both the engineered illumination and the reflected light from the surface of the sample, in accordance with an embodiment.

FIG. 30 is a schematic diagram illustrating an operation of a data acquisition phase of a 3DSM system 3000 that controls wavelength and polarization of both the engineered illumination and the reflected light 3098 from the surface 3082 of the sample 3080, in accordance with an embodiment. The 3DSM system 3000 comprises an engineered illumination system having an illumination source 3034 and optical elements including a first wavelength/polarization control device 3031, a collimator 3033, a diffuser 3036, a rotating mirror 3037, and a beam-splitter 3038. The 3DSM system 3000 further comprises a second wavelength/polarization control device 3039 and the camera 3060. The 3DSM system 3000 also includes an x-axis, a y-axis, and a z-axis (not shown) orthogonal to the x-axis and the y-axis. The 3DSM system 3000 also includes a motion control device 3032 coupled to the rotating mirror 3037. The motion control device 3032 is configured to rotate the rotating mirror 3037 about the x-axis and the z-axis (two orthogonal rotational directions). The first wavelength/polarization control device 3031 receives illumination propagated from the illumination source 3034 and the collimator 3033 receives light propagated from the first wavelength/polarization control device 3031. During operation, the diffuser 3036 receives collimated illumination 3035 from the collimator 3033 and the diffuser 3036 spreads the illumination based on the diffuser's transmittance distribution. For simplicity, three illumination beams A1, A2, A3 are shown. The rotating mirror 3037 receives the illumination beams and reflects them. The beam splitter 3038 receives the reflected beams B1, B2, B3, from the mirror 3037 and reflects them. The surface 3082 of the sample 3080 receives the incident beams L1, M2, and N3 at the points L, M, and N respectively. Light reflected from the surface 3082 is transmitted through the beam splitter 3038. The second wavelength/polarization control device 3039 receives light transmitted through the beam splitter 3038. Light propagated by the second wavelength/polarization control device 3039 is received at the camera 3060 and multiple images are captured at different wavelength/polarization states. During operation, the first wavelength/polarization control device 3031 controls the wavelength and/or polarization states of the light propagated to the collimator 3033 and/or the second wavelength/polarization control device 3039 controls the wavelength and/or polarization states of the light reflected from the sample 3080 and transmitted through the beam splitter 3038. During operation, light is propagated to the camera 3060 and multiple images are captured at different wavelength/polarization states at each of the multiple exposure settings. The captured images are communicated in a signal to the one or more processors to analyze the images for different wavelength and polarization states.

In FIG. 30, the first wavelength/polarization control device 3031 implements wavelength and polarization control of the engineered illumination and the second wavelength/polarization control device 3039 implements wavelength and polarization control of the reflected light from the sample surface. To control the wavelength a device such as filter wheel loaded with different spectral filters or liquid crystal tunable filter can be used. To control the polarization a polarizer rotated at different positions or a filter wheel loaded with different polarizers can be used. Different light sources with different wavelength can also be used to control the wavelength of engineered illumination.

F. Controlled Motion of Sample Surface

In certain implementations, a 3DSM system is configured to control the motion of the sample surface. For example, a 3DSM system may include a motion control device coupled to the sample platform to control the translation, tilt, and rotation of the sample surface.

Figure 31A:
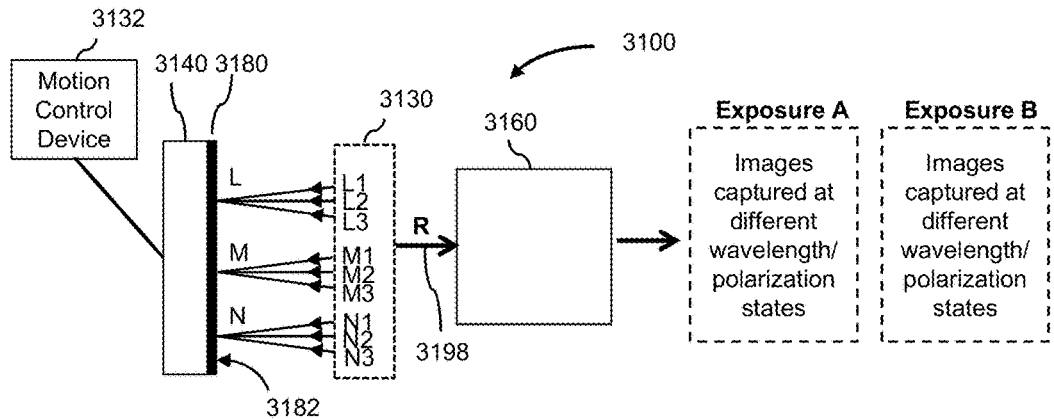
FIGS. 31A-31C are schematic diagrams depicting operations of a data acquisition phase implemented by a 3DSM system configured to control the motion of the sample surface, according to an embodiment.
Figure 31B:
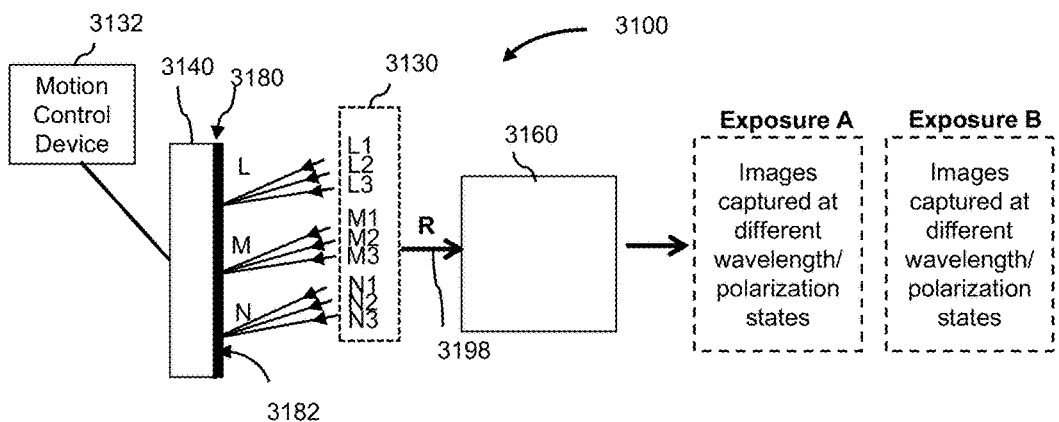
Figure 31C:
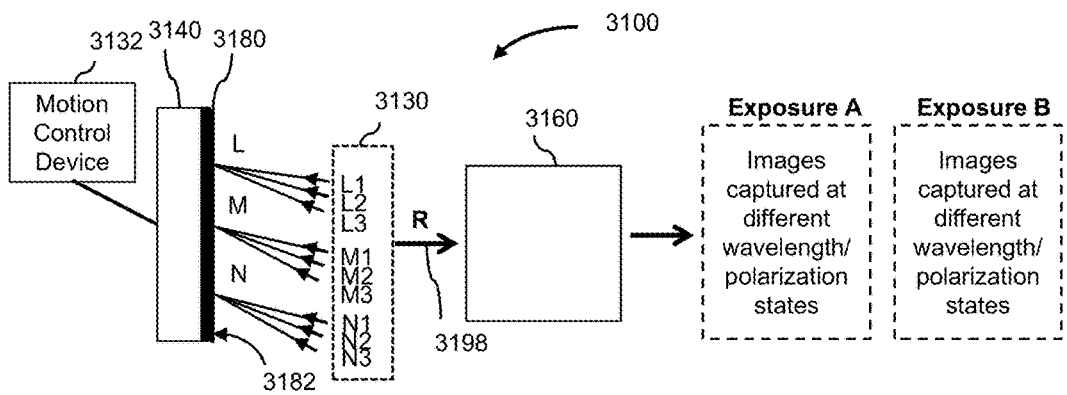

FIGS. 31A-31C are schematic diagrams illustrating three operations of a data acquisition operations performed by a 3DSM system 3100 including a motion control device 3132 coupled to a sample platform 3140 for manipulating the position of the sample surface, according to an implementation. The 3DSM system 3100 comprises a sample platform 3140, an engineered illumination system 3130, a motion control device 3132 coupled to a sample platform 3140. In the illustrated operations of the data acquisition phase in FIGS. 31A-31C, the incident illumination includes three ray bundles: a first ray bundle is incident on a point L of the surface 3182 of an sample 3180, a second ray bundle is incident on a point M of the surface 3182 of an sample 3180, and a third ray bundle is incident on a point N of the surface 3182 of an sample 3180. Although three ray bundles with three beams are shown for simplicity, it would be understood that larger numbers of beams and/or larger number of ray bundles may be used. The motion control device 3132 is configured to control the position of the sample including one or more of translation, tilt, and rotation applied to the sample surface. At each controlled position of the sample 3180, the camera captures images under different illumination directions and under different exposures settings similar to the images captured in FIGS. 6A-6C. Although three illumination positions are shown, it would be understood that additional illumination positions may be implemented. During operation, the image data of the captured images is communicated in a signal to the one or more processors and the processors use the image data to construct a map of surface normals, a depth map and maps of reflectance properties at each controlled position.

In implementations where the surface of a sample is larger than the camera's field-of-view, the sample surface can be translated along different directions in the sample plane, and images captured at different translation positions. The images captured at each controlled position can be used to measure the map of surface normals, depth map, and reflectance properties at each translation position and then this data can be stitched together.

Height Mapping and Anisotropic Properties

In some implementations, a 3DSM system further comprises a stage that is configured to adjust the distance between the surface of the sample and the camera to bring the surface into focus. In one implementation, the distance between the surface and the camera can be adjusted gradually and images captured at each distance. Images captured at the different distances can be used to determine properties and can be combined together to extend the depth of field of the camera, and can also be processed to estimate a height map based on the depth from defocus method. This height map can be combined with the depth map measured using the engineered illumination.

In some scenarios, a surface may present anisotropic reflection. In this case, it can be useful to measure properties at different rotational positions. In one implementation, the 3DSM system further comprises a rotational stage that can be used to rotate the sample surface, and the 3DSM system measures surface normal, depth, and reflectance properties at different rotation positions. The surface can be tilted to change the geometric relationship among illumination, surface normal, and camera viewing direction.

In some cases, images captured at these additional height and/or rotational positions can be fitted into a BRDF model together with the images captured at different illumination directions, and can provide improved reflectance properties measurement.

G. Controlled Motion of Engineered Illumination and Camera

In certain implementations, a 3DSM system is configured to control the motion of the engineered illumination and the camera together in unison. For example, a 3DSM system may include a motion control device individually coupled each of the engineered illumination system and the camera individually or may be coupled with both.

Figure 32A:
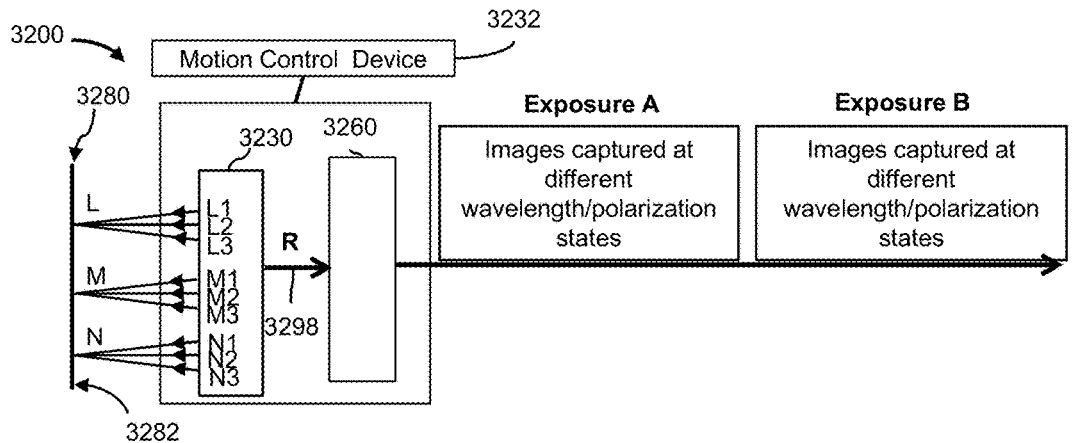
FIGS. 32A-32C are schematic diagrams depicting operations of a data acquisition phase implemented by a 3DSM system configured to control the motion of the engineered illumination and the camera, according to an embodiment.
Figure 32B:
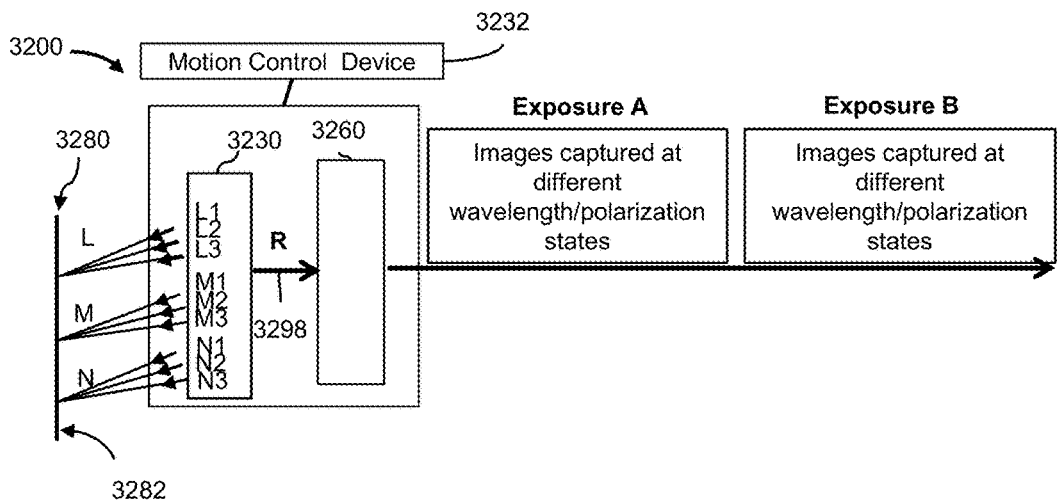
Figure 32C:
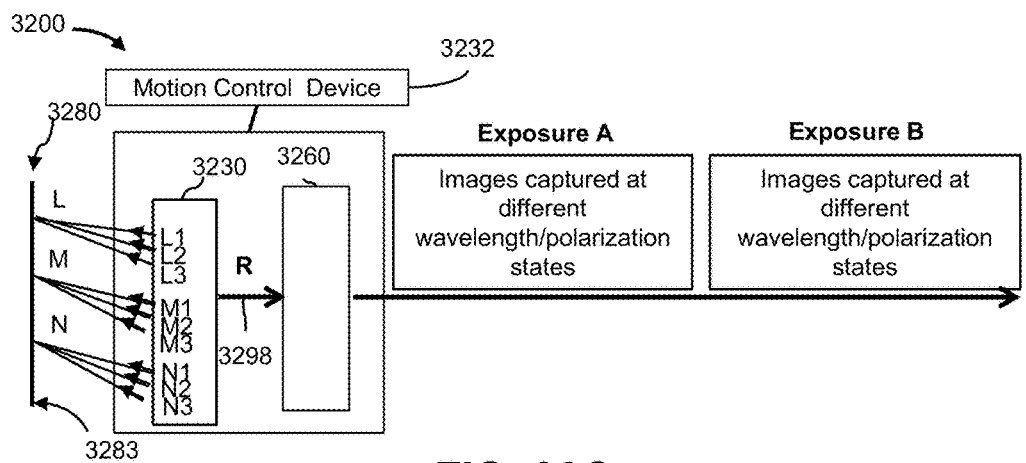

FIGS. 32A-32C are schematic diagrams illustrating three operations of a data acquisition phase performed by a 3DSM system 3200 configured to control the motion of the engineered illumination and the camera, according to an embodiment. Engineered illumination and camera can be controlled together or be controlled individually by applying different motion controls such as translation, tilt, and rotation. At each controlled position, images are captured under different illumination directions and under different exposures in a way that is similar to the operations described with respect to FIGS. 6A-6C. The 3DSM system 3200 comprises an engineered illumination system 3230, a camera 3260, and a motion control device 3232 coupled to both the engineered illumination system 3230 and the camera 3260. In the illustrated operations of the data acquisition phase in FIGS. 32A-32C, the incident illumination includes three ray bundles: a first ray bundle is incident on a point L of the surface 3282 of an sample 3280, a second ray bundle is incident on a point M of the surface 3282, and a third ray bundle is incident on a point N of the surface 3282. Although three ray bundles with three beams are shown for simplicity, it would be understood that larger numbers of beams and/or larger number of ray bundles may be used. The motion control device 3232 is configured to control one or more of translation, tilt, and rotation applied to the engineered illumination system 3230 and the camera 3260. At each controlled position, the camera 3260 captures images under different illumination directions and under different exposures settings similar to the images captured in FIGS. 6A-6C. Although three positions are shown, it would be understood that additional positions may be implemented. During operation, the image data of the captured images is communicated in a signal to the one or more processors and the processors use the image data to construct a map of surface normals, a depth map, and maps of reflectance properties at each controlled position.

In implementations where the surface of a sample is larger than the camera's field-of-view, the engineered illumination and camera can be translated together or be translated individually along different directions parallel to the sample plane. During data acquisition, the camera can take images at different translation positions. The images captured at each controlled position can be used to measure a map of surface normals, a depth map, and maps of reflectance properties at each translation position and then this data can be stitched together.

H. Wavelength/Polarization Control and Motion Control

In one implementation, a 3DSM system combines wavelength/polarization control and motion control to capture images at different wavelength, different polarization states, and different controlled positions. For example, a 3DSM system may comprise one or more of the wavelength/polarization control devices in FIGS. 27A-27C, FIGS. 28A-28C, and FIGS. 29A-29C and one or more of the motion control devices in FIGS. 31A-31C, and FIGS. 32A-32C.

I. Surface Emissivity Properties

In some implementations, a 3DSM system is configured to obtain surface emissivity properties. During data acquisition, the engineered illumination is switched to an on state to illuminate the surface and then switched to an off state during which the camera receives the emitted light (emissions) from the surface and capture intensity measurements based on the received emissions. These 3DSM systems can be configured to control one or more of motion of the emissive surface, the motion of the engineered illumination and the camera, the wavelength and/or the polarization of the emitted light from the sample surface.

Figure 33:
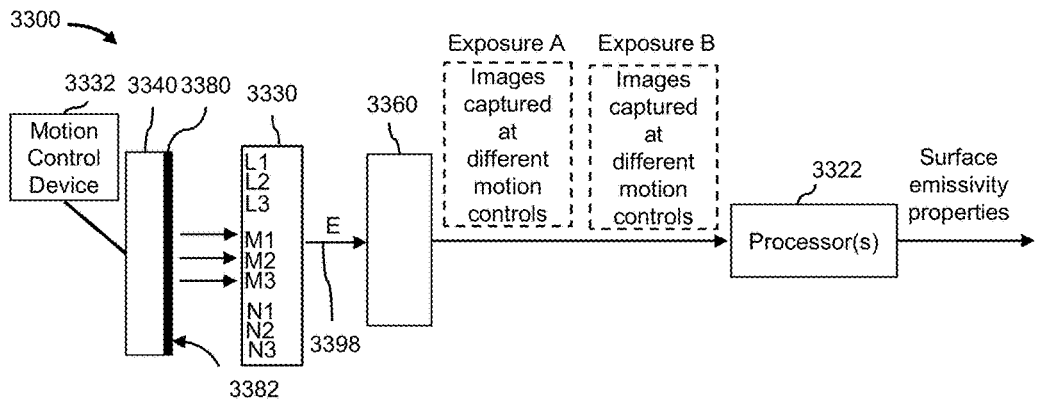
FIG. 33 is a schematic diagram depicting operations of a data acquisition phase and an analysis phase of a 3DSM method that obtains surface emissivity properties using a 3DSM system configured to control the motion of the sample surface, according to an embodiment.
Figure 34:
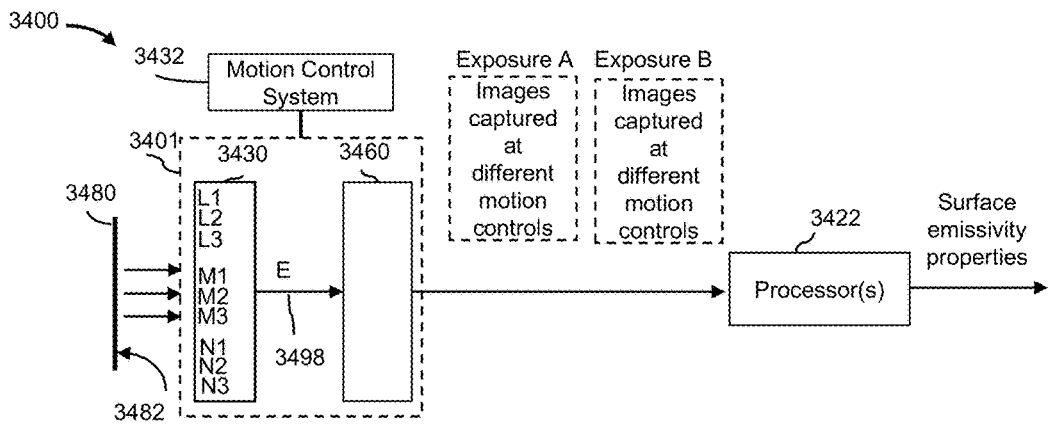
FIG. 34 is a schematic diagram depicting operations of a data acquisition phase and an analysis phase of a 3DSM method that obtains surface emissivity properties using a 3DSM system configured to control the motion of the engineered illumination and the camera, according to an embodiment.
Figure 35:
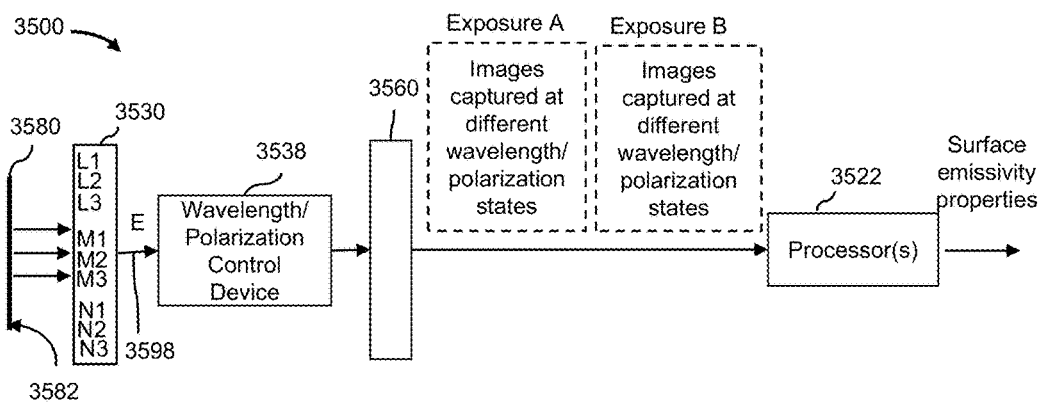
FIG. 35 is a schematic diagram depicting operations of a data acquisition phase and an analysis phase of a 3DSM method that obtains surface emissivity properties using a 3DSM system configured to control the wavelength and/or the polarization of the emitted light from the sample surface, according to an embodiment.

FIGS. 33-35 are schematic diagrams depicting operations of a data acquisition and analysis phase of a 3DSM method that obtains surface emissivity properties, according to embodiments. FIG. 33 is a schematic diagram illustrating a data acquisition phase performed by a 3DSM system 3300 configured to control the motion of the emissive surface, according to an embodiment. FIG. 34 is a schematic diagram illustrating a data acquisition phase performed by a 3DSM system 3400 configured to control the motion of engineered illumination and a camera, according to an embodiment. FIG. 35 is a schematic diagram illustrating a data acquisition phase performed by a 3DSM system 3500 configured to control the wavelength and/or the polarization of the emitted light from the sample surface, according to an embodiment. In one implementation, the motion control shown in FIG. 33 and FIG. 34 and the wavelength/polarization control shown in FIG. 35 are combined together to capture images at different controlled positions, different wavelength, and different polarization states.

FIG. 33 is a schematic diagram of operations of a data acquisition phase that controls the motion of an emissive surface 3382 and operations of an analysis phase that obtains surface emissivity properties, as performed by a 3DSM system 3300 of an embodiment. The 3DSM system 3300 comprises a sample platform for receiving a sample 3380 with an emissive surface 3382, an engineered illumination system 3330, a motion control device 3332 coupled to the sample platform 3340, a camera 3360 for capturing images, and one or more processors 3322. When the engineered illumination system 3330 is in the on state, the engineered illumination system 3330 provides engineered illumination to the emissive surface 3382 of the sample 3380. The illustrated example shows the illumination system 3330 in the off state after an on state. At this instant, emissive surface 3382 is emitting light (emissions) that is propagated to the camera 3360. The motion control device 3332 is configured for controls such as translation, tilt, and rotation that can be applied to the emissive surface 3382. At each motion controlled position, images are captured under different exposure settings by the camera 3360. Although two exposures, Exposure A and Exposure B, are shown, additional images can be taken. During operation, the image data of the captured images is communicated in a signal to the one or more processors 3322 and the processor(s) use the image data to measure the surface emissivity properties, such as color, brightness, and uniformity.

FIG. 34 are diagrams illustrating operations of a data acquisition phase that controls the motion of engineered illumination and camera and operations of an analysis phase that obtain surface emissivity properties, as performed by a 3DSM system 3400 of an embodiment. The 3DSM system 3400 comprises an assembly 3401 that including the engineered illumination system 3430 and the camera 3460 for capturing images. The 3DSM system 3400 further comprises a motion control device 3432 coupled to the assembly 3401, and one or more processors 3422. When the engineered illumination system 3430 is in the on state, the engineered illumination system 3430 provides engineered illumination to the emissive surface 3482 of the sample 3480. The illustrated example shows the illumination system 3430 in the off state after an on state. At this instant, emissive surface 3482 is emitting light (emissions) that is propagated to the camera 3460. The motion control device 3432 is configured for different motion controls such as translation, tilt, and rotation as can be applied to both the engineered illumination and the camera 3460 or to the camera 3460 alone. At each motion controlled position, images are captured under different exposure settings by the camera 3460. Although two exposures, Exposure A and Exposure B, are shown, additional images can be taken. During operation, the image data of the captured images is communicated in a signal to the one or more processors and the processor(s) use the image data to measure the surface emissivity properties, such as color, brightness, and uniformity.

FIG. 35 are diagrams illustrating operations of a data acquisition phase that control the wavelength and/or polarization of emitted light 3598 from an emissive surface 3582 of a sample 3580 and operations of an analysis phase that obtain surface emissivity properties as performed by a 3DSM system 3500, according to an embodiment. The 3DSM system 3500 comprises an engineered illumination system 3530, a camera 3560 for capturing images, a wavelength/polarization control device 3538 configured to change the wavelength and/or polarization states of light emitted from the emissive surface 3582 of the sample 3580, and one or more processors 3522. When the engineered illumination system 3530 is in the on state, the engineered illumination system 3530 provides engineered illumination to the emissive surface 3582 of the sample 3580. The illustrated example shows the illumination system 3530 in the off state after an on state. At this instant, the emissive surface 3582 is emitting light (emissions) and the wavelength/polarization control device 3538 is controlling the wavelength and/or polarization state of the emissions and propagates light to the camera 3560. The wavelength and polarization of emitted light can be controlled alone or be controlled together, and the surface emissivity properties are measured at different wavelength and/or polarization states by the 3DSM system 3500.

J. Surface Translucency Properties

In some implementations, a 3DSM system can be configured to obtain surface translucency properties. For example, when the surface of a sample is found to be translucent, the engineered illumination can be switched to an off state. A backlight placed behind the translucent surface is then illuminated, and the camera only measures the transmitted light from the translucent surface. The intensity measurements can be used to determine the surface translucency properties of the sample surface.

Figure 36:
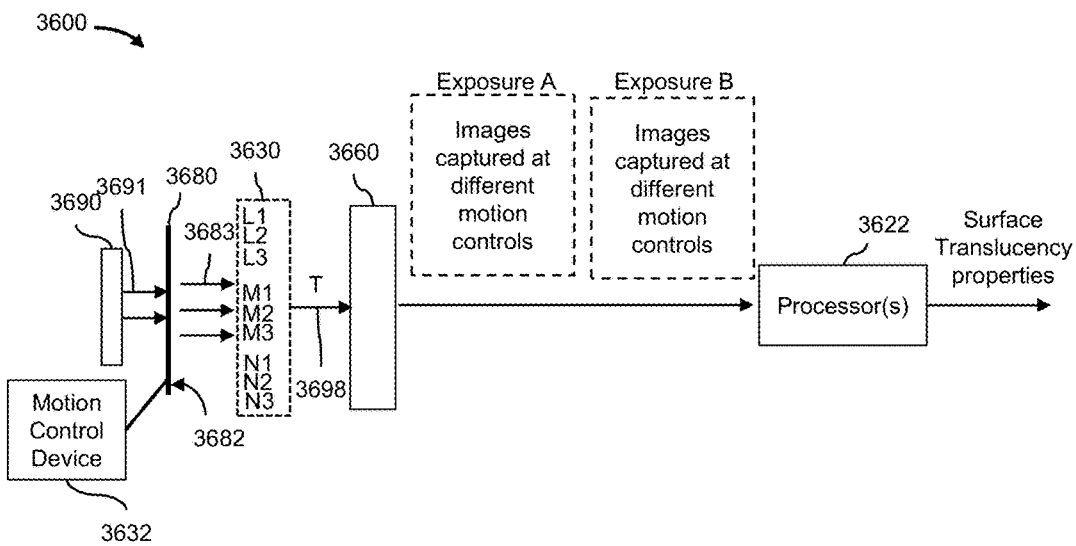
FIG. 36 is a schematic diagram depicting operations of a data acquisition phase and an analysis phase of a 3DSM method that obtains surface translucency properties using a 3DSM system configured to control the motion of a translucent sample, according to an embodiment.

FIG. 36 is a schematic diagram of operations of a data acquisition phase that controls the motion of a translucent surface 3682 and operations of an analysis phase that obtains surface translucency properties, as performed by a 3DSM system 3600 of an embodiment. The 3DSM system 3600 comprises a backlight source 3690, a motion control device 3632, an engineered illumination system 3630, a camera 3660, and one or more processors 3622. The motion control device 3632 is coupled to a sample platform shown having the sample 3680 disposed thereon during operation. The illustrated example shows the engineered illumination system 3630 in an off state. At this instant, the backlight source 3690 located behind the translucent surface 3682 provides backlight 3691. The camera 3660 only measures transmitted light 3698 through the translucent surface 3682. The motion control device 3632 controls the motion and position of the translucent surface 3682. At each of the controlled positions, multiple images are captured under different exposure settings: "Exposure A" and "Exposure B." Although two exposures are shown, additional exposures may be used in another embodiment. As depicted in FIG. 36, the image data of the captured images is communicated in a signal to the one or more processors 3622 and the processor(s) use the image data to measure the surface translucency properties, such as, for example, one or more of color, transmission, and alpha map.

Figure 37:
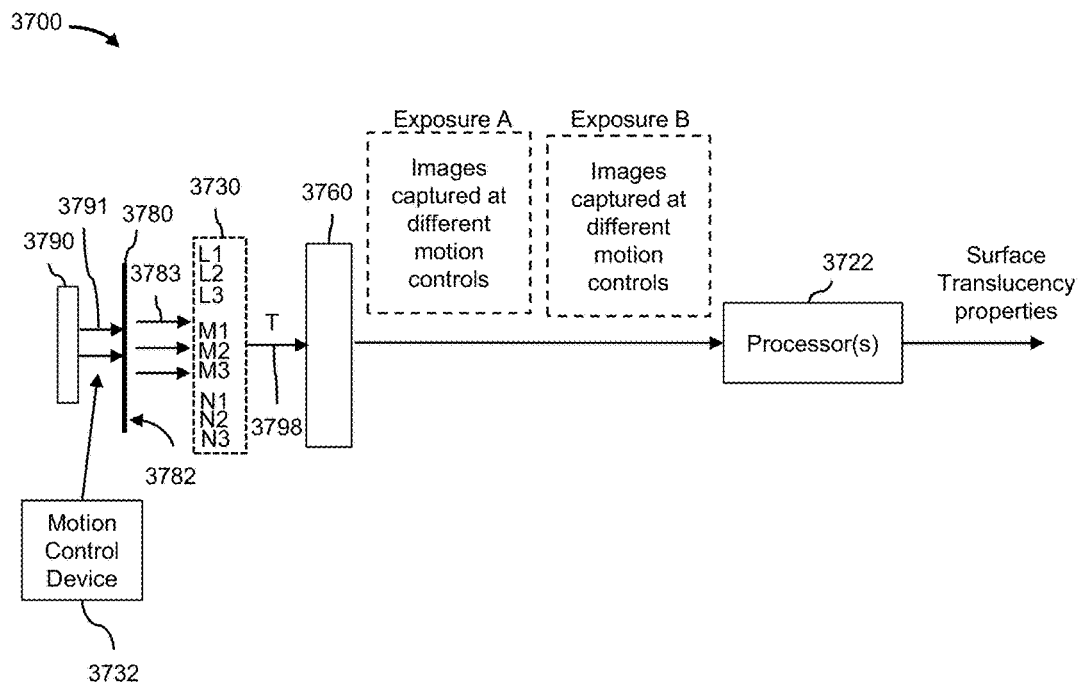
FIG. 37 is a schematic diagram depicting operations of a data acquisition phase and an analysis phase of a 3DSM method that obtains surface translucency properties using a 3DSM system configured to control the motion of a backlight, according to an embodiment.

FIG. 37 is a schematic diagram of operations of a data acquisition phase that controls the motion of the backlight 3791 as performed by a 3DSM system 3700 of an embodiment. The 3DSM system 3700 comprises a backlight source 3790, a motion control device 3732, an engineered illumination system 3730, a camera 3760, and one or more processors 3722. The illustrated example shows the engineered illumination system 3730 in an off state. At this instant, the backlight source 3790 located behind the translucent surface 3782 provides backlight 3791. The camera 3760 only measures transmitted light 3798 through the translucent surface 3782. The motion control device 3732 controls the motion of the backlight 3791. Different motion controls such as, for example, one or more of translation, tilt, and rotation can be applied to backlight 3791. At each of the controlled positions, multiple images are captured under different exposure settings: "Exposure A" and "Exposure B." Although two exposures are shown, additional exposures may be used in another embodiment. As depicted in FIG. 37, the image data of the captured images is communicated in a signal to the one or more processors 3722 and the processor(s) use the image data to measure the surface translucency properties, such as, for example, one or more of color, transmission, and alpha map.

Figure 38:
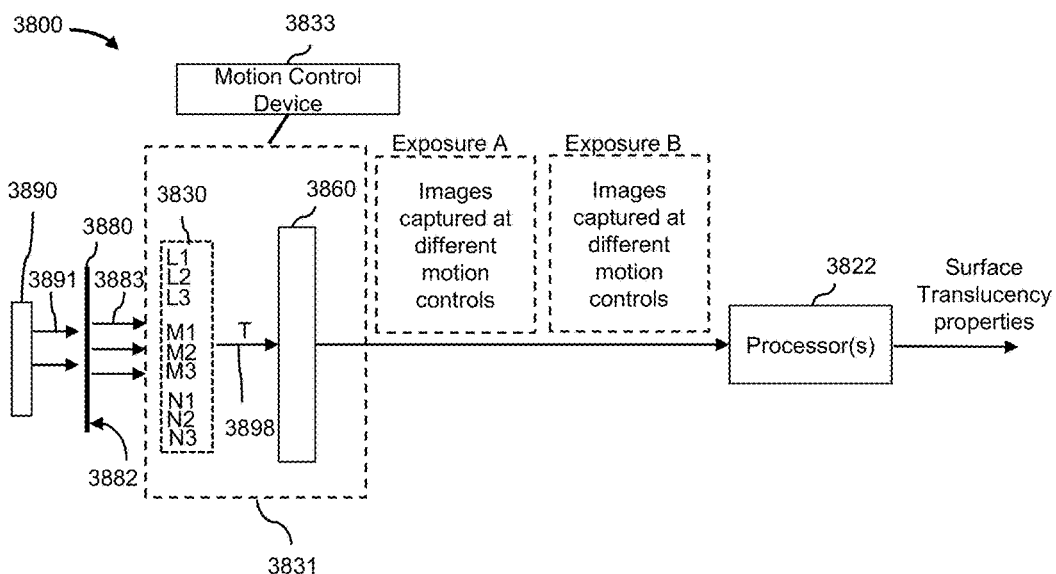
FIG. 38 is a schematic diagram depicting operations of a data acquisition phase and an analysis phase of a 3DSM method that obtains surface translucency properties using a 3DSM system configured to control the engineered illumination and the camera, according to an embodiment.

FIG. 38 is a schematic diagram of operations of a data acquisition phase that controls the motion of the engineered illumination and the camera 3860 and operations of an analysis phase that obtains surface translucency properties, as performed by a 3DSM system 3800 of an embodiment. The 3DSM system 3800 comprises, an assembly 3831 comprising an engineered illumination system 3830 and a camera 3860 for capturing images, a motion control device 3833 coupled to the assembly 3831, and one or more processors 3822. The illustrated example shows the illumination system 3830 in an off state. At this instant, a backlight source 3890 located behind the translucent surface 3882 provides backlight 3891. The camera 3860 only measures transmitted light 3898 through the translucent surface 3882. The motion control device 3833 controls the motion of engineered illumination and camera. Different motion controls such as translation, tilt, and rotation can be applied to both engineered illumination and the camera 3860 or to the camera 3860 alone, and at each controlled position images are captured under different exposures. At each of the controlled positions, multiple images are captured under different exposure settings: "Exposure A" and "Exposure B." Although two exposures are shown, additional exposures may be used in another embodiment. As depicted in FIG. 38, the image data of the captured images is communicated in a signal to the one or more processors 3822 and the processor(s) use the image data to measure the surface translucency properties, such as, for example, one or more of color, transmission, and alpha map.

Figure 39:
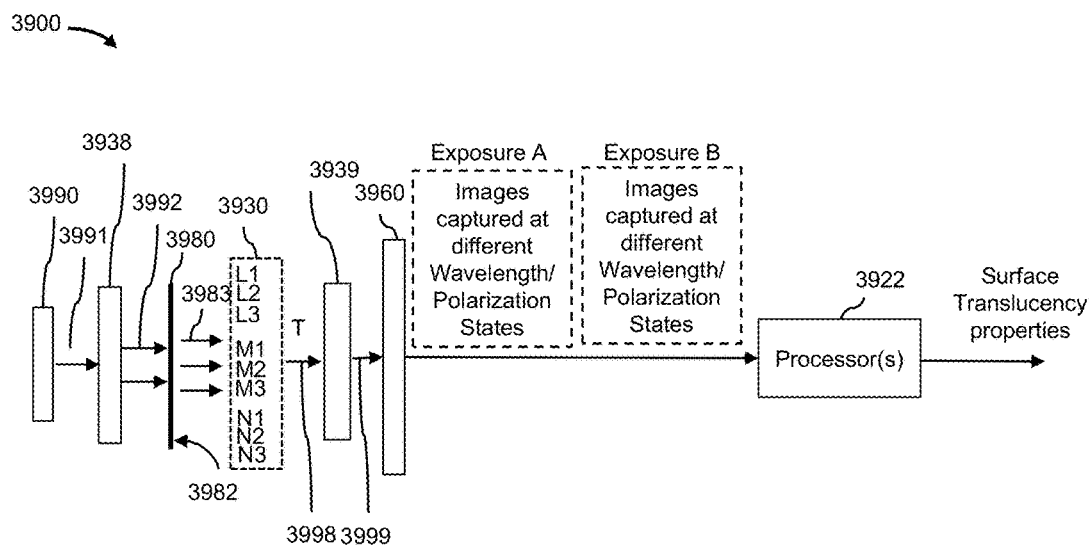
FIG. 39 is a schematic diagram depicting operations of a data acquisition phase and an analysis phase of a 3DSM method that obtains surface translucency properties using a 3DSM system configured to control the wavelength and/or polarization of both the backlight and light transmitted from the surface of the sample, according to an embodiment.

FIG. 39 is a schematic diagram of operations of a data acquisition phase that controls the wavelength and/or polarization of both a backlight 3938 and/or transmitted light from a surface 3982, as performed by a 3DSM system 3900 of an embodiment. The 3DSM system 3900 comprises, a backlight source 3938, a first wavelength/polarization control device 3990, an engineered illumination system 3930, a second wavelength/polarization control device 3939, a camera 3960 for capturing images, and one or more processors 3922. The illustrated example shows the engineered illumination system 3930 in an off state. At this instant, a backlight source 3938 located behind the translucent surface 3982 provides backlight 3992. The camera 3960 only measures transmitted light 3999 through the translucent surface 3982. The first wavelength/polarization control device 3990 controls the wavelength and/or polarization of the backlight 3938 and the second wavelength/polarization control device 3939 controls the wavelength and/or polarization of transmitted light 3998 from the surface 3982 of the sample 3980. The wavelength and polarization state can be controlled alone or be controlled together. The backlight and transmitted light can also be controlled individually or be controlled together. At each of the controlled positions, multiple images are captured under different exposure settings: "Exposure A" and "Exposure B." Although two exposures are shown, additional exposures may be used in another embodiment. As depicted in FIG. 39, the image data of the captured images is communicated in a signal to the one or more processors 3922 and the processor(s) use the image data to measure the surface translucency properties at different wavelength and polarization states.

In one embodiment, the motion control shown in FIGS. 37-38 and the wavelength/polarization control shown in FIG. 39 can also be combined together to capture images at different controlled positions, different wavelength, and different polarization state.

K. An Example of a 3DSM System with Engineered Illumination in the Off State

Figure 40:
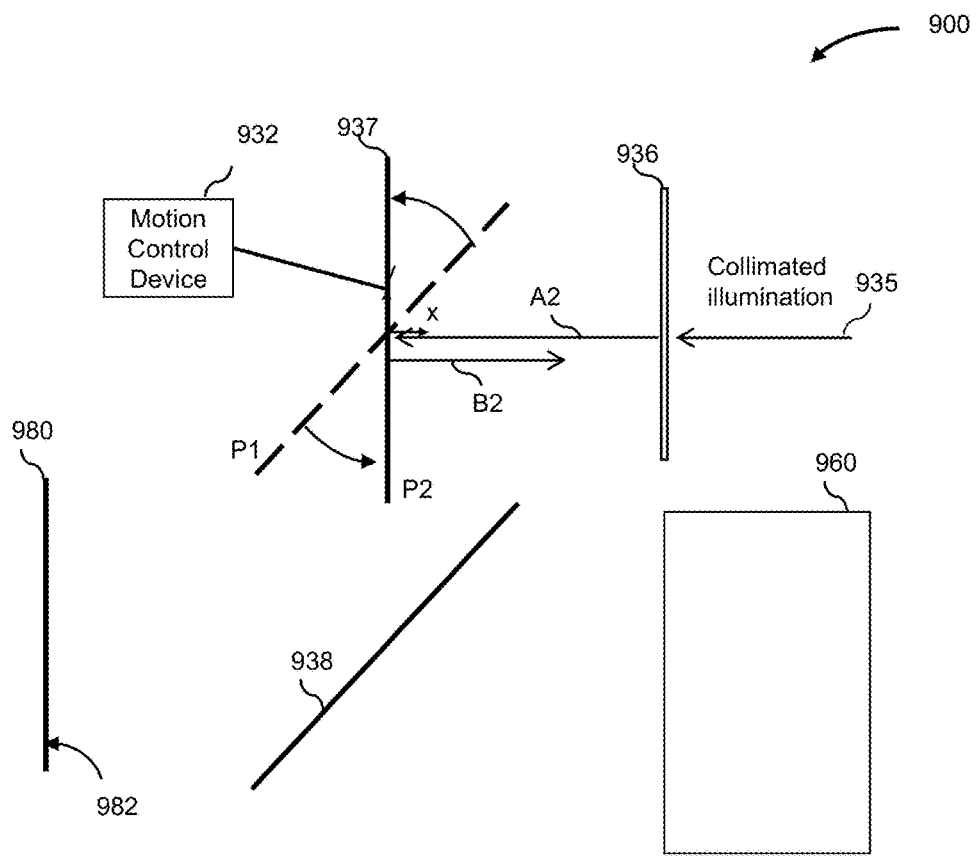
FIG. 40 is a schematic diagram depicting the 3DSM system of FIGS. 11A-B and FIG. 12 that is configured to switch the engineered illumination to an off state, according to an implementation.

FIG. 40 depicts a schematic diagram depicting an implementation of the 3DSM system 900 of FIGS. 11A-B and FIG. 12. In this implementation, the 3DSM system 900 is configured to switch the engineered illumination to an off state. The 3DSM system 900 comprises an engineered illumination system having optical elements including a diffuser 936, a rotating mirror 937, and a beam-splitter 938. The engineered illumination system also includes collimated illumination 935 from an illumination device (not shown). The 3DSM system 900 further comprises a camera 960. The 3DSM system 900 also includes an x-axis, a y-axis, and a z-axis (not shown) orthogonal to the x-axis and the y-axis. The 3DSM system 900 also includes a motion control device 932 coupled to the rotating mirror 937. The motion control device 932 is configured to rotate the mirror 937 about the x-axis and the z-axis (two orthogonal rotational directions). The illustrations show the rotating mirror 937 being rotated about the z-axis between a first position (dotted line) and the current second position (solid line). In FIG. 40, the diffuser 936 receives collimated illumination 935 and the collimated illumination is transmitted through the diffuser 936. The motion control device 932 turns the rotating mirror 937 to a position that does not reflect the light from the diffuser 936 to the beam splitter 938, for example, a position that is parallel to the diffuser 936. In the illustrated example, the mirror 937 is rotated from a first position to a second position and the beam A2 is reflected back as beam B2 and does not fall on the beam splitter 938. In this example, the object surface 982 does not receive any light from the engineered illumination. By switching engineered illumination to this off state the camera 960 only measures the emitted light and/or transmitted light from the surface 982. The images in this implementation can be used to measure the surface emissivity properties or the surface translucency properties.

V. 3DSM Methods

Figure 42:
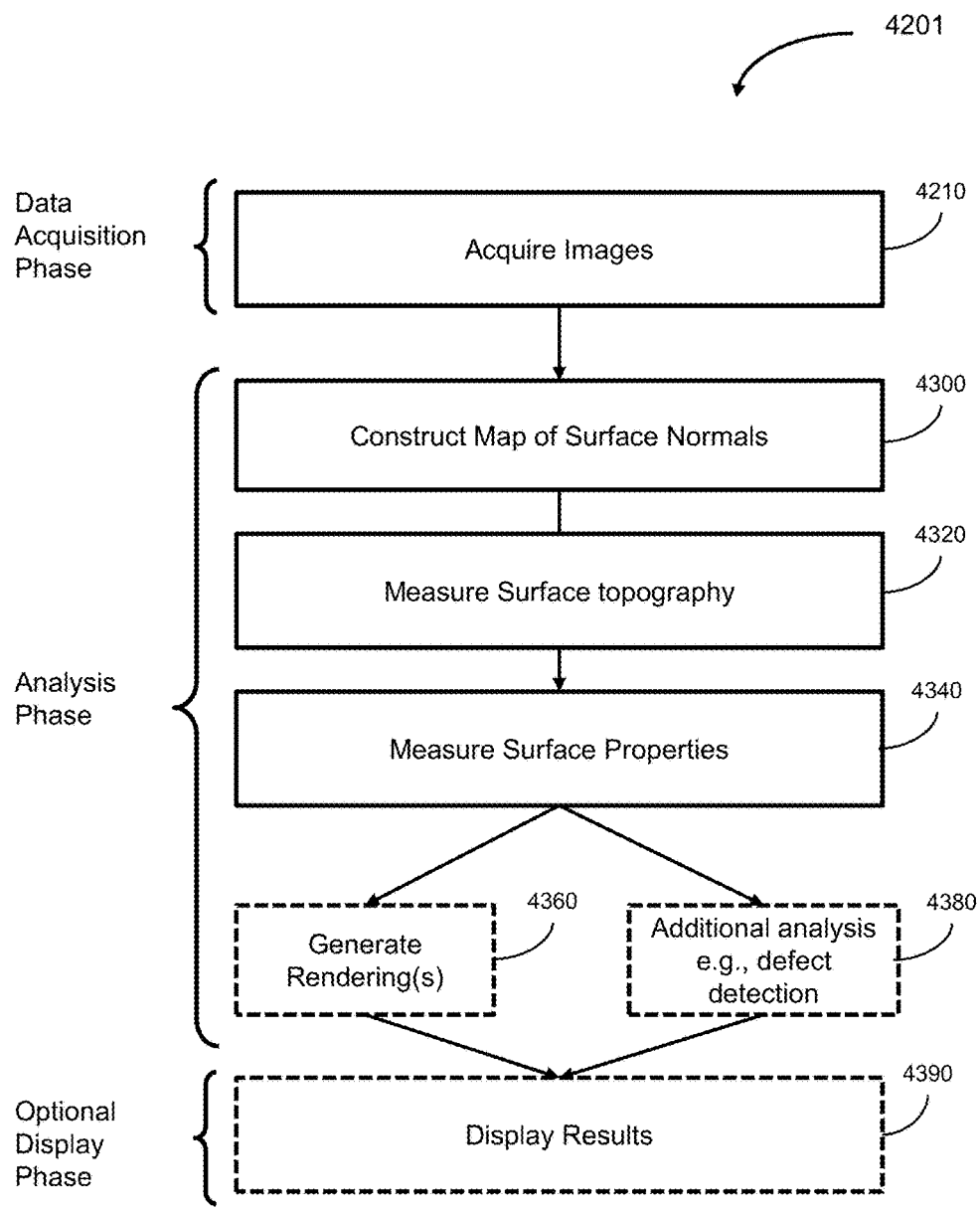
FIG. 42 is a flowchart of operations of a 3DSM method, according to various implementations.

FIG. 42 is a flowchart depicting operations of a 3DSM method, according to various implementations. The 3DSM method is implemented by a 3DSM system of various implementations described herein. The 3DSM method generally comprises a data acquisition phase, an analysis phase and an optional display phase. One or more processors (e.g., processor(s) 22) in FIG. 2) execute instructions stored in memory (e.g., memory 24 in FIG. 2) to perform one or more operations of the analysis phase and of the optional display phase.

Figure 43:
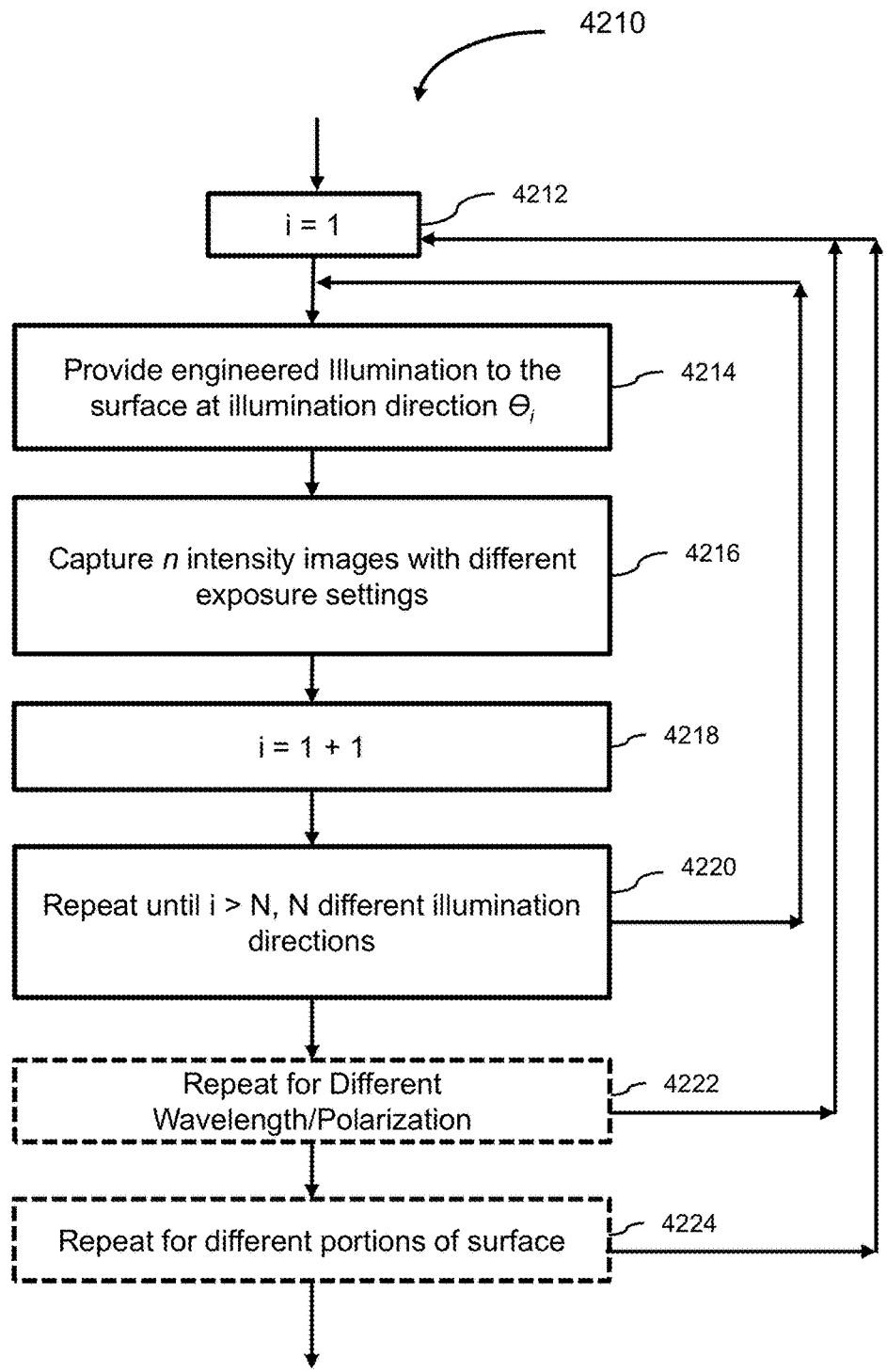
FIG. 43 is a flowchart depicting sub-operations of an operation of the 3DSM method of FIG. 42.

At operation 4210, the intensity images are acquired for a run of a data acquisition phase. During the data acquisition phase, engineered illumination of one or more ray bundles is directed to N different illumination directions incident a surface of a sample being analyzed. Examples of engineered illumination systems that can be used to generate the engineered illumination are described in sections above. The N different illumination directions are typically based on rotating the bundles in two orthogonal directions. For example, the 3DSM system may rotate the bundles in 20 rotational angles in a first direction and in 20 rotational angles along a second direction orthogonal to the first direction for a combination of four hundred (400) illumination directions. At each illumination direction, n intensity images are captured at different exposure settings by a camera. FIG. 43 is a flowchart of sub-operations of operation 4210.

At operation 4212, the 3DSM method initializes the counter i=1. At operation 4214, the engineered illumination system provides engineered illumination to the surface of a sample at an illumination direction $\theta_i$. For example, the engineered illumination system may provide one or more ray bundles of illumination beams of varying intensities to the surface at an illumination direction $\theta_i$. Different system configurations for generating the engineered illumination are described in various examples described in sections above. At each illumination direction, the sensor(s) of a camera capture n intensity images for different exposure settings (operation 4216). In one case, two (2) intensity images are captured at each illumination direction. In another case, three (3) intensity images are captured at each illumination direction. In another case, more than three (3) intensity images are captured at each illumination direction.

At operation 4218, the 3DSM method increments the counter i=i+1. At operation 4220, the 3DSM method returns to repeat operations 4214, 4216, and 4218 until i is greater than N. If i is greater than N at operation 4220, the 3DSM method preforms optional operations (denoted by dashed line) 4222, 4224. If optional operation 4222 is implemented, the wavelength and/or polarization of light is changed to a different state and the method returns to operation 4212 to repeat the operations 4212, 4214, 4216, 4218, and 4220 to capture intensity images for the new wavelength/polarization state for the N illumination directions. Alternatively, the wavelength/polarization can be changed to different states at each illumination direction $\theta_i$ after operation 4214.

Optional operation 4224 is typically implemented where the surface of a sample is larger than the camera's field-of-view. During this optional operation 4224, the sample is translated to different positions to repeat the operations 4212, 4214, 4216, 4218 and optionally 4222 to capture intensity images for different portions (e.g., each portion having the area of the camera's field of view) of the sample surface until the entire sample surface is analyzed. In one example, a motion control device (e.g., an x-y stage) is used to translate the sample to different locations incrementally so that the camera has a field-of-view of different portions of the sample surface. In another example, the motion control device can translate the illumination device(s) and/or the camera relative to the sample.

Figure 44:
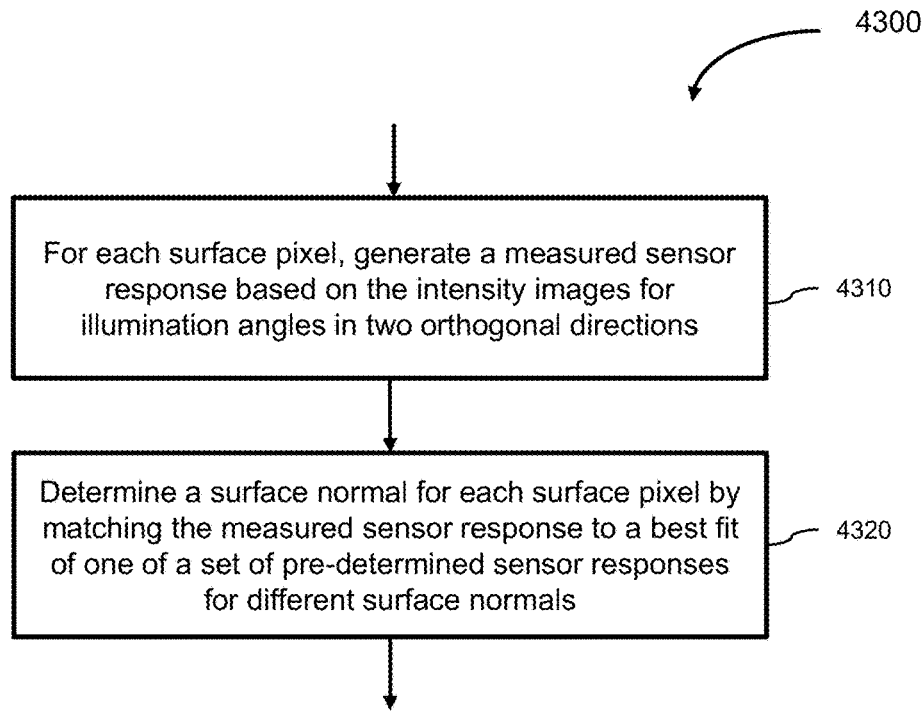
FIG. 44 is a flowchart depicting sub-operations of an operation of the 3DSM method of FIG. 42.

Returning to FIG. 42, at operation 4300, one or more processors execute instructions that determine a map of surface normals for each surface pixel based on the intensity images. FIG. 44 is a flowchart of sub-operations of operation 4300.

At operation 4310, the 3DSM method generates a measured sensor response for each of the sensor pixels based on the intensity images captured during the data acquisition phase. Each sensor pixel corresponds to a surface point of the surface. During the data acquisition phase, one or more sensors of a camera of the 3DSM system capture intensity values at each sensor pixel for the N different illumination directions and for the different exposure settings and optionally for different wavelength/polarization states. A measured sensor response is constructed for each sensor pixel based on the measured intensity values at the sensor pixel for the N different illumination directions for one of the different exposures. In one case, the 3DSM system determines one of the different exposures to use in the measured sensor response based on the best contrast or dynamic range. In another case, all the measured intensity values under different exposures are converted to a radiance map or a high dynamic range image.

At operation 4320, the 3DSM method determine a surface normal for each sensor pixel by matching the measured sensor response to the best fit of a set of pre-determined sensor responses for different surface normals. Because the illumination is engineered with a known distribution, a sensor response can be pre-determined by taking a convolution of the engineered beam distribution function with all the possible surface normal directions at different illumination directions. The measured surface normal can then be determined based on the best matching between captured sensor response and the pre-determined sensor response. A best matched pre-determined sensor response can be found based on different metrics, such as correlation and minimum difference. The surface normal vector of the matched pre-determined sensor response is then assigned to that pixel. The same sensor response matching process is repeated for all the pixels in the captured images to determined surface normals of the surface.

In one example, the sensor response matching for surface normal estimation can be described using the following Eqn. 1:

$$o(n) = \sum_i [S_i - S_i']^2 \qquad \text{(Eqn. 1)}$$

Where n is the surface normal, $S_i$ is the measured sensor response with engineered illumination rotated to the $i^{th}$ direction, and $S_i'$ is the predicted sensor response also with engineered illumination rotated to the $i^{th}$ direction. Other objective functions can also be used. The unknown surface normal n can be estimated based on optimization or using a brute force approach in which the predicted sensor responses are computed for various surface normal conditions and are compared with measured sensor response at each surface location.

Returning to FIG. 42, once the surface normals are determined for the entire surface, the 3DSM method estimates a depth map to determine a measured surface topography from the surface normals (operation 4320). A depth map can be calculated from the determined surface normals. This operation can be done based on an objective function that is the integral of the square of the errors between surface gradients of estimated surface depth and measured surface gradients.

At operation 4340, the 3DSM method determines various surface properties of the sample based on the surface normals. Reflectance properties, such as diffuse albedo, specular albedo and roughness can be estimated based on a BRDF model, such as the Ward model, the Cook-Torrance model and the Blinn-Phong Model.

The BRDF model is a mathematical approximation of how surfaces react to light, and models the diffuse characteristics and specular highlight of surface material. When light is incident on a surface from different angles, the reflected light represents different BRDF characteristics. Since the engineered illumination is rotated to different orientations, a large number of angular samplings of surface's BRDF are collected. The collected data from the images is fitted into a BRDF mathematical model such as, for example, the Ward model, the Cook-Torrance model, or the Blinn-Phong Model. These BRDF models are generally a non-linear function with illumination normal and camera viewing normal as the variables, and with normal, diffuse reflection, specular reflection, and roughness as the coefficients. Different BRDF models may have different coefficients, such as anisotropic, basecolor, metallic, and glossiness.

For example, an isotropic Ward BRDF model can be described as a non-linear function described in Eqn. 2:

$$\rho(LN, VN) = f(n, \rho_d, \rho_s, \beta) \qquad \text{(Eqn. 2)}$$

where LN is the normal of incident light, VN is the normal of camera viewing direction, n is the surface normal, $\rho_d$ is the diffuse reflectance coefficient, $\rho_s$ is the specular reflectance coefficient, and $\beta$ is the roughness coefficient. $f(n, \rho_d, \rho_s, \beta)$ is a non-linear function describing the BRDF model. LN and VN are variables which can be known based on system's design configuration or based on calibration. n, $\rho_d$, $\rho_s$, and $\beta$ are coefficients that need to be estimated. The surface normals are estimated at operation 4300. The $\rho_d$, $\rho_s$, and $\beta$ coefficients can then be estimated using an objective function as follows:

$$O(\rho_d, \rho_s, \beta) = \sum_i [S_i - (LN \cdot VN) f(\rho_d, \rho_s, \beta)]^2 \qquad \text{(Eqn. 3)}$$

Other objective functions can also be used. A brute force approach or non-linear optimization can be applied to estimate the $\rho_d$, $\rho_s$, and $\beta$ coefficients, and this process is repeated for all the surface locations. If desired the estimated surface normal at operation 4300 can also be used as an initial point. The surface normal n can then be refined and $\rho_d$, $\rho_s$ and $\beta$ coefficients are estimated using an objective function as below. Other objective functions can also be used in other implementations.

$$O(n, \rho_d, \rho_s, \beta) = \sum_i [S_i - (LN \cdot VN) f(n, \rho_d, \rho_s, \beta)]^2 \quad \text{(Eqn. 4)}$$

Optionally (denoted by dashed line), at operation 4360, the 3DSM method can generate one or more renderings and/or performs additional analyses. Renderings can be generated using techniques such as ray casting or ray tracing based on measured surface normal, depth, reflectance properties, emissivity properties, and translucency properties. During the optional display operation, the renderings and/or other output is provided on a display such as the display 70 shown in FIG. 2 (operation 4390).

Figure 45:
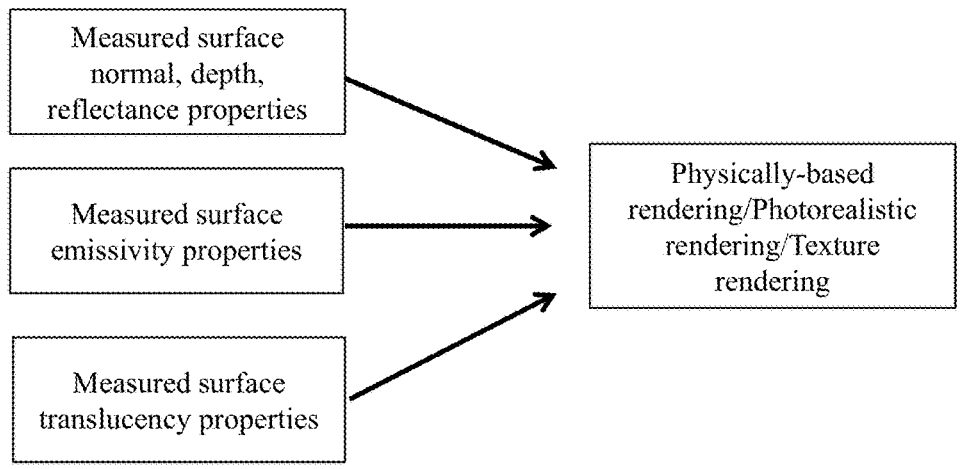
FIG. 45 is a block diagram depicting inputs and outputs of the rendering operation, according to an embodiment.

FIG. 45 is a block diagram depicting inputs and outputs of the rendering operation 4360, according to an embodiment. In FIG. 45, the illustrates physically-based rendering and photorealistic rendering using measured surface normal, depth, reflectance properties, surface emissivity properties, and surface translucency properties. As shown, the measured surface normal, depth, and reflectance properties such as diffuse reflection, specular reflection, glossiness, base color, metallic map, and roughness can be used to render the reflective appearance of an object. The measured surface emissive properties such as color, brightness, and uniformity can be used to render the emissive appearance of an object. The measured surface translucency properties such as color, transmission, and alpha map can be used to render the translucent appearance of an object.

Figure 46A:
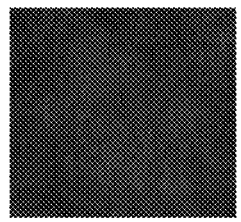
FIG. 46A is an illustration of diffuse reflection properties of a synthetic leather surface as measured by a 3DSM system, according to an embodiment.
Figure 46B:
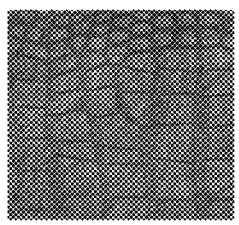
FIG. 46B is an illustration of specular reflection properties of the synthetic leather surface as measured by the 3DSM system of FIG. 46A, according to an embodiment.
Figure 46C:
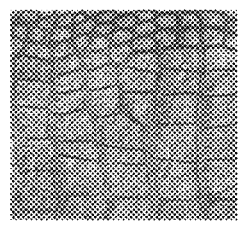
FIG. 46C is an illustration of glossiness properties of the synthetic leather surface as measured by the 3DSM system of FIG. 46A, according to an embodiment.
Figure 46D:
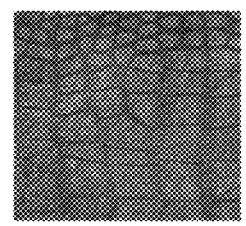
FIG. 46D is an illustration of a measured base color that describes the combined color appearance of both diffuse reflection and specular reflection of the synthetic leather surface as measured by the 3DSM system of FIG. 46A, according to an embodiment.
Figure 46E:
FIG. 46E is an illustration of a measured metallic map that describes the dielectric and metallic properties of the synthetic leather surface as measured by the 3DSM system of FIG. 46A, according to an embodiment.
Figure 46F:
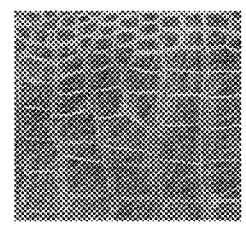
FIG. 46F is an illustration of roughness properties measured by the 3DSM system of FIG. 46A, according to an embodiment.
Figure 46G:
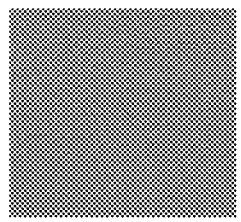
FIG. 46G is an illustration of a normal map of the synthetic leather surface as measured by the 3DSM system of FIG. 46A, according to an embodiment.
Figure 46H:
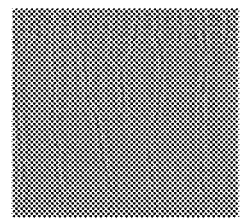
FIG. 46H is an illustration of measured depth map of the synthetic leather surface as measured by the 3DSM system of FIG. 46A, according to an embodiment.
Figure 46I:
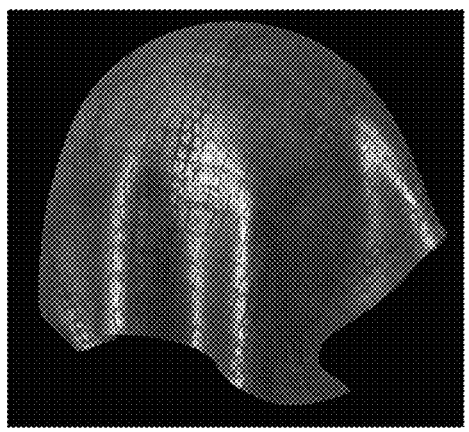
FIG. 46I is a physically-based rendering of the synthetic leather surface as measured by the 3DSM system of FIG. 46A, according to an embodiment.

FIGS. 46A-46H are illustrations of surface reflectance properties, surface normal, and depth map of a synthetic leather sample measured by a 3DSM system, according to an implementation. FIG. 46A is a measured diffuse reflection of the synthetic leather surface. FIG. 46B is a measured specular reflection of the synthetic leather surface. FIG. 46C is a measured glossiness of the synthetic leather surface. FIG. 46D is a measured base color that describes the combined color appearance of both diffuse reflection and specular reflection of the synthetic leather surface. FIG. 46E is a measured metallic map that describes the dielectric and metallic properties of the synthetic leather surface. FIG. 46F is a measured roughness of the synthetic leather surface. FIG. 46G is a measured normal map of the synthetic leather surface. FIG. 4611 is a measured depth map of the synthetic leather surface. FIG. 46I is a physically-based rendering of the synthetic leather using measured parameters.

Defect Detection

Figure 47:
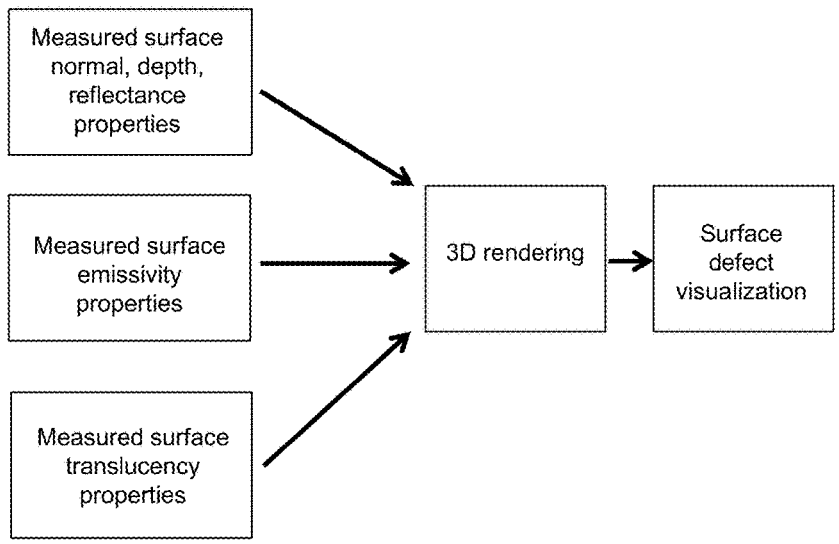
FIG. 47 is a block diagram depicting operations of a 3DSM method that includes a defect detection process, according to an embodiment.

In certain implementations, the 3DSM method can detect defects based on certain results determined by a 3DSM method such as described with respect to FIGS. 42-44. FIG. 47 is a block diagram illustrating operations of a 3DSM method that include a defect detection process, according to an embodiment. In FIG. 47, the diagram illustrates surface defect visualization using measured surface normal, depth, reflectance properties, surface emissivity properties, and surface translucency properties. The defects on a reflective surface may present different normal, depth and reflectance properties. Similarly defects on an emissive surface may present different emissivity properties and defects on a translucent surface may present different translucency properties. 3D rendering based on measured reflectance properties, measured emissive properties, and measured translucency properties can be used to provide defect visualization in a three-dimensional space. Different lighting conditions and different viewing conditions can be virtually changed in the 3D rendering.

Figure 48:
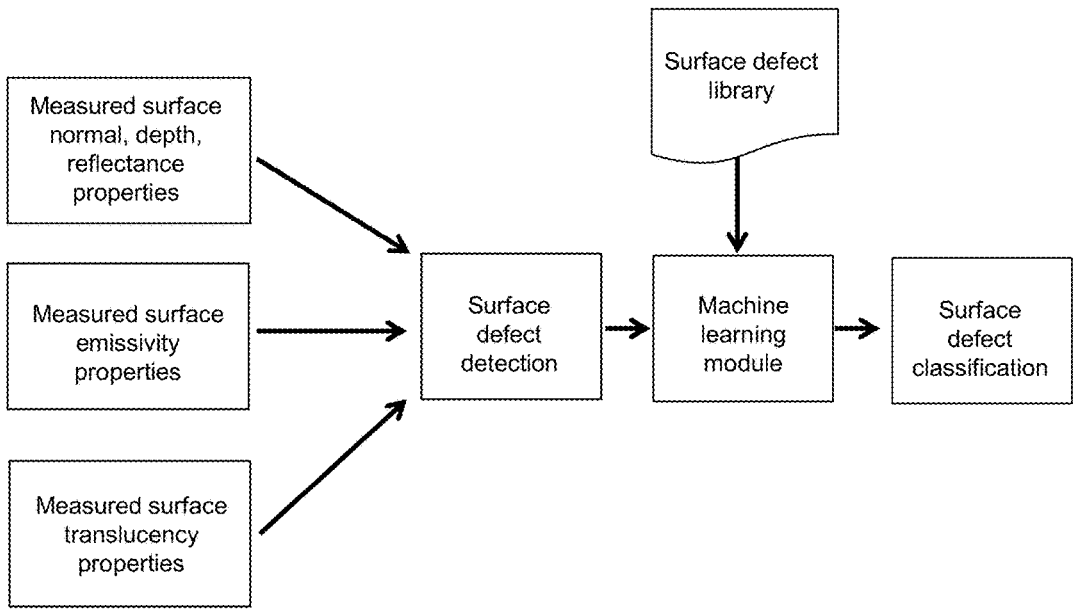
FIG. 48 is a block diagram depicting operations of a 3DSM method that includes a defect detection process, according to an embodiment.

FIG. 48 is a block diagram illustrating a defect detection process, according to an embodiment. In FIG. 48, the diagram illustrates surface defect detection and classification using measured surface normal, depth, reflectance properties, surface emissivity properties, and surface translucency properties. Image processing and pattern recognition techniques can be applied to the normal, depth and reflectance properties measured on a reflective surface, be applied to the emissivity properties measured on an emissive surface, and be applied to the translucency properties measured on a translucent surface. Any defect that presents different appearance on these measured parameters can be detected. The detected defects can then be passed to a machine learning module. Based on a surface defect library that has learned possible defect features surface defects can be classified into different categories.

FIGS. 49A-49F are illustrations of measured surface reflectance properties, normal, and depth of a LCD panel that is contaminated with dirt and fiber as measured by a 3DSM system, according to an implementation. FIG. 49A is an illustration of measured specular reflection. FIG. 49B is an illustration of measured diffuse reflection. FIG. 49C is an illustration of measured roughness. FIG. 49D is an illustration of a measured normal map. FIG. 49E is an illustration of a measured depth map. The dirt and fiber's reflection is more diffusive than the LCD panel's reflection, and therefore dirt and fiber are showing as darker in the specular map in FIG. 49A, but are much brighter in the diffuse map in FIG. 49B. It can also be seen that dirt and fiber show much larger roughness values in roughness map. In the normal map and depth map it can be seen that dirt and fiber have distinguished values, which indicate different height and 3D shape. All these measured parameters can be used to identify the dirt and fiber defects on the LCD panel. FIG. 49F is an illustration of surface defect visualization using measured parameters. The measured normal, depth, and reflectance properties are used in the 3D rendering. A virtual light is placed in the scene and a camera is virtually placed at an oblique angle. The defects can be clearly visualized in the 3D rendering shown in FIG. 49F.

Figure 50A:
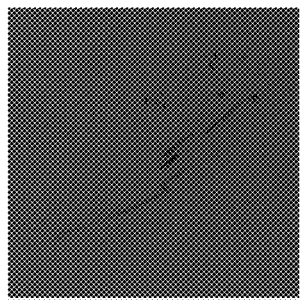
FIG. 50A is an illustration of measured specular reflection properties of an LCD panel with scratches and pits as measured by a 3DSM system configured for defect detection, according to an embodiment.
Figure 50B:
FIG. 50B is an illustration of measured diffuse reflection properties of an LCD panel with scratches and pits as measured by the 3DSM system of FIG. 50A, according to an embodiment.
Figure 50C:
FIG. 50C is an illustration of measured surface roughness properties of an LCD panel with scratches and pits as measured by the 3DSM system of FIG. 50A, according to an embodiment.
Figure 50D:
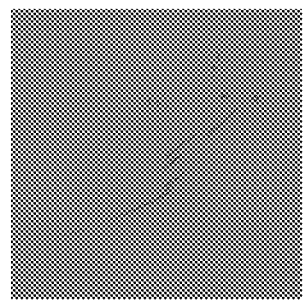
FIG. 50D is an illustration of measured normal map of an LCD panel with scratches and pits as measured by the 3DSM system of FIG. 50A, according to an embodiment.
Figure 50E:
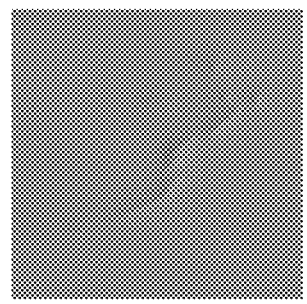
FIG. 50E is an illustration of measured depth map of the LCD panel with scratches and pits as measured by the 3DSM system of FIG. 50A, according to an embodiment.
Figure 50F:
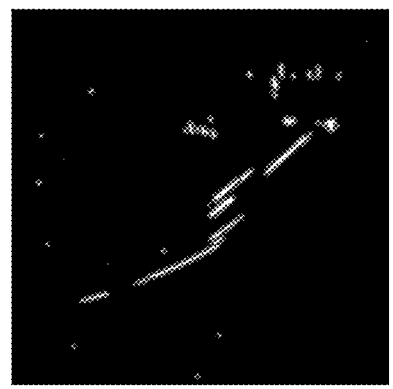
FIG. 50F is an illustration of surface defect detection using parameters measured by the 3DSM system of FIG. 50A, according to an embodiment.

FIGS. 50A-50F are illustrations of measured surface reflectance properties, normal, and depth of a LCD panel with scratches and pits as measured by a 3DSM system, according to an implementation. FIG. 50A is an illustration of measured specular reflection. FIG. 50B is an illustration of measured diffuse reflection. FIG. 50C is an illustration of measured roughness. FIG. 50D is an illustration of measured normal map. FIG. 50E is an illustration of a measured depth map. FIG. 50F is an illustration of surface defect detection using measured parameters. The pixels in red are detected defects.

Figure 51:
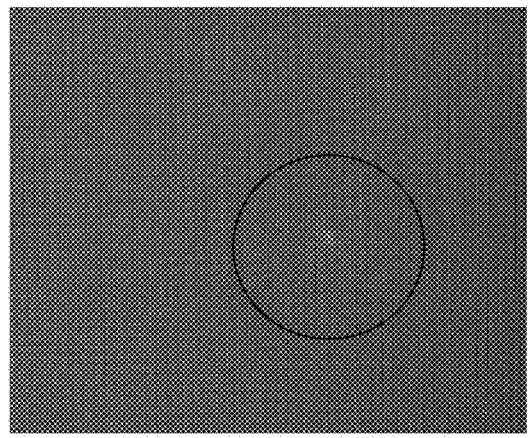
FIG. 51 is an illustration depicting a measured brightness map of an LCD panel with a white spot as measured by a surface defect detection process in a 3DSM method implemented by a 3DSM system, according to an embodiment.
Figure 52:
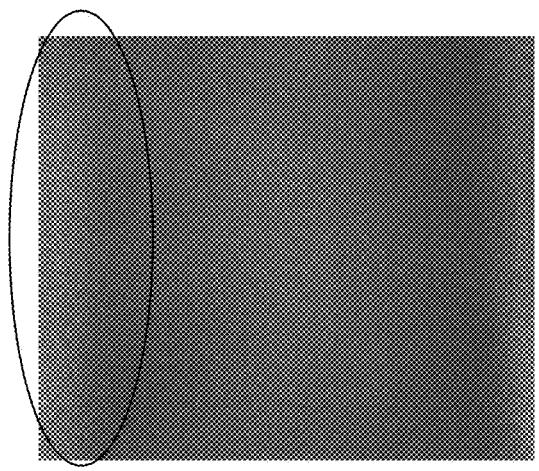
FIG. 52 is an illustration depicting a measured uniformity map of the LCD panel with non-uniformity as measured by a surface defect detection process in a 3DSM method implemented by the 3DSM system, according to an embodiment.

FIGS. 51-52 are illustrations depicting a surface defect detection process using measured surface emissive properties of a LCD panel that has white spot and a LCD panel that has a non-uniformity as measured by a 3DSM system, according to an implementation. The images were measured by switching the engineered illumination to an off state. FIG. 51 is a measured brightness map of a LCD panel that is with white spot, which is identified within the circle. FIG. 52 is a measured uniformity map of a LCD panel that is not uniform. A non-uniform region is identified within the ellipse.

In one embodiment, a 3DSM method uses a calibration process by using a mirror and a chrome sphere to compensate for imperfect system alignment and provide more accurate illumination direction information.

In one embodiment, addition multiple illuminations can be added at oblique angles to improve the estimation.

In one embodiment, system alignment can be performed by using a mirror as a reference object.

In one embodiment, wavelength and polarization control can be applied to the engineered illumination and reflected light from object surface.

In one embodiment, motion control can be applied to the object surface, engineered illumination and camera.

In one embodiment, the emissivity properties of a emissive surface can be measured by switching the engineered illumination to an off state.

In one embodiment, the translucency properties of a translucent surface can be measured by switching the engineered illumination to an off state and by placing a backlight behind the surface.

In one embodiment, measured surface normal, depth, reflectance properties, surface emissivity properties, and surface translucency properties can be used for physically-based rendering and photorealistic rendering.

In one embodiment, measured surface normal, depth, reflectance properties, surface emissivity properties, and surface translucency properties can be used for surface defect visualization, surface defect detection and classification.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A 3D surface measurement system comprising:
    an engineered illumination system configured to provide at least one ray bundle sequentially at N illumination directions incident a surface of a sample being imaged, wherein each ray bundle comprises illumination beams of various intensities, the illumination beams of each ray bundle configured in different directions converging toward the surface of the sample during operation;
    a first camera with an imaging lens and at least one sensor configured to acquire intensity images based on light received from the illuminated sample, each intensity image acquired while the at least one ray bundle is directed at one of the N illumination directions; and
    a controller configured to execute instructions to:
        determine a sensor response at each sensor pixel of a plurality of sensor pixels of the at least one sensor, the sensor response determined from the intensity images corresponding to the N illumination directions;
        match the sensor response at each sensor pixel to one of a plurality of predetermined sensor responses to determine a surface normal at each sensor pixel; and
        construct a map of surface normals of the surface of the sample by combining the determined surface normals of the plurality of sensor pixels of the at least one sensor.

2. The 3D surface measurement system of claim 1, wherein the engineered illumination system comprises:
    an illumination device with at least one light source; and
    one or more optical elements configured to generate and propagate the at least one ray bundle based on light from the at least one light source to the surface of the sample and to propagate light from the illuminated surface to the first camera.

3. The 3D surface measurement system of claim 2, wherein the one or more optical elements comprise a diffuser configured to spread illumination from the at least one light source to generate the illumination beams of various intensities of each ray bundle according to a transmission profile of the diffuser.

4. The 3D surface measurement system of claim 3, wherein the diffuser transmission profile is configured to spread the illumination beams of various intensities to different angles according to a Gaussian or Gaussian-like distribution.

5. The 3D surface measurement system of claim 2, wherein the one or more optical elements are further configured to distribute the illumination beams of various intensities at different angles according to a linear gradient.

6. The 3D surface measurement system of claim 2, wherein the one or more optical elements are further configured to distribute the illumination beams of various intensities at different angles according to a random distribution.

7. The 3D surface measurement system of claim 2, further comprising an additional illumination source configured to direct illumination incident the surface of the sample at an oblique angle.

8. The 3D surface measurement system of claim 2, wherein the one or more optical elements comprise:
a mirror configured to receive illumination beams propagated from the at least one light source; and
a beam splitter configured to receive the illumination beams from the mirror and reflecting the illumination beams to the surface of the sample and configured to transmit light reflected from the surface of the sample.

9. The 3D surface measurement system of claim 2, wherein the one or more optical elements comprise:
a combination filter of a plurality of neutral density filters, the combination filter configured to engineer illumination from the at least one light source into the illumination beams of various intensities of each of the at least one ray bundle, each neutral density filter associated with one illumination beam; and
a collimator configured to collimate the illumination beams propagated from the combination filter.

10. The 3D surface measurement system of claim 1, wherein the engineered illumination system comprises:
an illumination array having a plurality of illumination elements, the illumination array configured to activate one of the illumination elements at a single exposure time; and
a collimator configured to collimate illumination received from the one activated illumination element; and
a diffuser configured to spread the collimated illumination from the collimator to the illumination beams of various intensities of each ray bundle according to a transmission profile of the diffuser.

11. The 3D surface measurement system of claim 1, further comprising a motion control device configured to manipulate the sample and/or the engineered illumination and the camera together.

12. The 3D surface measurement system of claim 11, wherein the motion control device is configured to manipulate the sample and/or the engineered illumination and the camera together to shift the illumination beams to different regions of the surface of the sample.

13. The 3D surface measurement system of claim 11, wherein the motion control device is configured to manipulate the sample and/or the engineered illumination and the camera together to direct the illumination beams in the N illumination directions.

14. The 3D surface measurement system of claim 2, further comprising a wavelength and/or polarization control device configured to alter the wavelength and/or polarization of the at least one ray bundle or alter the wavelength and/or polarization of reflected light from the surface of the sample.

15. The 3D surface measurement system of claim 2, further comprising a first wavelength and/or polarization control device configured to alter the wavelength and/or polarization of the at least one ray bundle and a second wavelength and/or polarization control device configured to alter the wavelength and/or polarization of the reflected light from the surface of the sample.

16. The 3D surface measurement system of claim 2, wherein the controller further configured to execute instructions to determine a depth map and/or surface properties of the surface of the sample.

17. The 3D surface measurement system of claim 2, further comprising a second camera with an imaging lens and at least one sensor, the second camera configured to capture intensity images at the N illumination directions based on light received from the illuminated sample, wherein the second camera captures intensity images from a different angle than the first camera.

18. The 3D surface measurement system of claim 1, wherein the illumination beams of each ray bundle converge to a point.

19. A 3D surface measurement method comprising:
receiving a plurality of intensity images of a sample in a signal from at least one sensor of a camera, the plurality of intensity images captured at a plurality of exposure times, each intensity image acquired while one or more ray bundles is directed at one of N illumination directions, each ray bundle comprising illumination beams of various intensities, the illumination beams of each ray bundle directed in different directions converging toward the surface of the sample;
determining a sensor response at each sensor pixel of a plurality of sensor pixels of the at least one sensor, the sensor response determined from the intensity images at the N illumination directions;
matching a sensor response at each sensor pixel to one of a plurality of predetermined sensor responses to determine a surface normal at each sensor pixel; and
construct a map of surface normals of the surface of the sample by combining the determined surface normals of the plurality of sensor pixels of the at least one sensor.

20. The 3D surface measurement method of claim 19, further comprising determining a depth map of the surface from the map of surface normals.

21. The 3D surface measurement method of claim 19, further comprising determining a map of surface properties of the surface based on the map of surface normals.

22. The 3D surface measurement method of claim 21, wherein the surface properties comprise one or more of a reflectance property, an emissivity property, and a translucency property.

23. The 3D surface measurement method of claim 19, further comprising determining a defect in the surface of the sample based a map of surface properties and/or a depth map of the surface, wherein each map is determined from the map of surface normals.

24. The 3D surface measurement method of claim 19, further comprising:
determining a depth map of the surface from the map of surface normals;
determining one or more maps of surface properties of the surface based on the map of surface normals; and
generating a physically-based rendering based on the map of surface normals, the depth map, and the at least one of the one or more maps of surface properties of the surface.

25. A 3D surface measurement method comprising:
a) engineering at least one ray bundle directed sequentially to N illumination directions incident a surface a sample being imaged, each ray bundle comprising illumination beams of various intensities, the illumination beams of each ray bundle directed in different directions converging toward the surface of the sample;
b) acquiring, using at least one sensor of a camera, intensity images at a plurality of exposure times based on light from the illuminated sample, each intensity image acquired while the one or more ray bundles is directed at one of the N illumination directions; and
c) communicating the intensity images to one or more processors, wherein the one or more processors determine a sensor response at each sensor pixel of a plurality of sensor pixels of the at least one sensor, the sensor response determined from the intensity images at the N illumination directions, match the sensor response at each sensor pixel to one of a plurality of predetermined sensor responses to determine a surface normal at each sensor pixel, and construct a map of surface normals of the surface of the sample by combining the determined surface normals of the plurality of sensor pixels of the at least one sensor.

26. The 3D surface measurement method of claim 24, further comprising changing wavelength or polarization of the illumination beams of the at least one ray bundle and/or light from the illuminated sample, and then repeating a) and b).

* * * * *

UNITED STATES PATENT AND TRADEMARK OFFICE
CERTIFICATE OF CORRECTION

PATENT NO. : 10,502,556 B2
APPLICATION NO. : 15/655656
DATED : December 10, 2019
INVENTOR(S) : Lingfei Meng and Jun Jiang Page 1 of 1

It is certified that error appears in the above-identified patent and that said Letters Patent is hereby corrected as shown below:

In the Claims

1. In Line 1 of Claim 26 (Column 45, Line 11) change "24" to --25--.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*